US008509530B2

(12) United States Patent
Matsuda

(10) Patent No.: US 8,509,530 B2
(45) Date of Patent: Aug. 13, 2013

(54) IMAGE PROCESSING APPARATUS, IMAGE FORMING APPARATUS, IMAGE PROCESSING METHOD, COMPUTER PROGRAM AND COMPUTER-READABLE MEDIUM

(75) Inventor: Toyohisa Matsuda, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/304,046

(22) Filed: Nov. 23, 2011

(65) Prior Publication Data

US 2012/0134581 A1 May 31, 2012

(30) Foreign Application Priority Data

Nov. 25, 2010 (JP) .................... 2010-262869

(51) Int. Cl.
*G06K 9/34* (2006.01)
(52) U.S. Cl.
USPC ............................ 382/164; 382/162; 382/173
(58) Field of Classification Search
USPC ......... 382/162, 164, 171, 173, 305; 715/716, 715/719; 707/999.001
See application file for complete search history.

(56) References Cited

U.S. PATENT DOCUMENTS 7,184,589 B2 2/2007 Okubo
7,809,189 B2 * 10/2010 Cheng et al. .................. 382/173

FOREIGN PATENT DOCUMENTS

JP 2005-20227 A 1/2005

* cited by examiner

*Primary Examiner* — Anh Do
(74) *Attorney, Agent, or Firm* — Birch, Stewart, Kolasch & Birch, LLP

(57) ABSTRACT

The compression processing unit 30 of the image processing apparatus makes the color conversion process section 50 to the layout analysis processing section 53 extract the text string region, and makes the foreground layer generating section 54 extract the foreground pixel from the text string region to generate the foreground layer. The line detection process section 52 extracts the line art from the input image data, and removes the pixel block configuring the line art from the foreground pixel-block mask generated by the foreground extracting section 51. The layout analysis processing section 53 estimates the direction of the text string in accordance with the distance of the foreground regions and the number of connected foreground regions, and merges the foreground regions connected in the estimated direction, to extract the text string region.

8 Claims, 52 Drawing Sheets

REFERENCE PATTERN 2

REFERENCE PATTERN 5

REFERENCE PATTERN 1

REFERENCE PATTERN 4

16 PIXEL
16 PIXEL
PROCESS TARGET

REFERENCE PATTERN 3

IT COUNTS THE NUMBER
OF UNIFORM DENSITY
PIXEL-BLOCK CANDIDATES
CONNECTED IN THE VERTICAL
DIRECTION

IT ALLOWS THE INTERMITTENCE
OF THE CONNECTED UNIFORM
DENSITY PIXEL-BLOCK CANDIDATES

FIG. 9
8 × 8 PIXEL BLOCK
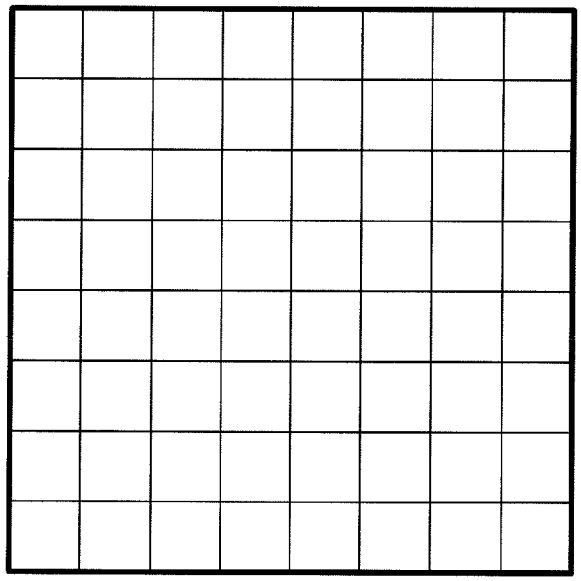
4 × 4 PIXEL BLOCK
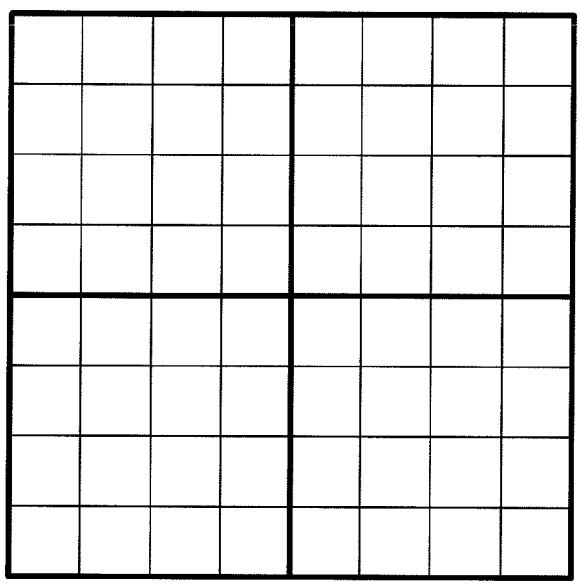

LABELING PROCESS

RESULT OF TEXT STRING ESTIMATION PROCESS

RESULT OF TEXT STRING ESTIMATION PROCESS

IMAGE PROCESSING APPARATUS, IMAGE FORMING APPARATUS, IMAGE PROCESSING METHOD, COMPUTER PROGRAM AND COMPUTER-READABLE MEDIUM

This Nonprovisional application claims priority under 35 U.S.C. §119(a) on Patent Application No. 2010-262869 filed in Japan on Nov. 25, 2010, the entire contents of which are hereby incorporated by reference.

BACKGROUND OF THE INVENTION

1. Field of the Invention

The present invention relates to an image processing apparatus, an image forming apparatus, an image processing method, a computer program and a computer-readable medium for surely extracting a foreground pixel from input image data when performing a process, such as image compression based on a layer segmentation.

2. Description of Related Art

Conventionally, it is well known about an image forming apparatus, such as a copying machine or a multi-function printer, which performs an image formation by an electrographic method, an inkjet method or the like. In addition, a recent multi-function printer is increasingly sophisticated, and there are needs for a function of saving electronic data of a document read by a scanner and managing the saved document file, a function of sending document data as an e-mail, and the like. A document scanned by a scanner is saved as image data. However, the volume of such image data is generally large. Thus, it is necessary for saving or sending such image data to utilize, for example, an image compression technique that reduces the data volume.

There is a compression technique based on the layer segmentation, for example, mixed raster content (MRC) as one of image compression techniques that implement high compression rates. This compression technique segments an image regarding input image data into two image data: image data of the foreground layer; and image data of the background layer, and performs image-data compression for the foreground layer in a condition suitable to the foreground layer and image-data compression for the background layer in a condition suitable to the background layer. Thus, it is possible to enhance a compression rate of the final compressed image. The foreground layer shows an image configured with a text character and/or a line art (hereinafter referred to as "written thing"), and the compression of the foreground layer is suitable to a lossless-compression technique, such as a joint bi-level image experts group (JBIG), a modified modified read (MMR) or a lempel ziv welch (LZW). The background layer shows an image configured without the written thing, and the compression of the background layer is suitable to a lossy-compression technique, such as a joint photographic experts group (JPEG).

Patent Document 1 (Japanese Patent Application Laid-Open No. 2005-20227) proposes an image compression apparatus having an object to compress, with a high compression rate, of image data obtained by reading a color document whose image is configured with a text character, a picture image and/or the like, but without reducing the visibility of the text character and/or the like. The proposed image compression apparatus checks a drawing condition of pixels configuring a drawn thing, such as a text character and/or graphics, on image data regarding an image of color document read by a scanner or the like, and extracts a sequential-pixel group that is a mass of sequential pixels configured with drawn pixels sequentially connected to each other. The image compression apparatus categorizes features of pixels configuring the extracted sequential-pixel group into a foreground image suitable to a compression technique preferring a resolution and a background image suitable to a compression technique preferring a color-tone characteristic, and compresses each image by a suitable compression technique.

SUMMARY OF THE INVENTION

The image compression apparatus proposed by Patent Document 1 firstly binarizes color image data for extracting sequential pixels from image data, extracts a sequential-pixel group based on the binarized image data, and then processes a sequential-pixel group whose volume is within a predetermined range among the extracted sequential-pixel group as the foreground image and a sequential-pixel group whose volume is out of the predetermined range among the extracted sequential-pixel group as the background image. However, the proposed image compression apparatus binarizes color image. Thus, it is difficult to segment an image, in which a text character is drawn on a localized background color, into text-character pixels and background pixels. Furthermore, it is difficult to segment a reverse text-character region, in which the relationship between the page-background lightness and text-character lightness is reversed, into text-character pixels and background pixels.

The present invention is made in view of such circumstances, and has an object to provide an image processing apparatus, an image forming apparatus, an image processing method, a computer program and a computer-readable medium that can surely extract the foreground pixels even from input image data representing a complex layout, such as an image in which a text character image is drawn on the localized background color and an image containing a reverse text-character region.

In an aspect of the present invention, it is configured that a calculated background dominant color and a foreground dominant color calculated from a foreground pixel block are utilized for extracting foreground pixels while a foreground pixel block configuring a foreground of an image is extracted from input image data. Therefore, it is possible to efficiently extract foreground pixels from input image data. In addition, it is configured that a text string region is extracted from input image data for extracting foreground pixels. Thus, it is possible to perform a quantization process (indexing process) for color information and the like by each text string region. Hence, it is possible to treat color information, such as a foreground dominant color, by each text string region, but not by a region (e.g., each pixel block) generated by hyper-segmentation of input image data. Therefore, it is possible to surely extract foreground pixels.

In an aspect of the present invention, it is configured that a line is extracted from input image data and a pixel block configuring the line (region in which foreground pixels are straightly aligned in the horizontal direction or the vertical direction) is excluded for the correction process from a foreground pixel block mask. Thus, the line can be excluded from extraction objects for foreground pixels, and only text characters can be treated as the foreground pixels. Therefore, it is possible to enhance the compression rate for compressing input image data. In addition, because the line is treated as a background, it is possible to prevent a shaggy and the like and to enhance the image quality. In addition, a table in an image can be detected in accordance with the extracted lines, and a text string in the table can also be extracted. Therefore, it is possible to enhance the precision for extracting the text string region.

In an aspect of the present invention, it is configured that input image data is segmented into pixel blocks, each of which has a predetermined size, and a determination process is performed whether each pixel block is an uniform density pixel block or not. The pixel block determined not to be the uniform density pixel block is further segmented into pixel blocks, each of which has a smaller size, and a further determination process is performed whether each smaller pixel block is an uniform density pixel block or not. As described above, it is configured to repeat the segmentation process for pixel block and the determination process for uniform density pixel block until the size of pixel block reaches to a predetermined size, and to utilize the final determination result as the extraction result for uniform density pixel block. Thus, it is possible to perform processes, such as a process of extracting a foreground pixel block and a process of calculating a foreground dominant color, while referring to not only a wide region but also a local region of input image data. Therefore, it is possible to precisely calculate the background dominant color, foreground dominant color and the like.

In an aspect of the present invention, it is configured that a text string direction in the horizontal direction or the vertical direction is estimated in accordance with a distance between foreground regions and a number of connected foreground regions, and foreground regions connected in the estimated direction are merged to be extracted as the text string region. Therefore, it is possible to enhance the precision for extracting the text string region from input image data.

In an aspect of the present invention, it is configured to detect a pixel for which a difference value between a foreground dominant color and a background dominant color of the text string region satisfies a predetermined condition, and to extract the detected pixel as the foreground pixel. Therefore, it is possible to surely extract the foreground pixel from input image data in accordance with the foreground dominant color and the background dominant color.

In an aspect of the present invention, it is configured that foreground dominant colors for a text string region in each page of input image data are merged when image data for each page is input. Therefore, it is possible to reduce the number of colors regarding the foreground image, and to reduce the number of indexes when the indexing process is performed on color information.

In an aspect of the present invention, it is configured that a compression technique for compressing data (foreground layer) regarding the foreground pixel extracted from the input image data is different from a compression technique for the other data (background layer). Therefore, it is possible to increase the compression rate of the input image data.

In the present invention, it may be configured that a foreground pixel is extracted in accordance with the background dominant color calculated while extracting the foreground pixel block from the input image data, the foreground dominant color calculated from the foreground pixel block, and the text string region extracted from the input image data based on the foreground dominant color and the background dominant color. Thus, the foreground pixel can be extracted efficiently and color information can be treated by each text string region. Hence, it is possible to surely extract the foreground pixel. Therefore, it is possible even from an image whose layout is complex to surely extract the foreground pixel. Furthermore, it is possible to enhance the compression rate of an image, because the image can be surely segmented into the foreground layer and the background layer and then a suitable compression technique can be utilized for compressing each image.

The above and further objects and features of the invention will more fully be apparent from the following detailed description with accompanying drawings.

BRIEF DESCRIPTION OF THE DRAWINGS

FIG. 9 is a schematic view for explaining a process performed by an up-sampling process member.

DESCRIPTION OF THE PREFERRED EMBODIMENT

Hereinafter, an embodiment of the present invention is described in detail with reference to the figures. It should be noted that this embodiment is described in the context of a digital color multi-function printer (hereinafter, it is called as a multi function peripheral [MFP]). While the MFP is provided with various functions, such as a color copying function, a color printing function and a color scanning function, the technique of the present invention can be applied for e.g. compressing a color image obtained by reading a color document. For example, the technique of the present invention is suitable for the color copying function and the color scanning function of the MFP. In addition, while the color scanning function of the MFP includes: an image data sending function for compressing color image data obtained by reading a color document and for sending the compressed color image data to another apparatus; a saving function for storing compressed color image data in a memory contained in the MFP; and the like, the technique of the present invention is suitable for compressing image data regarding these functions.

Figure 1:
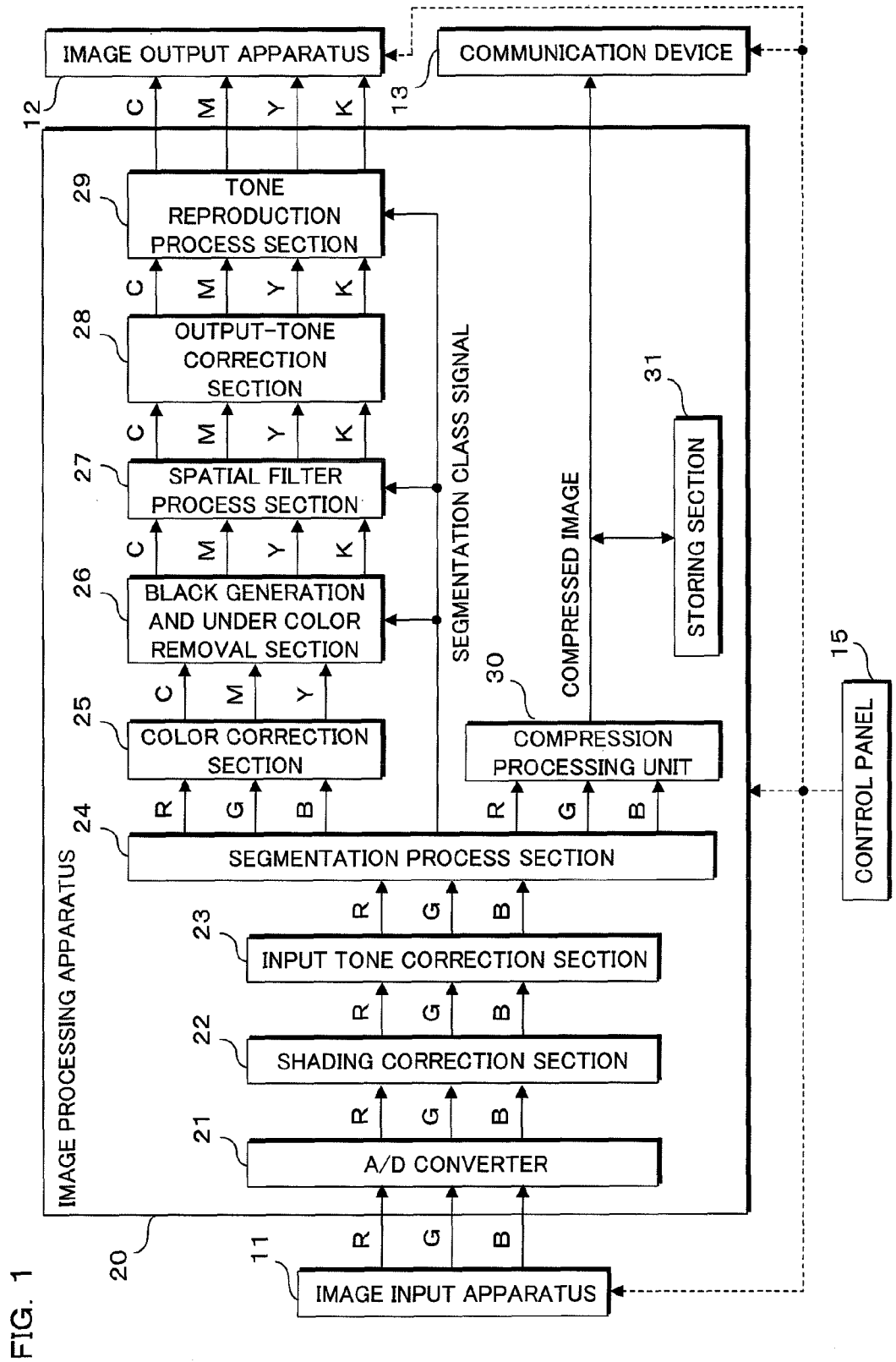
FIG. 1 is a block diagram showing a configuration of a MFP according to the present invention.

FIG. 1 is a block diagram showing a configuration of the MFP according to the present invention. The MFP according to the present invention includes an image input apparatus 11, an image output apparatus 12, a communication device 13, a control panel 15, an image processing apparatus 20 and the like. The control panel 15 is provided with several types of hardware keys, such as setting buttons and numeric keypads for setting operation modes of the MFP or the like, a start key for accepting an instruction to start a process, a power-supply switch, several function keys and the like. In addition, the control panel 15 is provided with a display that shows an operating condition of the MFP, a warning message for a user, several menus for supporting user's manipulation and the like. A touch panel may be provided on the display, instead of the hardware keys for accepting user's manipulation. The control panel 15 sends the accepted instruction, the accepted setting or the like to the image input device 11, the image output device 12, the communication device 13 and the image processing apparatus 20. Thus, each apparatus and device can perform a process based on the accepted instruction, the accepted setting or the like.

The image input device 11 is configured with; a light source that emits light to a document; and a scanner including a photodetector in which image sensors, such as charge coupled device (CCD), are aligned in parallel with each other. The image input device 11 emits light from the light source to a document, separates the light reflected from the document into three color components, i.e., red (R), green (G) and blue (B) analog signal, and convey the RGB analog signal to the image processing apparatus 20.

The image processing apparatus 20 includes an A/D converter 21, a shading correction section 22, an input tone correction section 23, a segmentation process section 24, a color correction section 25, a black generation and under color removal section 26, a spatial filter process section 27, an output-tone correction section 28, a tone reproduction process section 29, a compression processing unit 30, a storing section 31, and the like. The RGB analog signal input from the image input device 11 is processed by the A/D converter 21 to the tone reproduction process section 29 of the image processing apparatus 20 and then output to the image output device 12, or is processed by the A/D converter 21 to the segmentation process section 24 and the compressing unit 30 of the image processing apparatus 20 and then output to the communication device 13.

The A/D converter 21 is utilized for converting an RGB analog signal obtained from the image input device 11 into, for example, eight-bit digital image data, and for conveying the converted RGB image data to the shading correction section 22. The shading correction section 22 performs a shading process on the RGB image data obtained from the A/D converter 21, and conveys the RGB image data after the shading process to the input tone correction section 23. The shading process is for removing several distortions generated in a lighting system, an image focusing system, an image sensing system, and the like.

The input tone correction section 23 performs a color balance adjustment process, a contrast adjustment process and the like on the RGB image data in which distortions have been removed by the shading correction section 22 (RGB reflectance signal), and converts a density (pixel value) signal, and conveys the processed RGB image data to the segmentation process section 24.

The segmentation process section 24 determines whether each pixel of the RGB image data obtained from the input tone correction section 23 is separated into a text region configured by a text image, into a halftone region configured by a halftone image, or into a photograph region configured by a photograph image, for each pixel. The segmentation process section 24 sends a segmentation class signal representing the information about which one of the regions each pixel is belonged to the black generation and under color removal section 26, the spatial filter process section 27 and the tone reproduction process section 29. Furthermore, the segmentation process section 24 directly conveys the RGB image data obtained from the input tone correction section 23 to the color correction section 25 and the compression processing unit 30.

The color correction section 25 converts the RGB image data obtained from the segmentation process section 24 into image data having a color space configured with cyan (C), magenta (M), and yellow (Y), and performs a color correction process on each of CMY color components for the faithful color reproduction. Particularly, the color correction process is for removing a color impurity based on the spectral characteristic of toners or inks including useless absorption component, from CMY color components. The color correction section 25 conveys the converted CMY image data to the black generation and under color removal section 26.

Based on the segmentation class signal obtained from the segmentation process section 24 and the each color component of the CMY image data obtained from the color correction section 25, the black generation and under color removal section 26 performs a black generation process for generating a color component of black (K), and generates a new CMY image data in which the K component generated by the black generation process is removed from the original CMY color components. Thus, the CMY image data obtained from the color correction section 25 is converted into image data having four color components, i.e., CMYK color components.

For example, in the case that the black generation process is performed by the skeleton black technique, it is assumed that a formula "y=f(x)" corresponds to the input-output characteristics of skeleton curve, pixel values of an input image are "C", "M" and "Y", output pixel values are "C'", "M'", "Y'" and "K'", and the under color removal rate (UCR rate) corresponds to α (0<α<1). In that assumed case, the black generation and under color removal process is expressed by the following formula. After converted by the black generation and under color removal process performed by the black generation and under color removal section 26, the converted CMYK image data is conveyed to the spatial filter process section 27.

$K' = f\{min(C,M,Y)\}$ $C' = C - \alpha K'$ $M' = M - \alpha K'$ $Y' = Y - \alpha K'$ Based on the segmentation class signal obtained from the segmentation process section 24, the spatial filter process section 27 performs a spatial filter process by a digital filter on the CMYK image data obtained from the black generation and under color removal section 26. The characteristic of spatial frequency for the image is corrected, and it is possible to prevent the blur, the granularity degradation and the like from occurring on the image output by the image output device 12. The output-tone correction section 28 performs an output-tone correction process, based on the output characteristics of the image output device 12, onto the CMYK image data on which the spatial filter process is performed by the spatial filter process section 27, and then the processed CMYK image data is conveyed to the tone reproduction process section 29.

Based on the segmentation class signal obtained from the segmentation process section 24, the tone reproduction process section 29 performs a tone-reproduction process on the CMYK image data obtained from the output-tone correction section 28. The tone-reproduction process is a process in order to reproduce the halftone. The binarization or multi-level dithering technique, error diffusion technique or the like can be utilized for the tone-reproduction process.

For example, the spatial filter process section 27 may perform an edge enhancement filtering process on the region segmented into the text region by the segmentation process section 24 to enhance the high frequency component, especially for improving the reproducibility of black text or color text.

For example, the spatial filter process section 27 may perform a low-pass filtering process on the region determined as the halftone region by the segmentation process section 24 to remove the input halftone component.

For example, the tone reproduction process section 29 may perform the binarizing process or multi-level dithering process on the region determined as the picture-image region by the segmentation process section 24, with the screen suitable for the tone reproduction performed by the image output device 12.

After temporarily stored by a storing section, such as an image memory (not shown), the CMYK image data on which the process has been performed by the tone reproduction process section 29 is read out from the storing means based on the timing of image forming, and is conveyed to the image output device 12. The image output device 12 is a printer, with an electrographic method, an inkjet method or the like, utilized for outputting the obtained image data onto a recording medium, such as a paper. For example, the image output device 12 with the electrographic method includes: a charger that charges a photoreceptor to be at a predetermined electric potential; a laser scanning unit that emits laser light in response to the obtained image signal and generates an electrostatic latent image on the surface of the photosensitive drum; a developing unit that supplies toners to the electrostatic latent image generated on the surface of the photosensitive drum to form a toner image; a transfer unit that transfers the toner image, formed on the surface of the photosensitive drum, onto a paper; and the like. It should be noted that the image output device 12 may be a display device, such as a monitor display.

The compression processing unit 30 of the image processing apparatus 20 performs a compression process for reducing the data size onto the RGB image data obtained from the segmentation process section 24, and stores the compressed image data in the storing section 31. The storing section 31 is configured with larger storage elements, such as a hard disk or a flash memory. The image data stored in the storing section 31 is conveyed to the communication device 13.

The communication device 13 includes one or more communication hard ware, such as a network card or a modem, and utilizes these communication means for sending image data to another apparatus. For example, in the case that an operation mode of the MFP is set through the control panel 15 for sending e-mail, the communication device 13 attaches the image data stored in the storing section 31 to an e-mail and then sends the e-mail to a previously set destination. For example, in the case of performing the facsimile communication, the communication apparatus 13 performs a communication procedure with a designated destination through a modem to assure a condition capable of facsimile communication, and then reads out the image data, which is read by the image input device 11 and compressed in a predetermined format, from the storing section 31. A process required for the facsimile communication, such as a conversion of compression format, is performed on the read out image data, and then the processed image data is sequentially sent to the set other party through the communication line.

As not shown in figures, the communication device 13 may be provided with a function as a receiver device that receives image data sent through the facsimile communication from an originating communication device. In that case, the communication device 13 receives image data sent from another apparatus and conveys the received image data to the image processing apparatus 20, while performing the communication procedure. The image processing apparatus 20 performs an expansion (decoding) process on the received image data, adequately performs an image processing on the expanded image data, such as a rotation process and a resolution-conversion process, makes the output-tone correction section 28 perform the tone correction process, makes the tone reproduction process section 29 perform the tone-reproduction process, and then outputs the processed image data to the image output device 12. Thus, it is possible to output and form the image data received by the communication device through the facsimile communication.

In addition, the communication device 13 can perform data communication with another computer connected to a network, such as a local area network (LAN) or another apparatus having a communication function, such as another MFP, through the network card, the network cable and the like. Therefore, the MFP can send the image data read by the image input device 11 to another apparatus to save the image data in another apparatus, and can obtain the image data from another apparatus to output the obtained image data through the image output device 12.

It should be noted that the MFP mounts a central processing unit (CPU) not shown in figures and the CPU controls each unit and section for performing several processes, such as the image forming process and the image sending process described above.

The compression processing unit 30 segments the input image data, which is conveyed from the image input device 11 and processed by the A/D converter 21 to the segmentation process section 24, into the foreground layer and the background layer. The foreground layer contains a text character, a line art and the like, whereas the background layer is configured with an image excluding the text character and the line art. The compression processing unit 30 performs an indexing process for the pixel color of the foreground layer segmented from the input image data, and finally performs a compression process with the lossless compression technique, such as JBIG, MMR or LZW. Furthermore, the compression processing unit 30 performs a compression process on the background layer with the lossy compression technique, such as JPEG.

Figure 2:
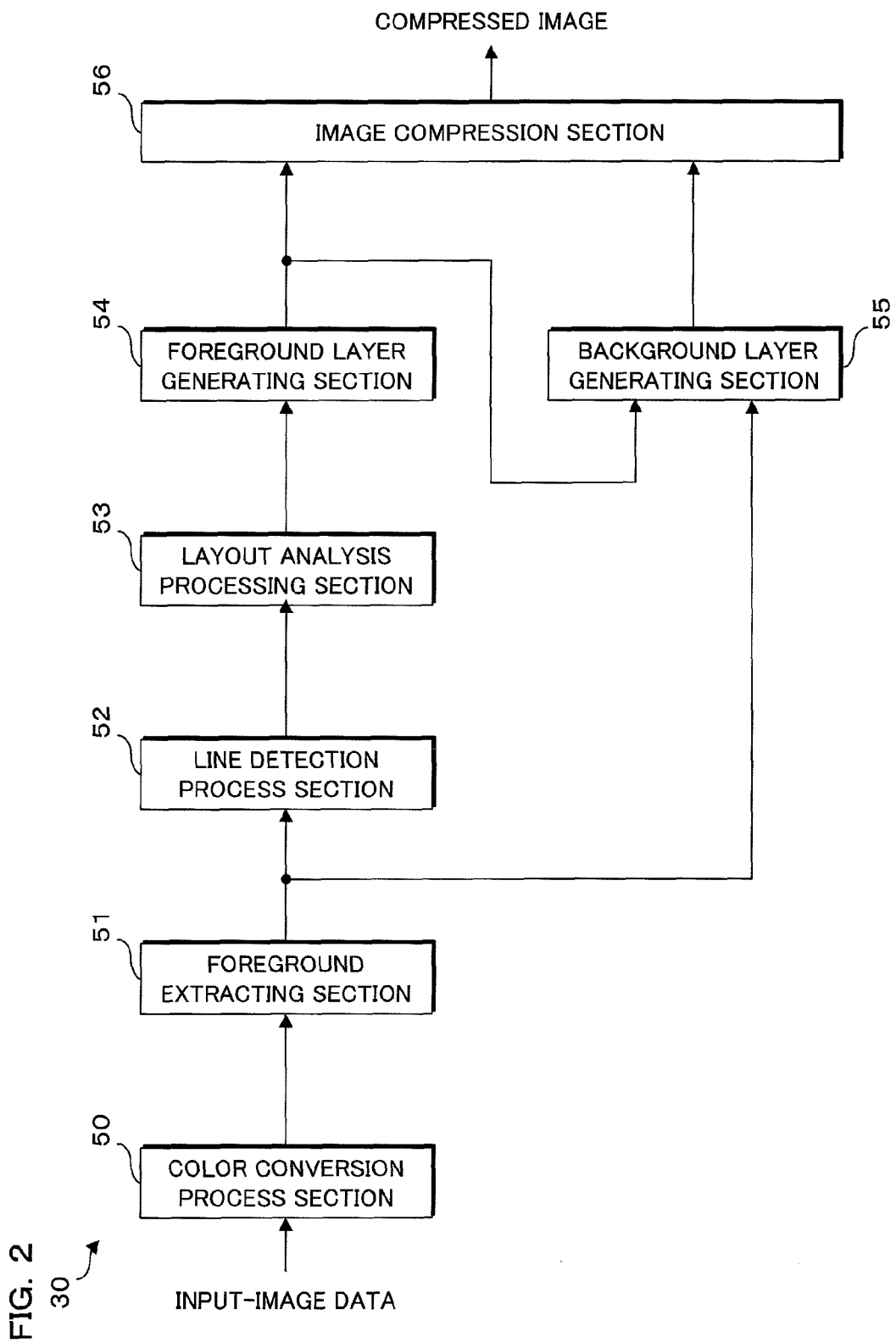
FIG. 2 is a block diagram showing a configuration of a compression processing unit of an image processing apparatus.

The compression processing unit 30 separates each pixel of the foreground layer into plural masks in which each pixel is converted to one bit data, and into color information for each mask. Then, the compression processing unit 30 compresses the each mask by the lossless compression technique and the color information for each mask by the lossless compression technique or the lossy compression technique. Therefore, it is possible to enhance the compression rate, in comparison with the case of directly compressing the foreground layer having plural bits of pixel values FIG. 2 is a block diagram showing a configuration of the compression processing unit 30 of the image processing apparatus 20. The compression processing unit 30 includes a color conversion process section 50, a foreground extracting section 51, a line detection process section 52, a layout analysis processing section 53, a foreground layer generating section 54, a background layer generating section 55, an image compression section 56 and the like.

The color conversion process section 50 obtains RGB image data (input image) input from the compression processing unit 30, converts the RGB image data into YCbCr image data and outputs the converted YCbCr image data. For example, the color conversion process section 50 utilizes a matrix operation formula described below for converting the color space of image data. Alternatively, the compression processing unit 30 may perform the process described later on the RGB image data without the conversion process performed by the color conversion process section 50, or may convert the RGB image data into the image data with CIE1976L*a*b* color space (CIE: Commission International de l'Eclairage, L*: lightness, and a* and b*: chromaticity) and then perform the process described later on the converted image data.

$$\begin{pmatrix} Y \\ Cb \\ Cr \end{pmatrix} = \begin{pmatrix} 0.29891 & 0.58661 & 0.11448 \\ -0.16874 & -0.33126 & 0.50000 \\ 0.50000 & -0.41869 & -0.08131 \end{pmatrix} \begin{pmatrix} R \\ G \\ B \end{pmatrix} + \begin{pmatrix} 0 \\ 128 \\ 128 \end{pmatrix} \quad \text{[Formula 1]}$$

The foreground extracting section 51 obtains image data from the color conversion process section 50, segments the obtained image data into plural pixel blocks, and extracts a background dominant color of the input image data for each pixel block (pixel-block background dominant color). While comparing the extracted pixel-block background dominant color and the input image data, the foreground extracting section 51 generates mask information (foreground pixel-block mask) and calculates a foreground dominant color for each pixel block (pixel-block foreground dominant color). The foreground pixel-block mask is for representing whether each pixel block of the input image data is a pixel block corresponding to the foreground (foreground pixel block). The generated foreground pixel-block mask generated by the foreground extracting section 51 and the pixel-block foreground dominant color and the pixel-block background dominant color calculated by the foreground extracting section 51 are conveyed to the line detection process section 52 and the background layer generating section 55 (see (1) foreground extracting section 51 described later, for details).

Based on the foreground pixel-block mask output from the foreground extracting section 51, the line detection process section 52 detects a line configuring a horizontal line, vertical line, table or the like in the input image data, and outputs the detection result as line information to the layout analysis processing section 53. Based on the line detection result, the line detection process section 52 additionally removes a line portion from the foreground pixel-block mask and then outputs the processed foreground pixel-block mask (see (2) line detection process section 52 described later, for details).

Based on the foreground pixel-block mask output from the foreground extracting section 51 and the line information output from the line detection process section 52, the layout analysis processing section 53 generates information regarding a text string region in the input image data (text string region information), and outputs the text string region information to the foreground layer generating section 54 (see (3) layout analysis processing section 53 described later, for details).

The foreground layer generating section 54 utilizes: the input image data; the pixel-block background dominant color and the pixel-block foreground dominant color output from the foreground extracting section 51; the foreground pixel-block mask corrected by the line detection process section 52; and the text string region information output from the layout analysis processing section 53, to generate a foreground pixel mask that represents whether the each pixel of the input image data is the foreground pixel or not, and foreground index-color information in which the indexing process is performed for the foreground pixel color. Based on the generated foreground pixel mask and the generated foreground index-color information, the foreground layer generating section 54 generates a binary image (foreground layer) corresponding to each foreground index color, and a table containing the information regarding the foreground index color (see (4) foreground layer generating section 54 described later, for details).

The background layer generating section 55 is for generating a background layer by removing foreground pixels from the input image data, and covers a foreground pixel portion of input image data with background pixels around the foreground pixel portion. Particularly, the background layer generating section 55 searches a portion corresponding to the foreground pixels of the input-data while referring to the foreground layer output from the foreground layer generating section 54, covers the portion corresponding to the foreground pixels with pixel values (average value or the like) of the background pixels around this corresponding portion, and thus generates the background layer. At that time, the background layer generating section 55 may cover the corresponding portion with pixel values utilized for covering an adjacent portion to be covered, if there are no background pixels around this corresponding portion. Alternatively, the background layer generating section 55 may cover the corresponding portion with the pixel-block foreground dominant color output from the foreground extracting section 51 (in that alternative case, the pixel-block foreground dominant color may be utilized for covering only when there are small differences between the pixel-block foreground dominant color output from the foreground extracting section 51 and the pixel values of the background pixels around the corresponding portion). It is possible to enhance the compression rate of the background layer because the background layer generating section 55 can cover the portion corresponding to the foreground pixels (see (5) background layer generating section 55 described later, for details).

The image compression section 56 performs a process for reducing the data volume of image data, in which the foreground layer generated by the foreground layer generating section 54 is compressed by a compression technique suitable for the foreground layer and the background layer generated by the background layer generating section 55 is compressed by a compression technique suitable for the background layer. For example, the image compression section 56 compresses the foreground layer by MMR that is the lossless-compression technique, and compresses the background layer by JPEG that is the lossy-compression technique. The compression techniques, such as MMR and JPEG, are well known, and thus the explanation for these compression techniques not described here. The image compression section 56 compresses not only the foreground layer and the background layer but also the table containing the information regarding the foreground index color.

As described above, the compression processing unit 30 outputs image data whose foreground layer and background layer have been compressed by the image compression section 56. The image data compressed by the compression processing unit 30 is stored in the storing section 31 of the image processing apparatus 20, and sent to another apparatus by the communication device 13 through a means, such as an e-mail, facsimile communication or the like.

Next, it will be described about the process performed by each section of the compression processing unit 30.

(1) Foreground Extracting Section 51

Figure 3:
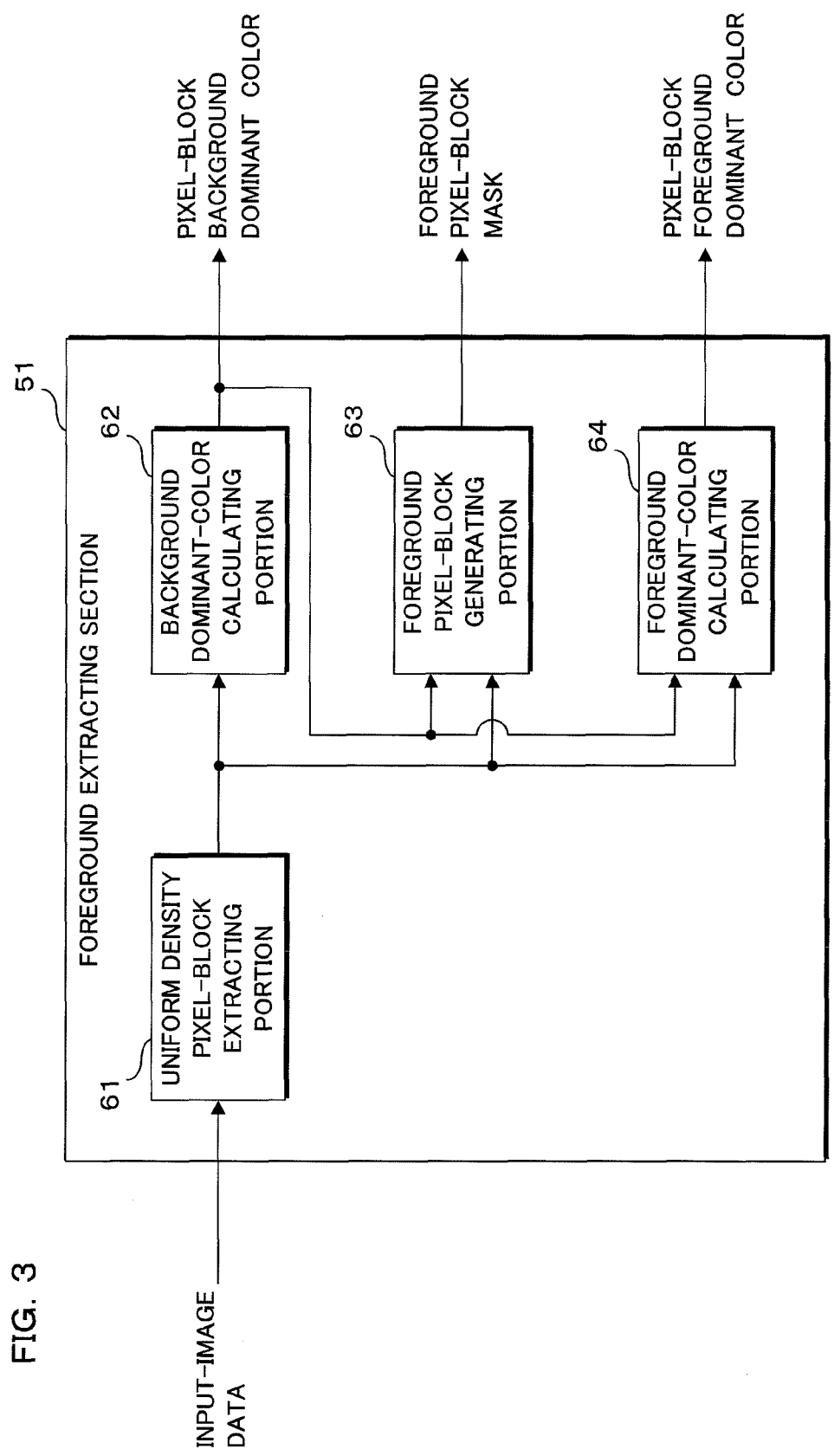
FIG. 3 is a block diagram showing a configuration of a foreground extracting section.
Figure 4:
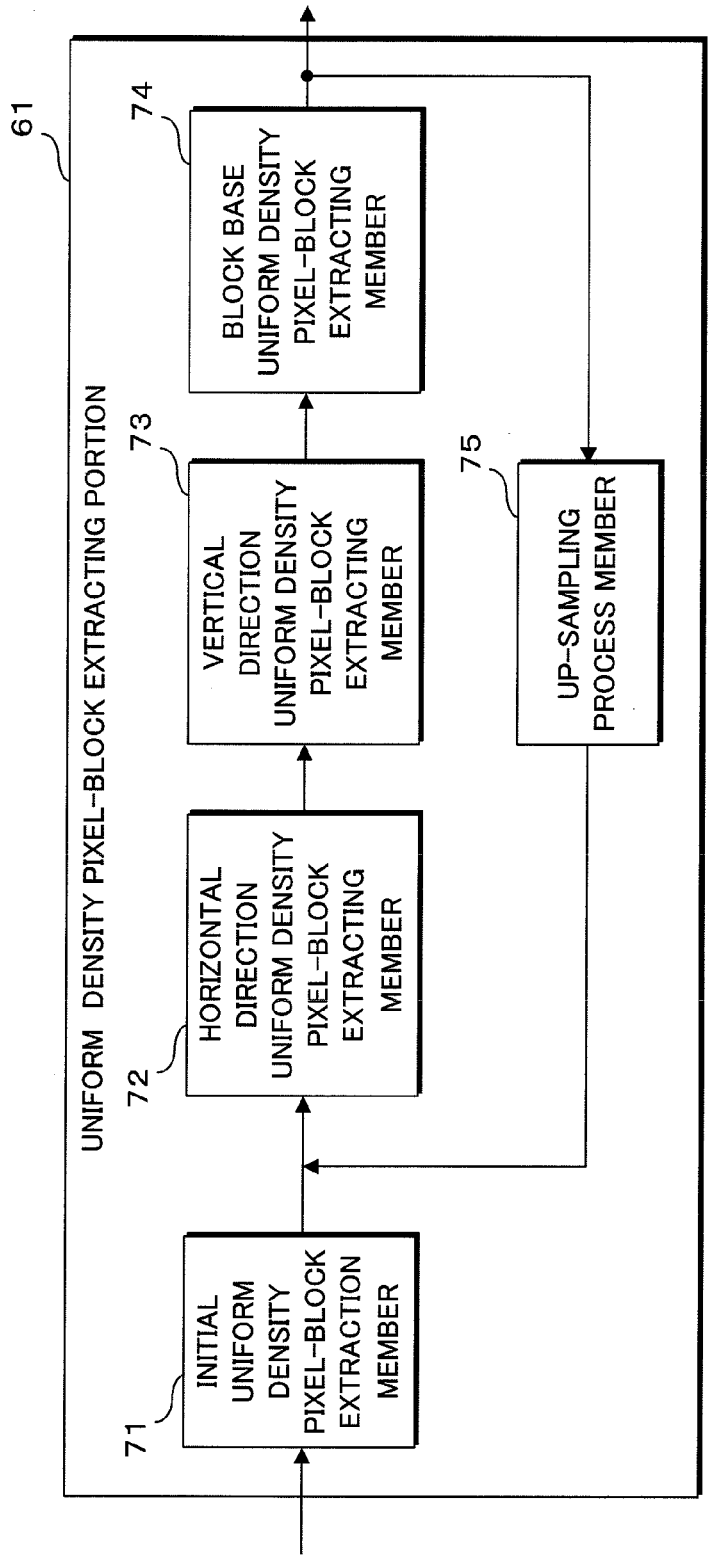
FIG. 4 is a block diagram showing a configuration of an uniform density pixel-block extracting section.

FIG. 3 is a block diagrams showing configurations of the foreground extracting section 51. FIG. 4 is a block diagram showing configurations of the uniform density pixel-block extracting portion 61. The foreground extracting section 51 performs an image processing for generating the foreground pixel-block mask from the input image data, and an image processing for calculating the pixel-block foreground dominant color and the pixel-block background dominant color. For these image processes, the foreground extracting section 51 includes an uniform density pixel block extracting portion 61, a background dominant color calculating portion 62, a foreground pixel-block generating portion 63 and a foreground dominant-color calculating portion 64.

The uniform density pixel block extracting portion 61 of the foreground extracting section 51 segments the input image data into pixel blocks (image regions), each of which has a predetermined size, finds a pixel block among plural pixel blocks of the input image data in which the difference between the pixel values of pixels is smaller than a predetermined value, categorizes the found pixel block as an uniform density pixel block (uniform density region) and categorizes a pixel block other than the uniform density pixel block as a foreground pixel block (change region), in order to extract the foreground pixel block. For these processes, the uniform density pixel block extracting portion 61 includes an uniform density pixel block initial extraction member 71, a horizontal direction uniform density pixel-block extracting member 72, a vertical direction uniform density pixel-block extracting member 73, a block base uniform density pixel-block extracting member 74, and an up-sampling process member 75.

The uniform density pixel block initial extraction member 71 refers the pixel values of all pixels in each pixel block, calculates the difference between the maximum pixel value and the minimum pixel value, find a pixel block whose calculated difference is smaller than a predetermined value, and extracts the found pixel block as a candidate of the uniform density pixel block (hereinafter, uniform density pixel-block candidate). The uniform density pixel block initial extraction member 71 conveys the extracted uniform density pixel-block candidate to the horizontal direction uniform density pixel-block extracting member 72, the vertical direction uniform density pixel-block extracting member 73, and the block base uniform density pixel-block extracting member 74, sequentially.

The horizontal direction uniform density pixel-block extracting member 72 searches for plural uniform density pixel-block candidates neighboring (sequenced) with each other in a parallel direction of the input image data, and calculates the number of found neighboring candidates. When the number of found neighboring candidates is more than a predetermined value, it is determined that the found plural uniform density pixel-block candidates neighboring with each other are the uniform density pixel blocks.

Similarly, the vertical direction uniform density pixel-block extracting member 73 searches plural uniform density pixel-block candidates neighboring (sequenced) with each other in a vertical direction of the input image data, and calculates the number of found neighboring candidates. When the number of found neighboring candidates is more than a predetermined value, it is determined that the found plural uniform density pixel-block candidates neighboring with each other are the uniform density pixel blocks.

The block base uniform density pixel-block extracting member 74 searches whether pixel blocks around each pixel block of the input image data are uniform density pixel blocks, uniform density pixel-block candidate or not. Then, the block base uniform density pixel-block extracting member 74 determines that a pixel block around which more than a predetermined number of uniform density pixel blocks or uniform density pixel-block candidates exist is the uniform density pixel block.

Once the uniform density pixel block initial extraction member 71 extracts the uniform density pixel block candidate, the uniform density pixel block extracting portion 61 repeats the extraction process of the uniform density pixel block performed by the horizontal direction uniform density pixel-block extracting member 72, the vertical direction uniform density pixel-block extracting member 73 and the block base uniform density pixel-block extracting member 74.

For example, the uniform density pixel block extracting portion 61 segments the input image data into pixel blocks, each of which has 16 pixels×16 pixels (hereinafter, simply referred to as the 16×16 pixel block). After the uniform density pixel block initial extraction member 71 determines whether each of the 16×16 pixel blocks is the uniform density pixel block candidate or not, it is determined by the horizontal direction uniform density pixel-block extracting member 72, the vertical direction uniform density pixel-block extracting member 73, and the block base uniform density pixel-block extracting member 74 whether the determined uniform density pixel-block candidate is the uniform density pixel block or not.

Then, the 16×16 pixel block determined to be the uniform density pixel block is segmented by the up-sampling process member 75 of the uniform density pixel block extracting portion 61 into pixel blocks, each of which has a smaller size, for example 8 pixels×8 pixels (hereinafter, simply the 8×8 pixel block). It is determined by the horizontal direction uniform density pixel-block extracting member 72, the vertical direction uniform density pixel-block extracting member 73 and the block base uniform density pixel-block extracting member 74 whether each of the 8×8 pixel blocks is the uniform density pixel block or not. As described above, the uniform density pixel block extracting portion 61 repeats segmenting the input image data and extracting the uniform density pixel block, until the size of each pixel block becomes a predetermined size (for example, 4×4 pixel block). Then, the uniform density pixel block extracting portion 61 finds a pixel block that has been determined as the uniform density pixel block even at one time, categorizes the found pixel blocks as the uniform density pixel block group, and categorizes the other pixel blocks as the foreground pixel block group.

Figure 5C:
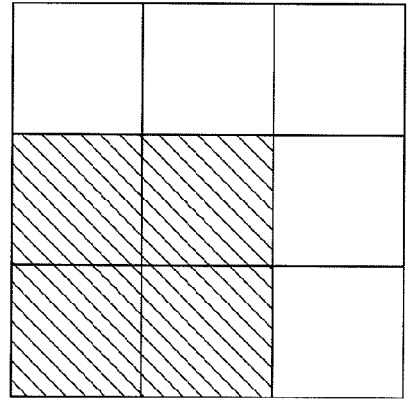
FIGS. 5A-5F are schematic views for explaining a process performed by an initial pixel-block extraction member.
Figure 5F:
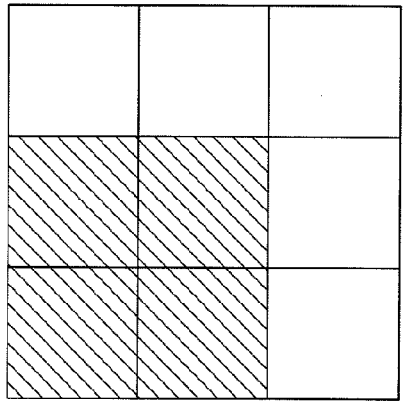
Figure 5B:
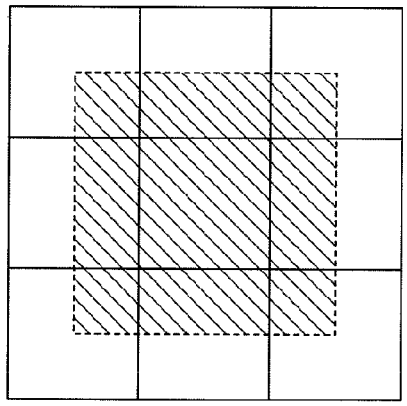
Figure 5E:
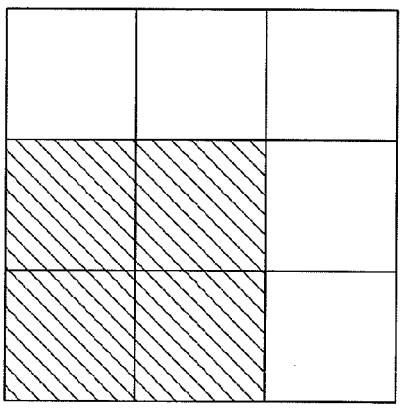
Figure 5A:
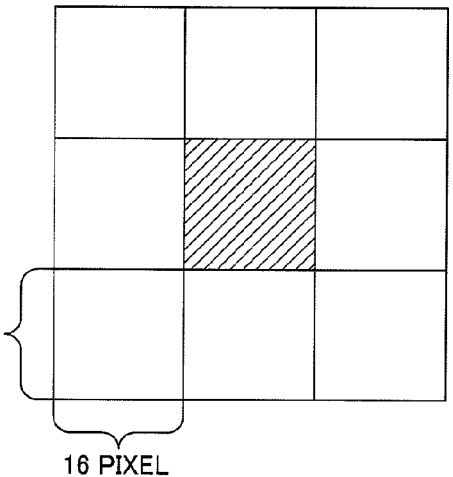
Figure 5D:
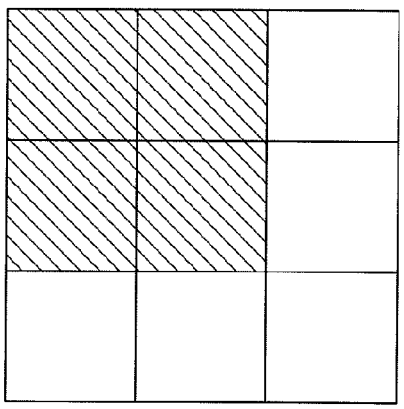

FIG. 5A-5F are schematic views for explaining a process performed by the uniform density pixel block initial extraction member 71 and illustrate to segment the input image data into 16×16 pixel blocks and to determine whether each of the 16×16 pixel blocks is the uniform density pixel block candidate or not. For example, when one of the 16×16 pixel blocks is the target to be processed as shown in FIG. 5A, the uniform density pixel block initial extraction member 71 sets the determination region of 32 pixels×32 pixels with plural patterns shown in FIG. 5B-5F, determines whether each determination region is uniform density or not, and determines in accordance with the determination results whether the target 16×16 pixel block is the uniform density pixel block candidate or not. At that time, the uniform density pixel block initial extraction member 71 can determine whether each determination region of 32 pixels×32 pixels is uniform density or not, based on whether the difference between the maximum pixel value and the minimum pixel value in each determination region is more than a predetermined value (e.g., 32) or not. When having determined that the determination regions of all patterns are uniform density, the uniform density pixel block initial extraction member 71 determines that the target 16×16 pixel block is the uniform density pixel block candidate. The uniform density pixel block initial extraction member 71 performs similar processes for all of the 16×16 pixel blocks in the input image data, and extracts all of the uniform density pixel block candidates in the input image data.

Figure 6A:
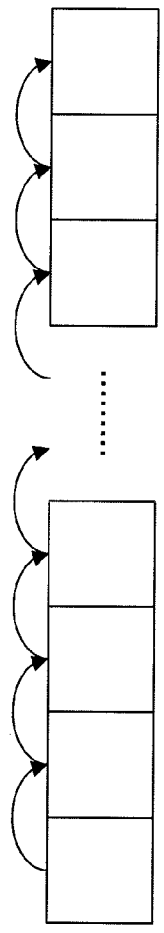
FIG. 6A and FIG. 6B are schematic views for explaining a process performed by a horizontal direction uniform density pixel-block extracting member.
Figure 6B:
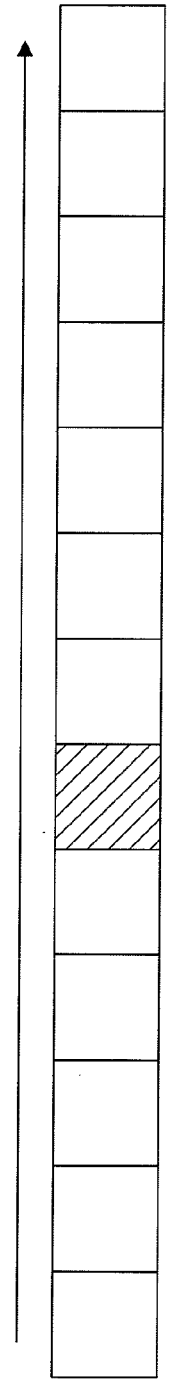

FIG. 6A and FIG. 6B are schematic views for explaining a process performed by the horizontal direction uniform density pixel-block extracting member 72. The horizontal direction uniform density pixel-block extracting member 72 counts the number of uniform density pixel-block candidates connected with each other in the horizontal direction of the input image data (see FIG. 6A). When the number of connected uniform density pixel-block candidates is more than a predetermined value, it is determined that these connected uniform density pixel-block candidates are uniform density pixel blocks.

It should be noted that the horizontal direction uniform density pixel-block extracting member 72 allows an intermittence of the connected uniform density pixel candidates within a predetermined range in counting the number of uniform density pixel-block candidates connected in the horizontal direction. The horizontal direction uniform density pixel-block extracting member 72 sequentially counts the number of connected uniform density pixel-block candidate in the horizontal direction. Even when having found pixel blocks which are not the uniform density pixel block candidate but whose connected number is less than a value in which a predetermined value (e.g., 0.3) are multiplied by the currently-counted number of the connected uniform density pixel-block candidates, the horizontal direction uniform density pixel-block extracting member 72 recognizes that the uniform density pixel block candidates are sequentially connected in the horizontal direction, and continues to count.

For example, when the horizontal direction uniform density pixel-block extracting member 72 has found a pixel block (hatched pixel block) succeeding the five uniform density pixel-block candidates connected in the horizontal direction as shown in FIG. 6B, the currently-counted number of the connected uniform density pixel-block candidates is 5 and the value in which a predetermined value (0.3) are multiplied by the currently-counted number is 1.5. The connected number of the pixel block which is not the uniform density pixel block candidate is smaller than 1.5. Thus, the horizontal direction uniform density pixel-block extracting member 72 allows the intermittence of the connected uniform density pixel-block candidates as shown in FIG. 6B, and continues to count the number of uniform density pixel-block candidates connected in the horizontal direction. Assume the case that there is an image in which a table is drawn and a uniform density image region is intermitted by a line art configuring the frame of the table. Even in the assumed case, it is possible to treat the intermitted image region as the uniform density region. Therefore, it is possible to surely extract the uniform density pixel block.

Figure 7A:
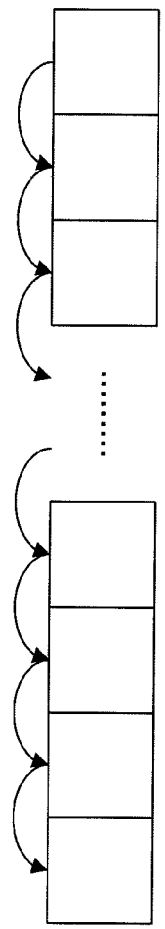
FIG. 7A and FIG. 7B are schematic views for explaining a process performed by a vertical direction uniform density pixel-block extracting member.
Figure 7B:
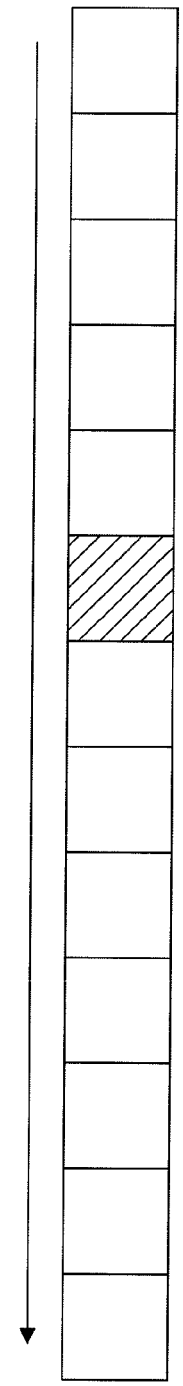

FIG. 7A and FIG. 7B are schematic views for explaining a process performed by the vertical direction uniform density pixel-block extracting member 73. The vertical direction uniform density pixel-block extracting member 73 counts the number of uniform density pixel-block candidates connected in the vertical direction of the input image data (see FIG. 7A). When the number of connected uniform density pixel-block candidates is more than a predetermined value, it is determined that these connected uniform density pixel-block candidates are uniform density pixel blocks.

It should be noted that the vertical direction uniform density pixel-block extracting member 73 allows an intermittence of the connected uniform density pixel candidates within a predetermined range for counting the numbers of uniform density pixel-block candidates connected in the vertical direction. The vertical direction uniform density pixel-block extracting member 73 sequentially counts the number of connected uniform density pixel-block candidate in the vertical direction. Even when having found pixel blocks which are not the uniform density pixel block candidate but whose connected number is less than a value in which a predetermined value (e.g., 0.3) are multiplied by the currently-counted number of the connected uniform density pixel-block candidates, the vertical direction uniform density pixel-block extracting member 73 recognizes that the uniform density pixel block candidates are sequentially connected in the vertical direction, and continues to count.

For example, when the vertical direction uniform density pixel-block extracting member 73 has found a pixel block (hatched pixel block) succeeding the five uniform density pixel-block candidates connected with one another in the vertical direction as shown in FIG. 7B, the currently-counted number of the connected uniform density pixel-block candidates is 5 and the value in which a predetermined value (0.3) are multiplied by the currently-counted number is 1.5. The connected number of the pixel block which is not the uniform density pixel block candidate is smaller than 1.5. Thus, the vertical direction uniform density pixel-block extracting member 73 allows the intermittence of the connected uniform density pixel-block candidates as shown in FIG. 7B, and continues to count the number of uniform density pixel-block candidates connected in the vertical direction. Assume the case that there is an image in which a table is drawn and a uniform density image region is intermitted by a line art configuring the frame of the table. Even in the assumed case, it is possible to treat the intermitted image region as the uniform density region. Therefore, it is possible to surely extract the uniform density pixel block.

Figure 8:
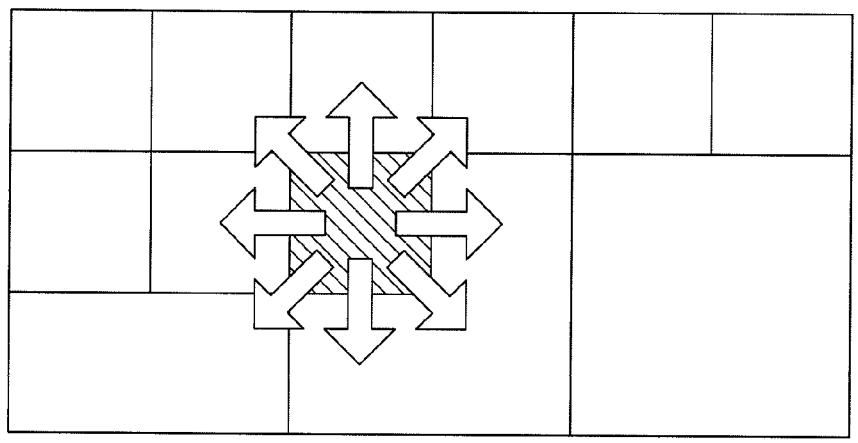
FIG. 8 is a schematic view for explaining a process performed by a block base uniform density pixel-block extracting member.
Figure 10A:
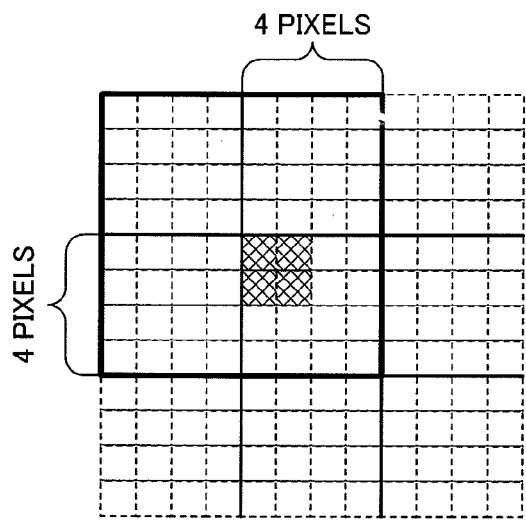
FIGS. 10A-10D are schematic views for explaining a process performed by a foreground pixel-block generating portion.
Figure 10B:
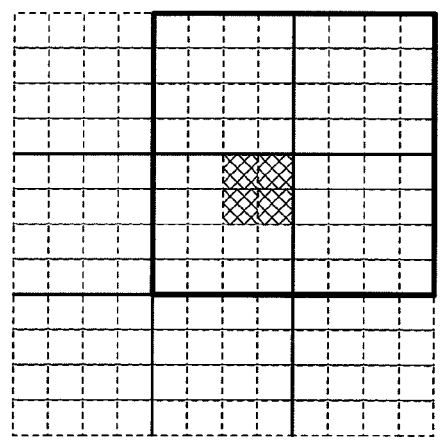
Figure 10C:
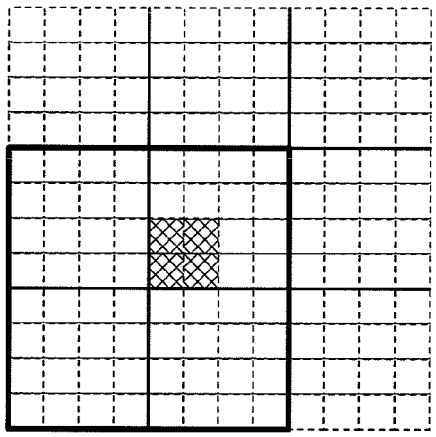
Figure 10D:
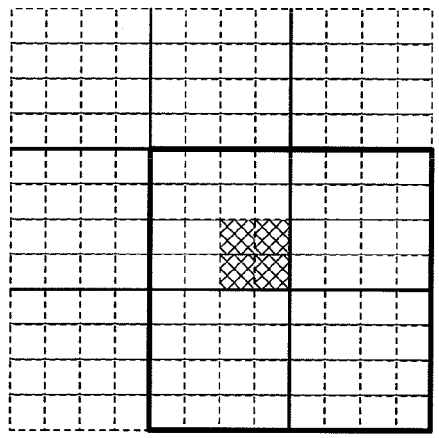

FIG. 8 is a schematic view for explaining a process performed by the block base uniform density pixel-block extracting member 74. The block base uniform density pixel-block extracting member 74 targets the pixel block extracted as the uniform density pixel block candidate (hatched block in FIG. 8), and calculates the average value (pixel average value) of pixel values in the targeted pixel block. Furthermore, the block base uniform density pixel-block extracting member 74 calculates the pixel average values of pixel blocks that exist around the targeted pixel block in the eight directions (see arrows in FIG. 8). Based on these calculation results, the block base uniform density pixel-block extracting member 74 selects a pixel block whose pixel average value is the nearest to the pixel average value of the targeted pixel block, and determines whether a difference between these two pixel average values is less than a predetermined value or not. When having determined that the difference between the pixel average value of the targeted pixel block and the pixel average value of the circumferential pixel blocks is less than a predetermined value, the block base uniform density pixel-block extracting member 74 categorizes these pixel blocks into the same pixel block group because it is understood that these pixel blocks belong to the same local (or global) background. The block base uniform density pixel-block extracting member 74 performs similar processes for all of the uniform density pixel block candidates in the input image data, obtains one or more pixel block groups, determines whether the number of pixel blocks in each pixel block group is more than a predetermined value or not, finds a pixel block in the pixel block group whose number of pixel blocks is determined to be more than the predetermined value, and then extracts the found pixel block as the uniform density pixel block.

FIG. 9 is a schematic view for explaining a process performed by the up-sampling process member 75. The up-sampling process member 75 performs a process for changing the size of segmented pixel block on the input image data having been processed by the horizontal direction uniform density pixel-block extracting member 72, the vertical direction uniform density pixel-block extracting member 73, and the block base uniform density pixel-block extracting member 74. For example, in the case that the input image data is segmented into 8×8 pixel blocks as shown in FIG. 9, the up-sampling process member 75 segments one 8×8 pixel block into four 4×4 pixel blocks. The up-sampling process member 75 conveys the input image data with the changed segment size to the horizontal direction uniform density pixel-block extracting member 72. The horizontal direction uniform density pixel-block extracting member 72, the vertical direction uniform density pixel-block extracting member 73, and the block base uniform density pixel-block extracting member 74 repeatedly perform similar processes on the input image data with the segment-size changed. Therefore, it is possible to enhance the precision for extracting the uniform density pixel block, because the process for extracting the uniform density pixel block is repeatedly performed while the size of pixel blocks is changed as described above.

The result of extracting the uniform density pixel block from the input image data by the uniform density pixel block extracting portion 61 is conveyed to the background dominant color calculating portion 62, the foreground pixel-block generating portion 63 and the foreground dominant-color calculating portion 64.

The background dominant color calculating portion 62 calculates the average pixel value for each uniform density pixel block extracted by the uniform density pixel block extracting portion 61, and outputs the calculated average pixel value for each pixel block as the pixel-block background dominant color.

The foreground pixel-block generating portion 63 compares the pixel value of the pixel block into which the input image data is segmented to be a predetermined size with the pixel-block background dominant color (the average pixel value of each uniform density pixel block) which is calculated by the background dominant color calculating portion 62. When the difference between these compared values is more than a predetermined value, the foreground pixel-block generating portion 63 extracts this pixel block as the foreground pixel block. The size of the pixel block to be extracted as the foreground pixel block is previously set, in accordance with the resolution of input data or the like, to such a size that the foreground pixels can be extracted. For example, the size of the pixel block can be set to become 2 pixels×2 pixels in the case that the resolution of the input image data is 300 dpi.

FIG. 10A-10D are schematic views for explaining a process performed by the foreground pixel-block generating portion 63, and illustrate an example where the uniform density pixel block extracting portion 61 extracts the uniform density pixel block that is the 4×4 pixel block, the background dominant color calculating portion 62 calculates the pixel-block background dominant color for the 4×4 pixel block, the foreground pixel-block generating portion 63 extracts the foreground pixel block that is the 2 pixels×2 pixels block (hereinafter, simply referred to as the 2×2 pixel block). The relationship between the 4×4 pixel block (the region separated by the narrow solid lines in FIG. 10A-10D) regarding the uniform density pixel block and the pixel-block background dominant color and the 2×2 pixel block (the hatched region in FIG. 10A-10D) regarding the foreground pixel block is considered to have four patterns as shown in the FIG. 10A-10D. In short, the 2×2 pixel block exists at an upper left position, a upper right position, a lower left position, or a lower right position of the 4×4 pixel block.

Based on the position of the target 2×2 pixel block, the foreground pixel-block generating portion 63 obtains pixel-block background dominant colors for four 4×4 pixel blocks around the target 2×2 pixel block (the regions surrounded by the bold solid lines in FIG. 10A-10D), and determines whether each of the differences between the pixel value of the 2×2 pixel block (each of four pixel values or average value of four pixel values) and four pixel-block background dominant colors is more than a predetermined value (e.g., 80) or not. When having determined that all of the differences are more than the predetermined value, the foreground pixel-block generating portion 63 determines that this 2×2 pixel block is the foreground pixel block.

The foreground pixel-block generating portion 63 performs the process described above for all of the 2×2 pixel blocks, extracts the foreground pixel block from the input image data, and outputs the extracted foreground pixel block as the foreground pixel-block mask. Therefore, it is possible to avoid detecting the boundary of the uniform density pixel block as the foreground pixel block, because the foreground pixel block is extracted as described above.

The foreground dominant-color calculating portion 64 compares the pixel value of the pixel block into which the input image data is segmented to have a predetermined size and the pixel-block background dominant color which is calculated by the background dominant color calculating portion 62, finds the pixel value at which the difference between these compared values is maximum, and then calculates the found pixel value as the foreground dominant color of this pixel block. For example, in the case that the pixel-block background dominant color is calculated for each 4×4 pixel block, the foreground dominant-color calculating portion 64 calculates the difference between the pixel value of each pixel in the 4×4 pixel block of the input image data and the pixel-block background dominant color regarding this 4×4 pixel block, determines whether the calculated difference is more than a predetermined value (e.g., 96) or not, obtains the pixel value with the largest difference among the pixel values for which the differences are more than the predetermined value, outputs the obtained pixel value as the pixel-block foreground dominant color. Therefore, the foreground dominant-color calculating portion 64 can utilize the simple calculation method for calculating the pixel-block foreground dominant color.

Based on the processes described above, the foreground extracting section 51 can generate or calculate the foreground pixel-block mask, the pixel-block foreground dominant color and the pixel-block background dominant color, and output these generated or calculated things to the line detection process section 52 and the background layer generating section 55.

(2) Line Detection Process Section 52

Figure 11:
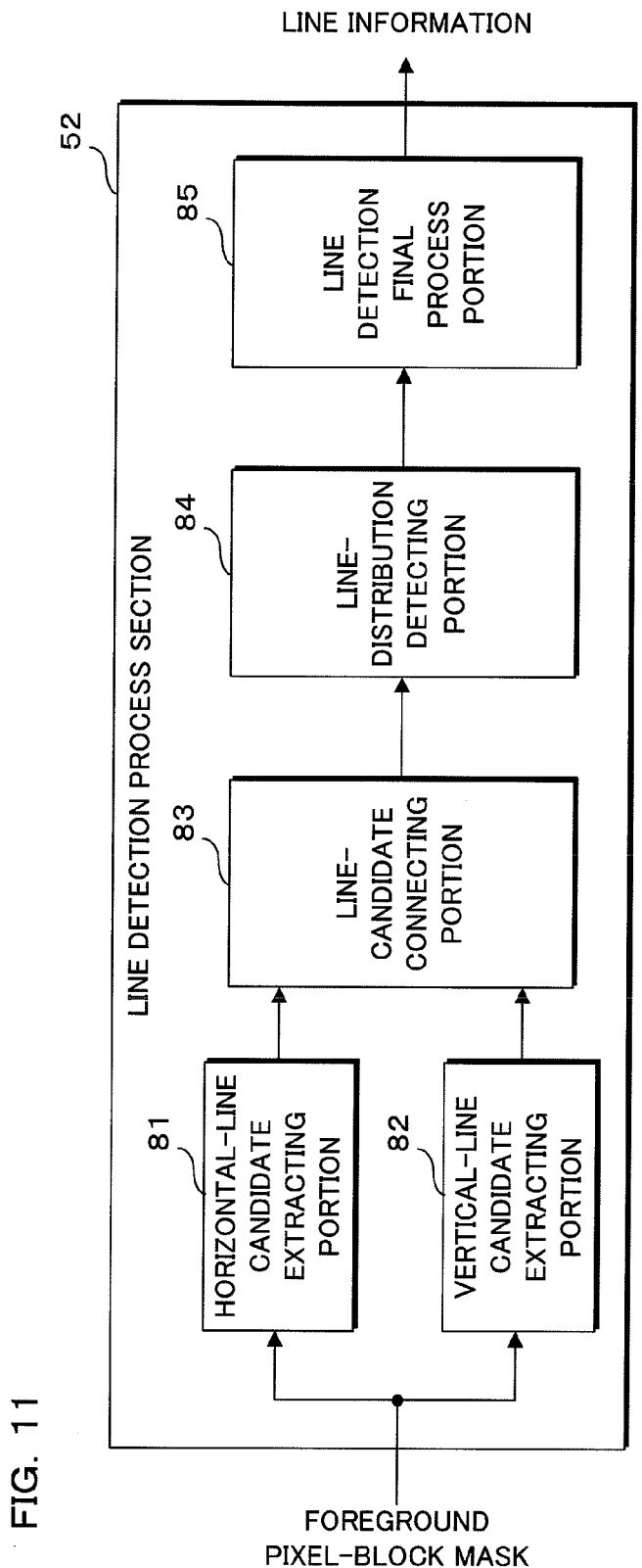
FIG. 11 is a block diagram showing a configuration of a line detection process section.

FIG. 11 is a block diagram showing a configuration of the line detection process section 52. The line detection process section 52 utilizes the foreground pixel-block mask generated by the foreground extracting section 51 for detecting the line art configuring a horizontal line, a vertical line, a table and the like in the input image. For this process, the line detection process section 52 includes a horizontal-line candidate extracting portion 81, a vertical-line candidate extracting portion 82, a line-candidate connecting portion 83, a line-distribution detecting portion 84 and a line detection final process portion 85.

Figure 12:
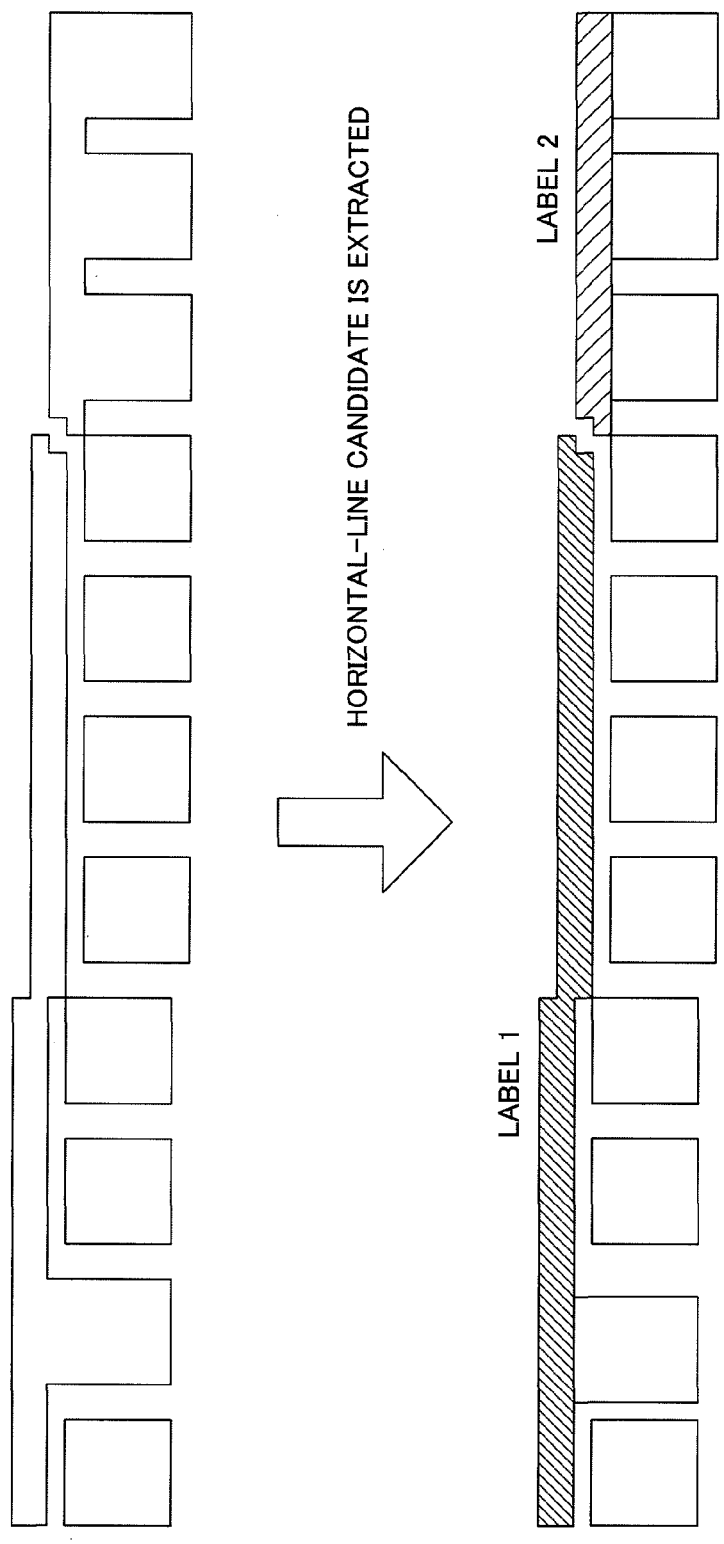
FIG. 12 is a schematic view for explaining a process performed by a horizontal-line candidate extracting portion.

FIG. 12 is a schematic view for explaining a process performed by the horizontal-line candidate extracting portion 81. The top of FIG. 12 illustrates a region surrounding the foreground pixel block of the input image data by solid lines which is an example of the foreground pixel-block mask. Based on the foreground pixel-block mask, the horizontal-line candidate extracting portion 81 searches for the sequential connection in which more than a predetermined number of foreground pixel blocks are sequentially connected in the horizontal direction, sets the foreground pixel blocks in the found sequential connection as the horizontal line candidate, and applies one label to one horizontal line candidate. The bottom of FIG. 12 illustrates an example case that the horizontal-line candidate extracting portion 81 extracts two horizontal line candidates (hatched two regions) from the example at the top of FIG. 12 and applies labels to these horizontal line candidates.

As not shown in figures, the vertical-line candidate extracting portion 82 performs a process on the input image data, which is similar to the above process performed by the horizontal-line candidate extracting portion 81 but for the vertical direction of the input image data. In other words, based on the foreground pixel-block mask, the vertical-line candidate extracting portion 82 searches for the sequential connection in which more than a predetermined number of foreground pixel blocks are sequentially connected in the vertical direction, sets the foreground pixel blocks in the found sequential connection as the vertical line candidate, and applies one label to one vertical line candidate.

Figure 13:
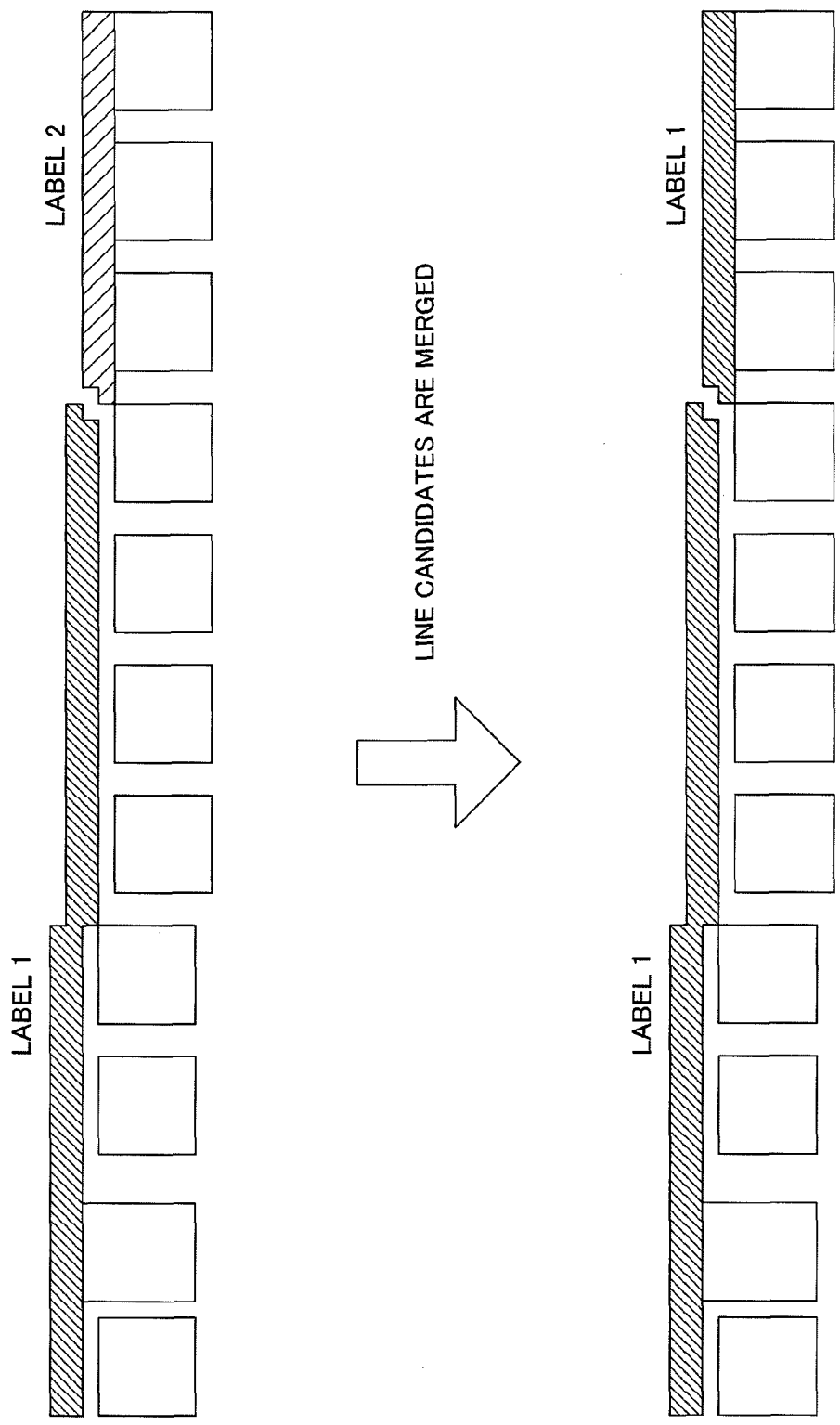
FIG. 13 is a schematic view for explaining a process performed by a line-candidate connecting portion.

FIG. 13 is a schematic view for explaining a process performed by the line-candidate connecting portion 83. The top of FIG. 13 illustrates an example of the processing result by the horizontal-line candidate extracting portion 81 in which labels are applied to two horizontal line candidates, respectively (i.e., the same example as the illustration at the bottom of FIG. 12). The line-candidate connecting portion 83 searches for plural line candidates that are arranged on the same line in the horizontal direction or the vertical direction in the input image data, and are close to each other, among the extracted horizontal line candidates and vertical line candidates. Then, the line-candidate connecting portion 83 sets the found plural line candidates as one mass of line candidates, and merges the labels applied to the found plural line candidates into one type of label, in order to combine the found plural line candidates. Two horizontal line candidates shown at the top of FIG. 13 are arranged on the same line, and are close to each other. Thus, the labels are merged as shown at the bottom of FIG. 13. Hence, these two horizontal line candidates can be combined.

Figure 14:
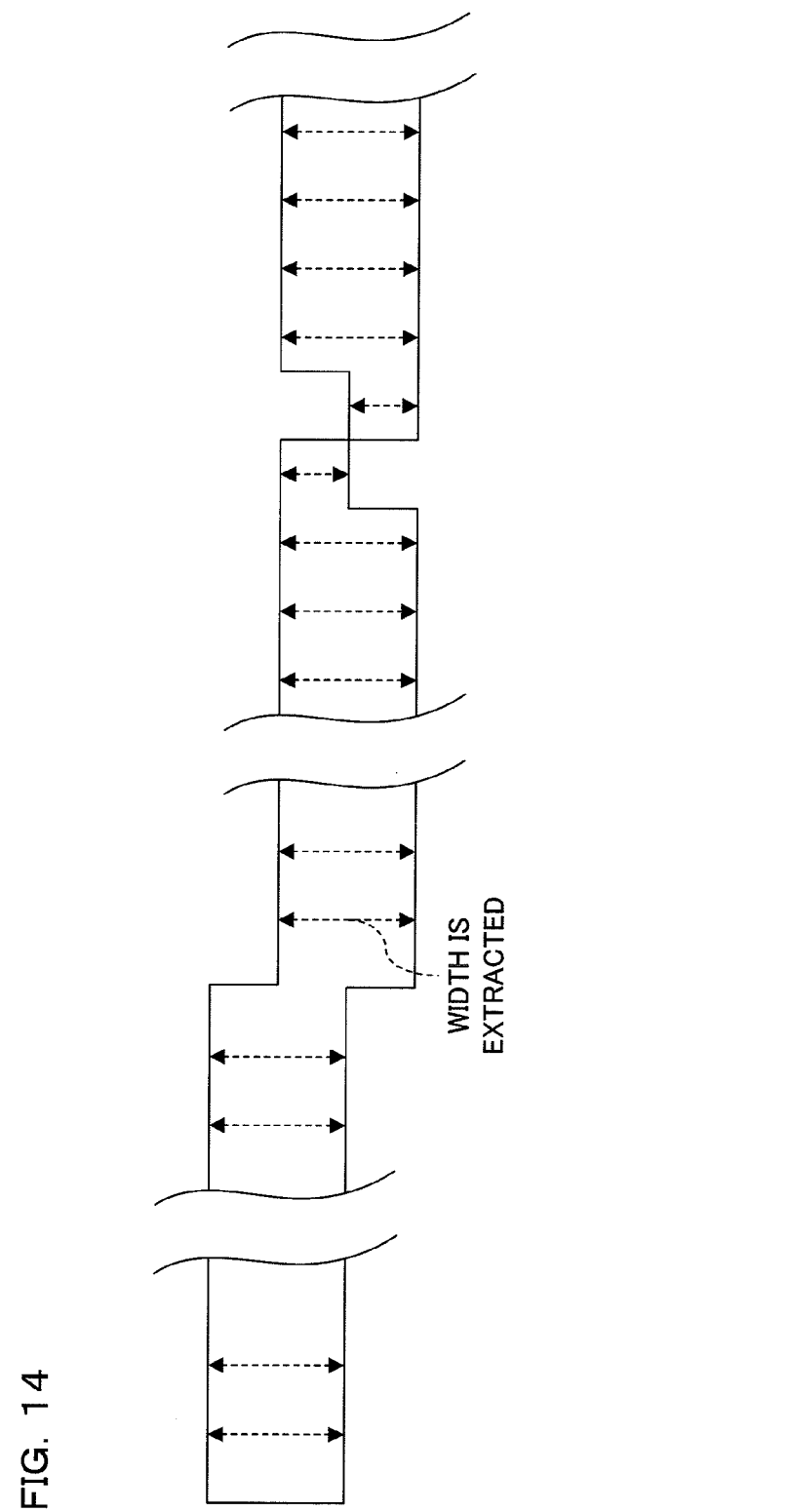
FIG. 14 is a schematic view for explaining a process performed by a line-distribution detecting portion.

FIG. 14 is a schematic view for explaining a process performed by the line-distribution detecting portion 84, and illustrates the processing result by the line-candidate connecting portion 83 in which one of the line candidates shown at the bottom in FIG. 13 is represented with an enlarged scale. The line-distribution detecting portion 84 obtains line information about the lines on which the line-candidate connecting portion 83 has completed performing the combining process, extracts a distribution for widths of the line candidates to which labels are applied (in the case of horizontal line candidates, extracts the number of pixels in the vertical direction, but in the case of horizontal line candidates, extracts the number of pixels in the horizontal direction), and determines in accordance with the extraction results whether each line candidate is the line art or not. For example, the line-distribution detecting portion 84 checks the distribution for widths of the line candidates, determines that a line candidate having significantly thicker portion is not a line art, and excludes this line candidate. As described above, the line-distribution detecting portion 84 performs the process based on the distribution for widths of the line candidates for excluding a line candidate that can be determined as a not line art.

Figure 15:
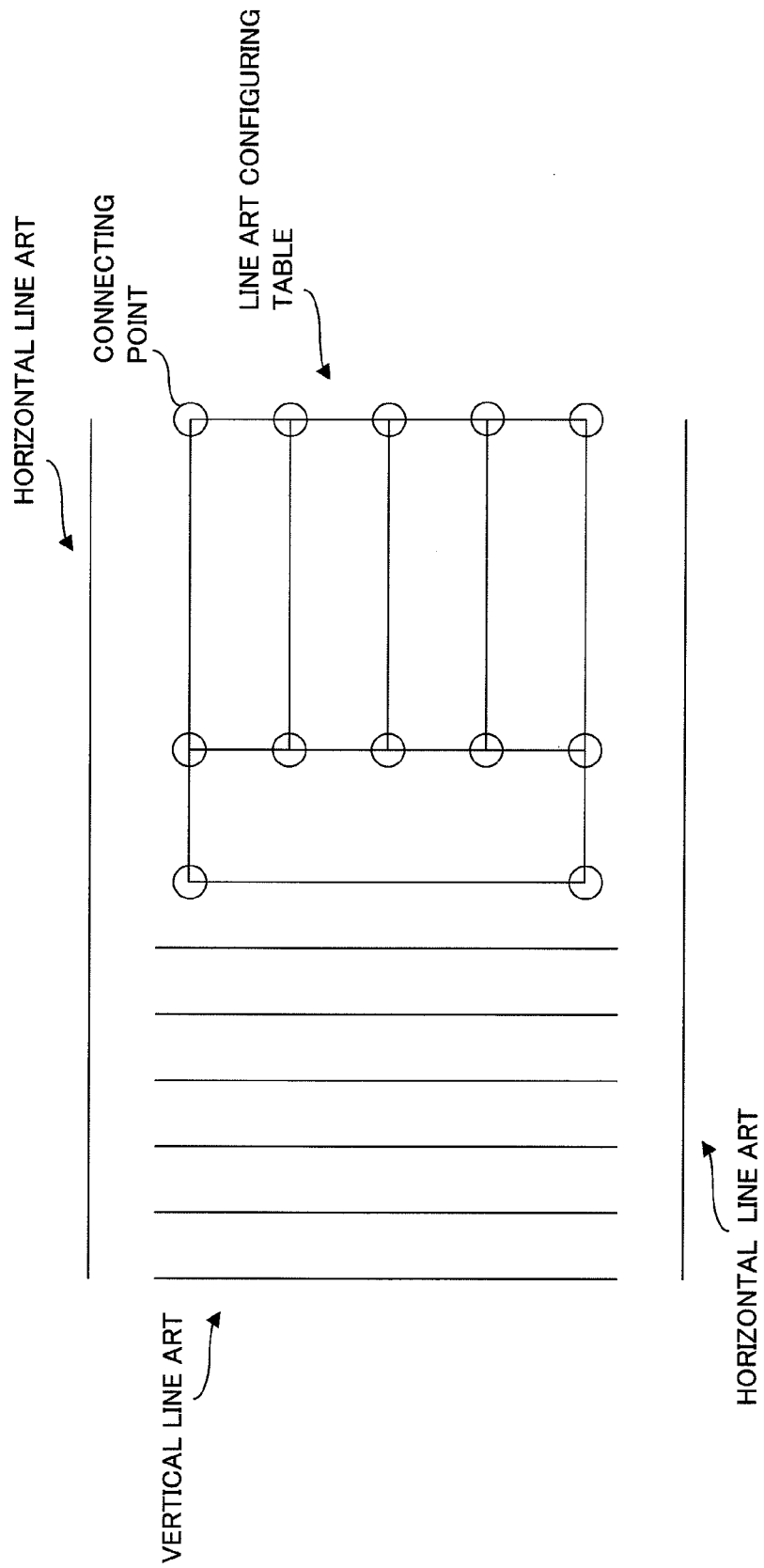
FIG. 15 is a schematic view for explaining a process performed by a line detection final process portion.

FIG. 15 is a schematic view for explaining a process performed by the line detection final process portion 85. The line detection final process portion 85 determines whether the extracted horizontal line candidates are connected to the extracted vertical line candidates or not, and counts the number of pairs in which two line candidates are connected to each other. When the counted number of pairs is more than a predetermined value, the line detection final process portion 85 recognizes that the plural line candidates in these pairs are line arts configuring a table in the image, and that each of the other line candidates is an individual line art in the horizontal or vertical direction. Furthermore, the line detection final process portion 85 determines whether the length of each line candidate is more than a predetermined length or not, for recognizing the line art configuring a table or the individual line art. In FIG. 15, the horizontal line art, the vertical line art and the line art configuring a table are illustrated by solid lines, and a connecting point is illustrated by circled, as the connecting point is utilized for determining whether the line art is configuring a table or not. Therefore, it is possible to perform a proper image processing based on the contents of image data, because the individual line art and the line art configuring a table are distinguished as described above.

Then, it will be described, in reference to a flowchart, a formula or the like, about a detailed procedure performed by each portions of the line detection process section 52.

Figure 16:
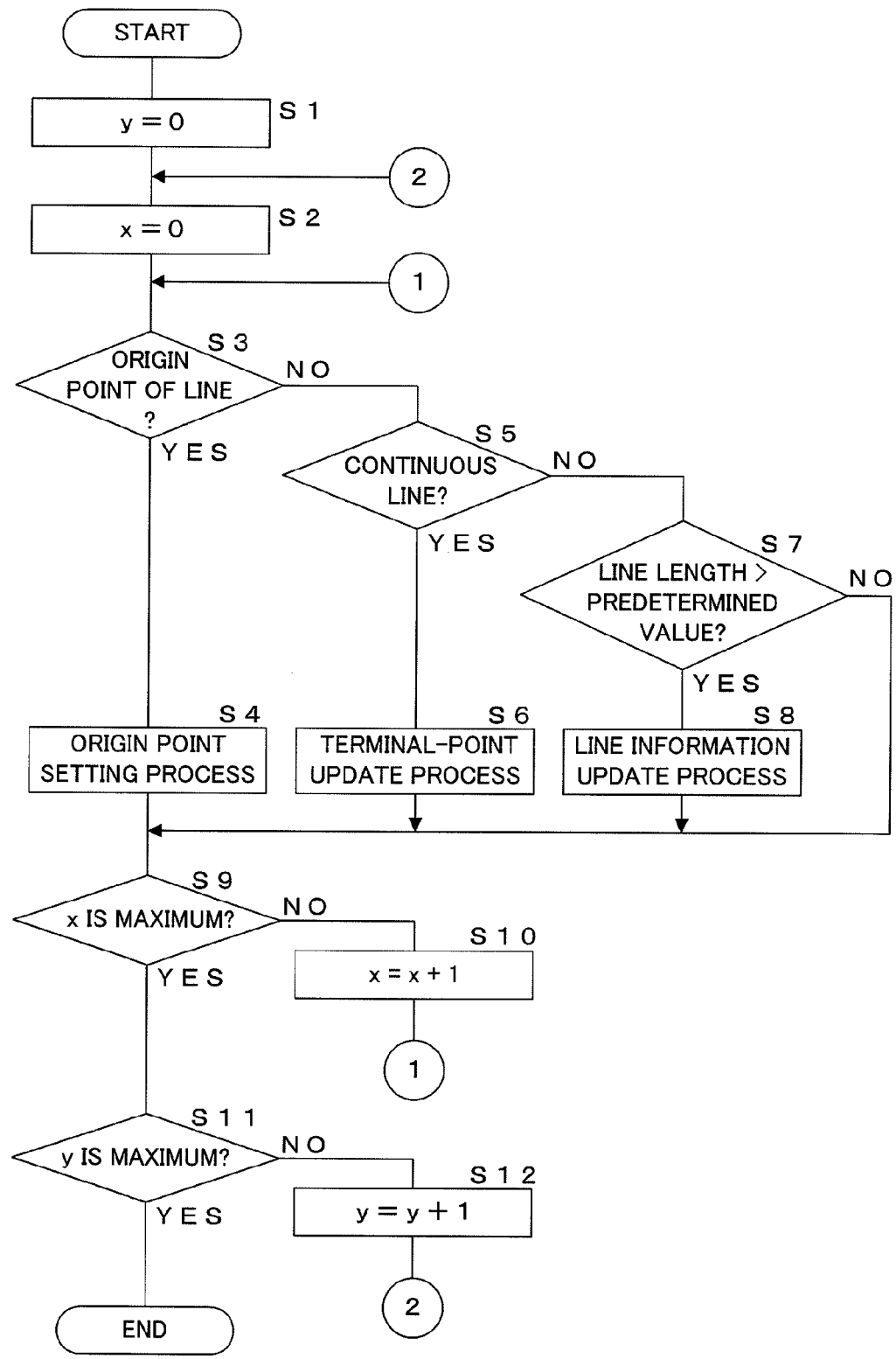
FIG. 16 is a flowchart showing a procedure performed by the horizontal-line candidate extracting portion.

FIG. 16 is a flowchart showing a procedure performed by the horizontal-line candidate extracting portion 81. As variable numbers x and y are utilized in the procedure, these variable numbers represent a position of a pixel block in the image data with respect to the horizontal direction and the vertical direction (i.e., coordinate). A upper left point of an image is represented by (x, y)=(0, 0). A value of x increases rightward in the horizontal direction of the image, and a value of y increases downward in the vertical direction of the image. Furthermore, a variable number min X and a variable number max X are utilized in the procedure for storing the value of coordinate x in the horizontal direction. The horizontal-line candidate extracting portion 81 firstly sets 0 to the value of the variable number y (step S1), and sets 0 to the value of the variable number x (step S2).

Next, the horizontal-line candidate extracting portion 81 determines whether a pixel block at (x, y) is a line candidate that can be an origin point of a horizontal line art or not (step S3). When having determined that the pixel block at (x, y) is a line candidate that can be an origin point of a horizontal line art (S3: YES), the horizontal-line candidate extracting portion 81 performs a process for setting the origin point (step S4). In the origin-point setting process, horizontal-line candidate extracting portion 81 sets a current value of the variable number x (i.e., the coordinate of the origin point in the horizontal direction) to the variable number min X.

Origin-point setting process: Min $X = x$

When having determined that the pixel block at (x, y) is not a line candidate that can be an origin point of a horizontal line art (S3: NO), the horizontal-line candidate extracting portion 81 determines whether the pixel block at (x, y) is a line candidate that can be a part of a line art or not (i.e., whether a previous pixel block is a line candidate and then the pixel block at (x, y) continues to this line candidate or not) (step S5). When having determined that the pixel block at (x, y) is a line candidate that can be a part of a line art (S5: YES), the horizontal-line candidate extracting portion 81 performs a terminal-point update process (step S6). In the terminal-point update process, the horizontal-line candidate extracting portion 81 sets the current value of x (i.e., the current coordinate of the terminal point in the horizontal direction) to the variable number max X.

Terminal-point update process: max $X = x$

When having determined that the pixel block at (x, y) is not a line candidate that can be a part of a line art (S5: NO), the horizontal-line candidate extracting portion 81 determines whether or not a line length calculated from a difference between the variable number min X and the variable number max X is a predetermined value TH_MIN_RUNLENGTH (e.g., 50) and above (step S7). The line length determination performed at the step S 7 is represented by the following formula.

line length determination: (max $X$− min $X$+1)$\geq$TH_MIN_RUNLENGTH

When having determined that the calculated line length is the predetermined value and above (S7: YES), the horizontal-line candidate extracting portion 81 extracts plural pixel blocks from the origin point min X to the terminal point max X, and treats the extracted plural pixel blocks as line candidates, for performing a line information update process (step S8). In the line information update process, a label is applied to an extracted line candidate and a label having been applied is updated. The horizontal-line candidate extracting portion 81 searches for another line candidate just above the extracted line candidate, refers to a label applied to said another line candidate, and then applies a label to a newly-extracted line candidate. When there is a line candidate just above the extracted line candidate whose x coordinate is partially or completely overlapped with the coordinates from the origin point min X to the terminal point max X at that time, the horizontal-line candidate extracting portion 81 absorbs the newly-extracted line candidate into the line candidate just above.

Figure 17:
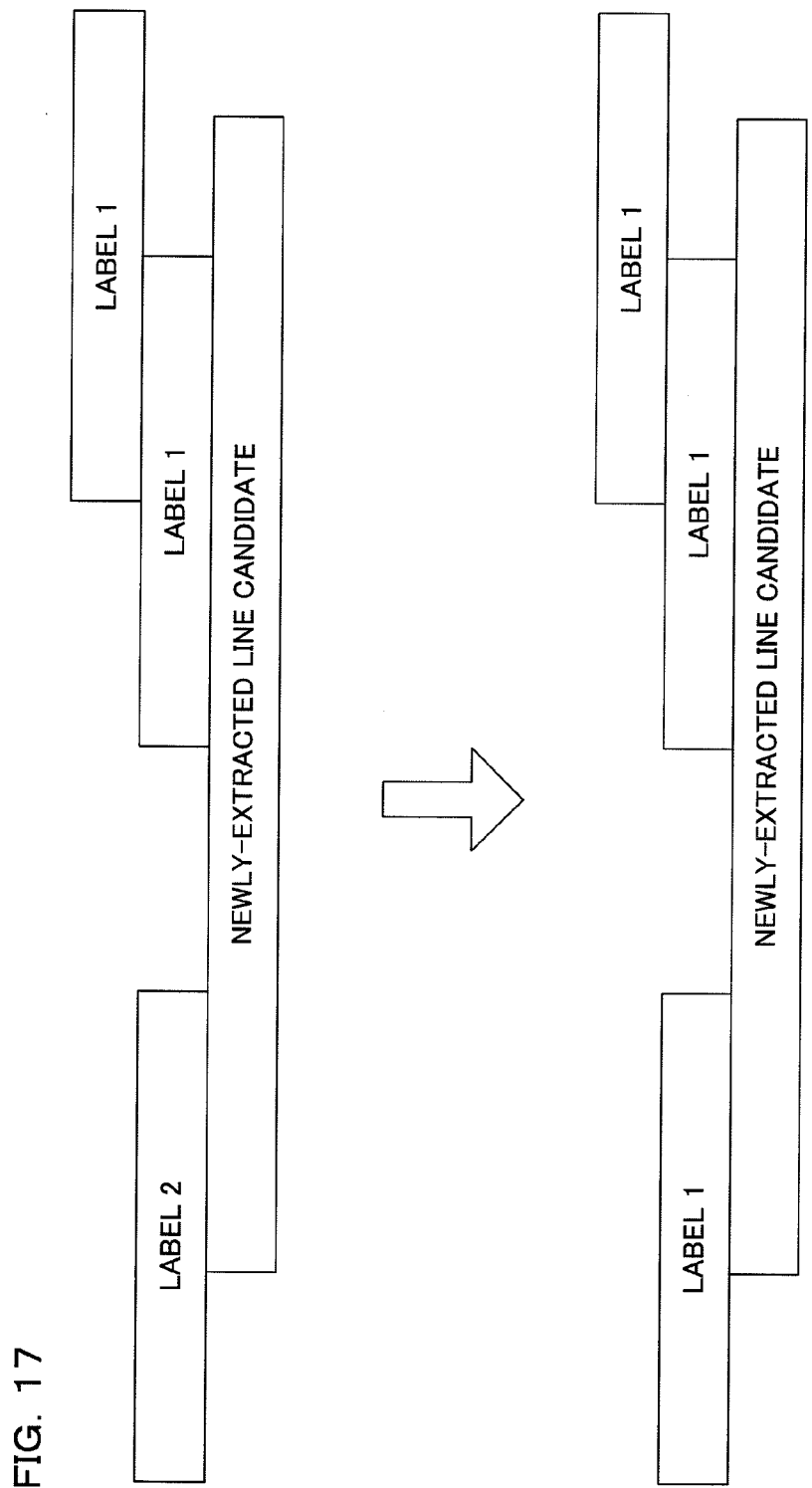
FIG. 17 is a schematic view for explaining a labeling process performed on a line candidate by the horizontal-line candidate extracting portion.

FIG. 17 is a schematic view for explaining a labeling process performed on a line candidate by the horizontal-line candidate extracting portion 81. When applying a label to the newly-extracted line candidate, the horizontal-line candidate extracting portion 81 finds a line candidate to which a label 2 is applied and which is treated as the line candidate just above and overlapping with the newly-extracted line candidate, and applies a label 2 to the newly-extracted line candidate. Then, the horizontal-line candidate extracting portion 81 finds a line candidate to which a label 1 is applied and which is treated as the line candidate just above and overlapping with the newly-extracted line candidate. At that time, the horizontal-line candidate extracting portion 81 merges the label 1 and the label 2 because the label 2 is already applied to the newly-extracted line candidate to be labeled. For unifying the labels, a label with a smaller value is preferably employed. Thus, the label 2 applied to the line candidate is changed to the label 1. Hence, it is possible to keep the relationship between the value of labels and the sub-scanning coordinate. When there are no line candidate just above and overlapping with the newly-extracted line candidate, the horizontal-line candidate extracting portion 81 applies a new label to the newly-extracted line candidate.

After the process at the step S4, S6 or S8 is completed, or when it has been determined at the step S7 that the calculated line length is smaller than the predetermined value (S7: NO), the horizontal-line candidate extracting portion 81 determines whether the current value of the variable number x reaches to the maximum value (the number of pixel blocks in the horizontal direction) or not (step S9). When the current value of the variable number x does not reach to the maximum value (S9: NO), the horizontal-line candidate extracting portion 81 adds 1 to the value of variable number x (step S10), returns the procedure to the step S3, and performs the process on the next pixel block in the horizontal direction. When the current value of the variable number x reaches to the maximum value (S9: YES), the horizontal-line candidate extracting portion 81 determines whether the value of the variable number y reaches to the maximum value (the number of pixel blocks in the vertical direction) or not (step S11). When the value of the variable number y does not reach to the maximum value (S11: NO), the horizontal-line candidate extracting portion 81 adds 1 to the value of the variable number y (step S12), returns the procedure to the step S2 and performs the process on a pixel block at the top of the next row in the image data. When the value of the variable number y reaches to the maximum value (S11: YES), the horizontal-line candidate extracting portion 81 ends the labeling process because the procedure is performed for all of the pixel blocks in the image data.

As described above, the horizontal-line candidate extracting portion 81 can extract the line candidate in horizontal direction and apply the label to the extracted line candidate. Then, the horizontal-line candidate extracting portion 81 outputs the line information including information about the extracted line candidate and the label applied to the extracted line candidate.

The vertical-line candidate extracting portion 82 utilizes a procedure in which the horizontal direction of the procedure performed by the horizontal-line candidate extracting portion 81 is changed to the vertical direction, for extracting the line candidate in the vertical direction and applying the label in the vertical direction.

For the line candidates extracted by the horizontal-line candidate extracting portion 81 and the line candidates extracted by the vertical-line candidate extracting portion 82, the line-candidate connecting portion 83 combines (merges labels for) a pair of line candidates that overlap with each other in the line direction and are arranged close to each other.

For example, the line-candidate connecting portion 83 utilizes two determination conditions described below, for determining whether the first line candidate is to be combined with the second line candidate. It should be noted about the determination condition described below that the min X is the minimum coordinate in the x direction, the max X is the maximum coordinate in the x direction, the min Y is the minimum coordinate in the y direction, the max Y is the maximum coordinate in the y direction, and the TH_LINEGAP is a threshold value (e.g., 2) for determining the close arrangement. In addition, the determination condition described below is utilized for combining line candidates in the horizontal direction. The other determination condition for combining line candidates in the vertical direction is similar to the determination condition described below, but the x direction of the determination condition described below is changed to the y direction of the determination condition described below, and vice versa.

Overlap Determination Condition:

max $Y$ of the first line candidate≧min $Y$ of the second line candidate, and min $Y$ of the first line candidate≦max $Y$ of the second line candidate Close Arrangement Determination Condition:

|min $X$ of the second line candidate−max $X$ of the first line candidate−1|≦TH_LINEGAP or

|min $X$ of the first line candidate−max $X$ of the second line candidate−1|≦TH_LINEGAP The line-candidate connecting portion 83 combines two line candidates that satisfy the overlap determination condition and the close arrangement determination condition described above, and updates and outputs the line information.

Figure 18:
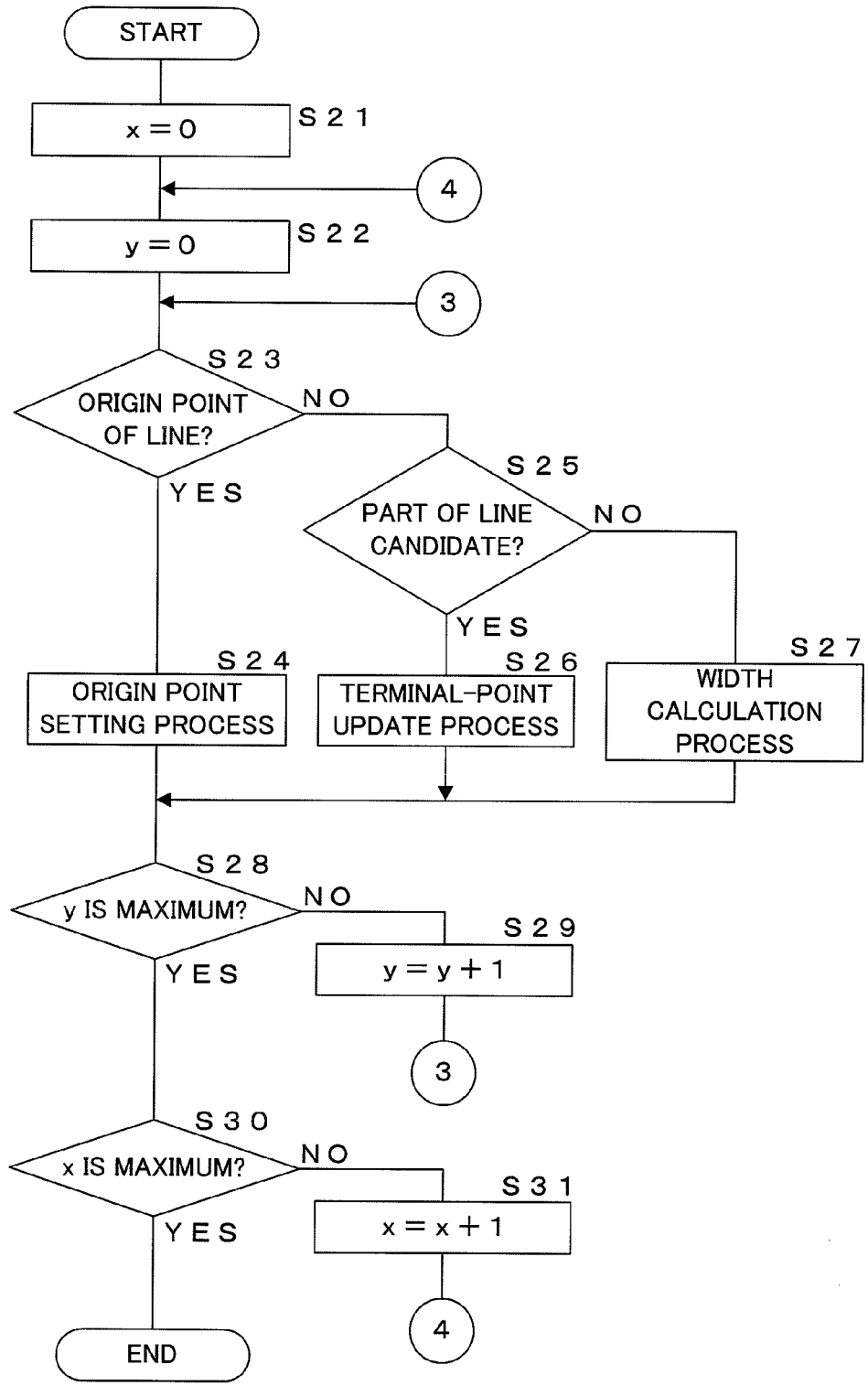
FIG. 18 is a flowchart showing a procedure performed by the line-distribution detecting portion.

FIG. 18 is a flowchart showing a procedure performed by the line-distribution detecting portion 84, and illustrates about the procedure for line candidates in the horizontal direction (although not shown, the procedure for line candidates in the vertical direction is similar to this procedure, but the x direction of this procedure is changed to the y direction of this procedure and vice versa). For the line candidates in the horizontal direction, the line-distribution detecting portion 84 performs the process toward the vertical direction of the image data.

The line-distribution detecting portion 84 firstly sets 0 to the value of the variable number x (step S21), and sets 0 to the value of the variable number y (step S22). Then, the line-distribution detecting portion 84 determines whether a pixel bock at a position (x, y) is the origin point in the vertical direction of the line candidate arranged in the horizontal direction (i.e., the upper end of the line arranged in the horizontal direction) or not (step S23). When having determined that the pixel bock is the origin point of the line candidate (S23: YES), the line-distribution detecting portion 84 performs an origin-point setting process (step S24). In the origin-point setting process, the line-distribution detecting portion 84 sets the current value of the variable number y (i.e., the coordinate of the origin point of the horizontal line in the vertical direction) to the variable number min Y.

Origin-point setting process: min $Y=y$

When having determined that the pixel bock at the (x, y) is not the origin point of the line candidate (S23: NO), the line-distribution detecting portion 84 determines whether the pixel block at (x, y) is a part of line candidate (i.e., whether a previous pixel block is a line candidate and then the pixel block at (x, continues to this line candidate) or not (step S25). When having determined that the pixel block at (x, y) is a part of line candidate (S25: YES), the line-distribution detecting portion 84 performs a terminal-point update process (step S26). In the terminal-point update process, the line-distribution detecting portion 84 sets the current value of y (i.e., the coordinate of the current terminal point of the horizontal line in the horizontal direction) to the variable number max Y.

Terminal-point setting process: max $Y=y$

When having determined that the pixel block at (x, y) is not a part of line candidate (S25: NO), the line-distribution detecting portion 84 performs a width calculation process for the line candidate (step S27). In the width calculation process, the line-distribution detecting portion 84 calculates a width of a target line candidate based on the difference between the variable number max Y and the variable number min Y, and stores the calculated width associated with the label applied to the target line candidate.

Width calculation process for the line candidate: the width for the line candidate=max $Y$−min $Y$+1

After the process at the step S24, S26 or S27 is completed, the line-distribution detecting portion 84 determines whether the current value of the variable number y reaches to the maximum value (the number of pixel blocks in the vertical direction) or not (step S28). When the current value of the variable number y does not reach to the maximum value (S28: NO), the line-distribution detecting portion 84 adds 1 to the variable number y (step S29), returns the procedure to the step S23, and performs the procedure on the next pixel block in the vertical direction. When the current value of the variable number y reaches to the maximum value (S28: YES), the line-distribution detecting portion 84 determines whether the value of the variable number x reaches to the maximum number (the number of pixel blocks in the horizontal direction) or not (step S30). When the value of the variable number x does not reach to the maximum number (S30: NO), the line-distribution detecting portion 84 adds 1 to the value of the variable number x (step S31), returns the procedure to the step S22, and repeats the procedure. When the value of the variable number x reaches to the maximum number (S30: YES), the line-distribution detecting portion 84 ends the width calculation process for the line candidate because the width calculation process is performed on all of the pixel block in the image data.

As performing the processes described above, the line-distribution detecting portion 84 can obtain the width distribution for line candidates in the image data. Then, the line-distribution detecting portion 84 checks the width distribution in accordance with the labels applied to the line candidates, obtains the maximum value and the minimum value of the width in each line candidate, compares the obtained values and the thresholds TH_MAXTHICK (e.g., 6) and TH_MINTHIC (e.g., 4), and determines whether each line candidate is the line art or not. The line-distribution detecting portion 84 determines that a line candidate satisfying the width determination condition described below is the line art, determines that a line candidate not satisfying the width determination condition described below is not the line art, and deletes information regarding the non-satisfying line candidate from the line information.

Figure 19:
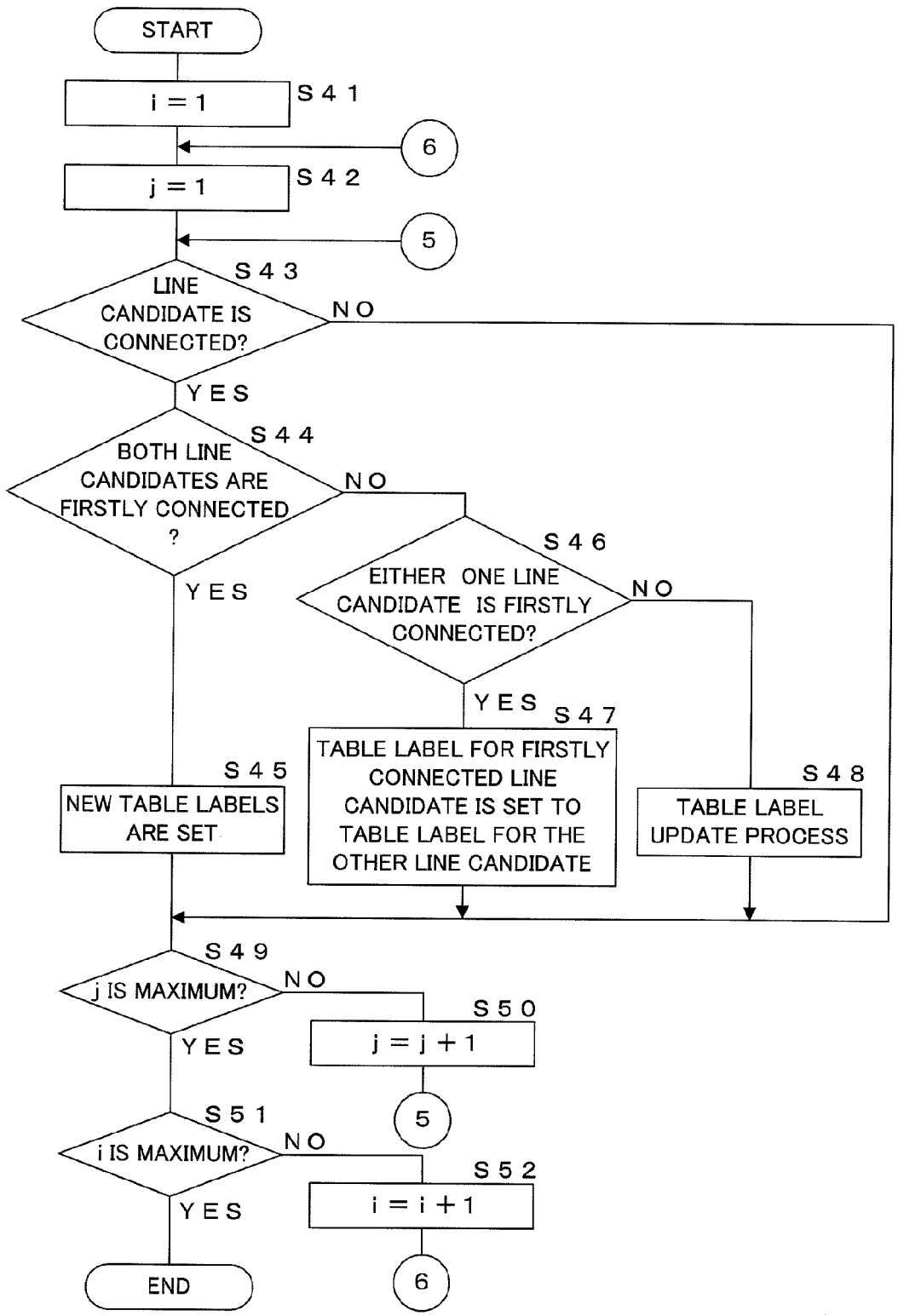
FIG. 19 is a flowchart showing a procedure performed by the line detection final process portion.

Width determination condition: the maximum value of the width≦TH_MAXTHICK, and the minimum value of the width≦TH_MINTHICK FIG. 19 is a flowchart showing a procedure performed by the line detection final process portion 85. Although variable numbers i and j are utilized in the procedure, these variable numbers represent the value of a label applied to a line candidate in the horizontal direction and the value of a label applied to a line candidate in the vertical direction, respectively. The line detection final process portion 85 firstly sets 1 to the value of the variable number i (step S41), and sets 1 to the value of the variable number j (step S42). Then, the line detection final process portion 85 determines whether the line candidate in the horizontal direction to which the label i is applied is connected to the line candidate in the vertical direction to which the label j is applied (step S43).

Figure 20:
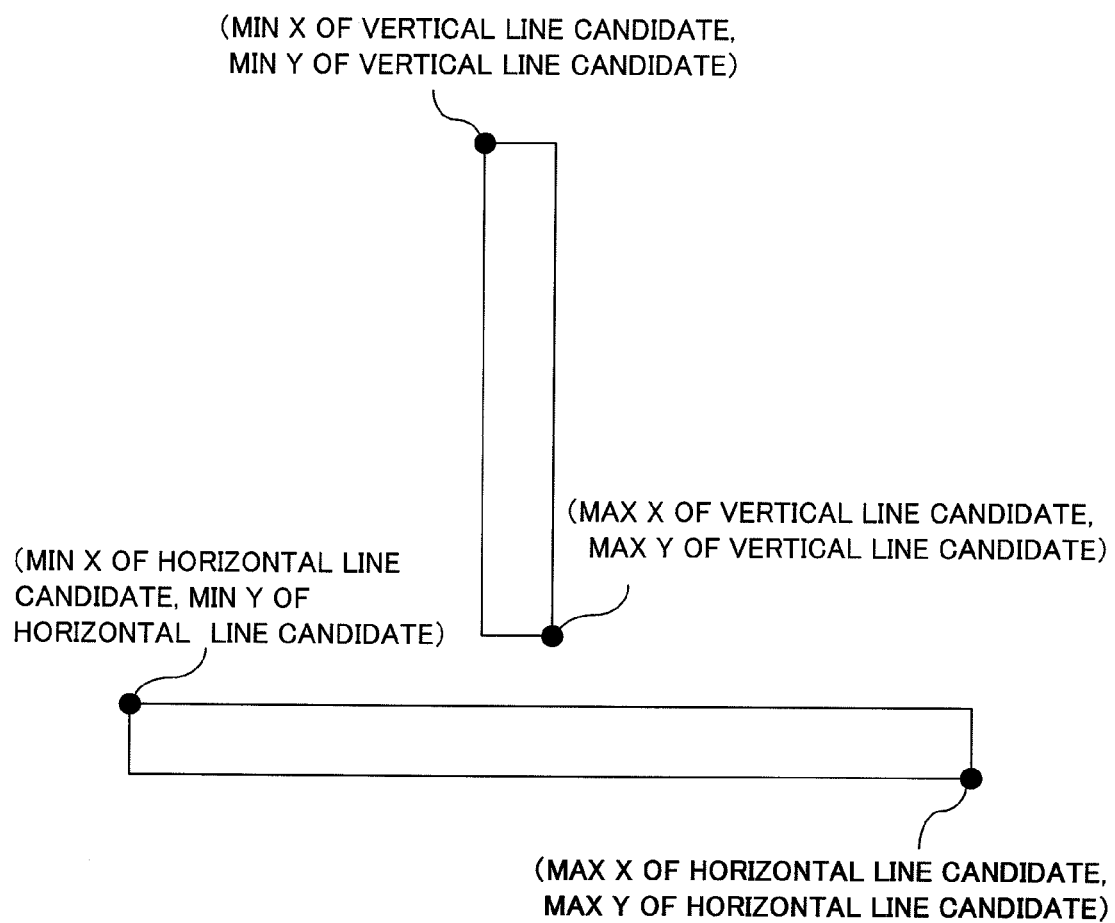
FIG. 20 is a schematic view for explaining a determination of line-candidate connection in a horizontal direction and a vertical direction.

FIG. 20 is a schematic view for explaining a determination of line-candidate connection in the horizontal direction and the vertical direction. The line detection final process portion 85 performs the determination, based on a connection determination condition described below, whether a line candidate in the horizontal direction (horizontal line candidate) is connected to a line candidate in the vertical direction (vertical line candidate) or not.

Connection Determination Condition:

max $X$ of the vertical line candidate≧min $X$ of the horizontal line candidate, max $X$ of the horizontal line candidate≧min $X$ of the vertical line candidate, max $Y$ of the vertical line candidate≧min $Y$ of the horizontal line candidate, and max $Y$ of the horizontal line candidate≧min $Y$ of the vertical line candidate.

When the line candidate in the horizontal direction is connected to the line candidate in the vertical direction (S43: YES), the line detection final process portion 85 checks whether it is the first time or not that these line candidates determined at the step S 43 are determined to be connected with one another (step S44). When it is the first time (S44: YES), the line detection final process portion 85 applies new table labels to these line candidates (step S45). It should be noted that the table label is applied for a table in the image. After the process is performed for one image data by the line detection final process portion 85, one table label is applied to one table in the image data. The check about the first time connection can be performed in accordance with the determination whether a table label has already been applied or not.

When it is not the first time (S44: NO), the line detection final process portion 85 checks whether it is the first time or not that either one of these line candidates is determined to be connected (step S46). The check can be performed in accordance with the determination whether a table label is applied to either one of these line candidates or not. When it is the first time that either one of these line candidates is determined to be connected (S46: YES), the line detection final process portion 85 applies the table label, having been applied to one of these line candidates whose connection is determined to be not for the first time, to the other one of these line candidate whose connection is determined to be for the first time (step S47). When it is not the first time for both of these line candidates (S46: NO), the line detection final process portion 85 checks table labels respectively applied to these line candidates, and merges the table labels into the table label having a smaller value. In other words, the line detection final process portion 85 updates the table label having a larger value, for the line candidate to which this larger table label is applied (step S48).

After the process at the step S45, S47 or S48, or when it is determined at the step S43 that the line candidate in the horizontal direction is not connected to the line candidate in the vertical direction (S43: NO), the line detection final process portion 85 determines whether the current variable number j reaches to the maximum value (the number of line candidates in the vertical direction) or not (step S49). When having determined that the current variable number j does not reach to the maximum value (S49: NO), the line detection final process portion 85 adds 1 to the value of the variable number j (step S50), returns the procedure to the step S43, and performs the procedure on the next pair of line candidates in the horizontal direction and the vertical direction. When having determined that the current variable number j reaches to the maximum value (S49: YES), the line detection final process portion 85 determines whether the value of variable number i reaches to the maximum value (the total number of the line candidates in the horizontal direction) or not (step S51). When having determined that the value of variable number i does not reach to the maximum value (S51: NO), the line detection final process portion 85 adds 1 to the value of the variable number i (step S52), returns the procedure to the step S42, and performs the procedure on the next pair of line candidates in the horizontal direction and the vertical direction. When having determined that the value of variable number i reaches to the maximum value (S51: YES), the line detection final process portion 85 ends the procedure.

Through the procedure shown in FIG. 19, the line detection final process portion 85 can detect a line candidate that may configure a table, among the plural line candidates of the image data, and can apply a table label to the detected line candidate. Then, the line detection final process portion 85 performs a final determination whether each line candidate is an individual horizontal line, a individual vertical line, a horizontal line configuring a table, a vertical line configuring a table, or not.

When the line candidate may be an individual line art (i.e., a table label is not applied to the line candidate), the line detection final process portion 85 performs the final determination based on the comparison between the line length of the line candidate and a predetermined value TH_ISO_RUN-LENGTH (e.g., 100), on whether the line candidate is the individual line art or not.

Condition of the Individual Horizontal Line:

max $X$ of the horizontal line candidate−min $X$ of the horizontal line candidate+1≧TH_ISO_RUN-LENGTH Condition of the Individual Vertical Line:

max $Y$ of the vertical line candidate−min $Y$ of the vertical line candidate+1≧TH_ISO_RUNLENGTH When the line candidate may be an individual line art (i.e., a table label is applied to the line candidate), the line detection final process portion 85 performs not only the determination based on the predetermined value TH_ISO_RUNLENGTH as described above but also the determination based on a value in which a predetermined weighting factor TH_LINERATIO (e.g., 0.8) is multiplied to the maximum length of plural line candidates to which the same table label is applied. When the line length of the line candidate that may configure a table is not shorter than the predetermined length TH_ISO_RUNLENGTH, or not less than the value in which the predetermined weighting factor TH_LINERATIO is multiplied to the maximum length of plural line candidates, the line detection final process portion 85 determines that this line candidate is just the line candidate configuring a table. Therefore, the line detection final process portion 85 can determine a target line as the line art which is relatively short for the individual line art, when the target line is a part of a table.

Condition of the Horizontal Line Configuring a Table:

max $X$ of the horizontal line candidate−min $X$ of the horizontal line candidate+1≧maximum line length of line candidates in which the same table label is applied×TH_LINERATIO, or max $X$ of the horizontal line candidate−min $X$ of the horizontal line candidate+1≧TH_ISO_RUN-LENGTH Condition of the Vertical Line Configuring a Table:

max $Y$ of the vertical line candidate−min $Y$ of the vertical line candidate+1≧maximum line length of line candidates in which the same table label is applied×TH_LINERATIO, or max $Y$ of the vertical line candidate−min $Y$ of the vertical line candidate+1≧TH_ISO_RUNLENGTH As described above, the line detection process section 52 can detect the horizontal line, the vertical line or the line configuring a table in the image from the foreground pixel-block mask obtained from the foreground extracting section 51, and can output the line information regarding the detected line to the layout analysis processing section 53. It should be noted that the processes described below (performed by the layout analysis processing section 53, the foreground layer generating section 54, and the background layer generating section 55) are based on the foreground pixel-block mask in which pixel blocks corresponding to the lines detected by the line detection process section 52 are removed from the foreground pixel-block mask generated by the foreground extracting section 51.

(3) Layout Analysis Processing Section 53

Figure 21:
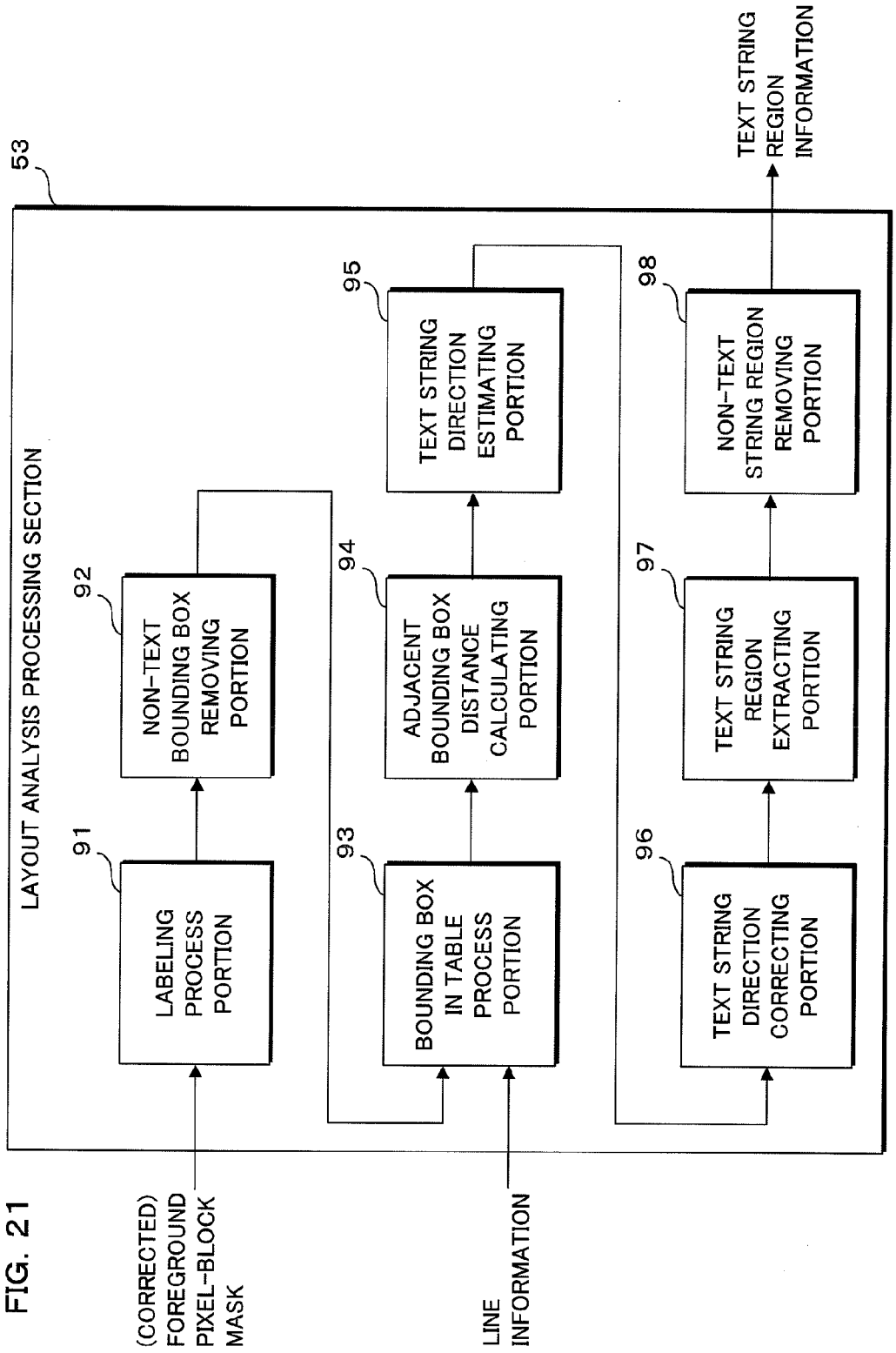
FIG. 21 is a block diagram showing a configuration of a layout analysis processing section.

FIG. 21 is a block diagram showing a configuration of the layout analysis processing section 53. The layout analysis processing section 53 performs a process for generating information (text string region information) regarding a region of a text string in the image data, based on the foreground pixel-block mask in which the pixel blocks generated by the foreground extracting section 51 and configuring a line in accordance with the detection result of the line detection process section 52 are removed, and based on the line information that is the detection result of the line detection process section 52. For these processes, the layout analysis processing section 53 includes a labeling process portion 91, a non-text bounding box removing portion 92, a bounding box in table process portion 93, an adjacent bounding box distance calculating portion 94, a text string direction estimating portion 95, a text string direction correcting portion 96, a text string region extracting portion 97 and a non-text character string region removing portion 98.

Figure 22:
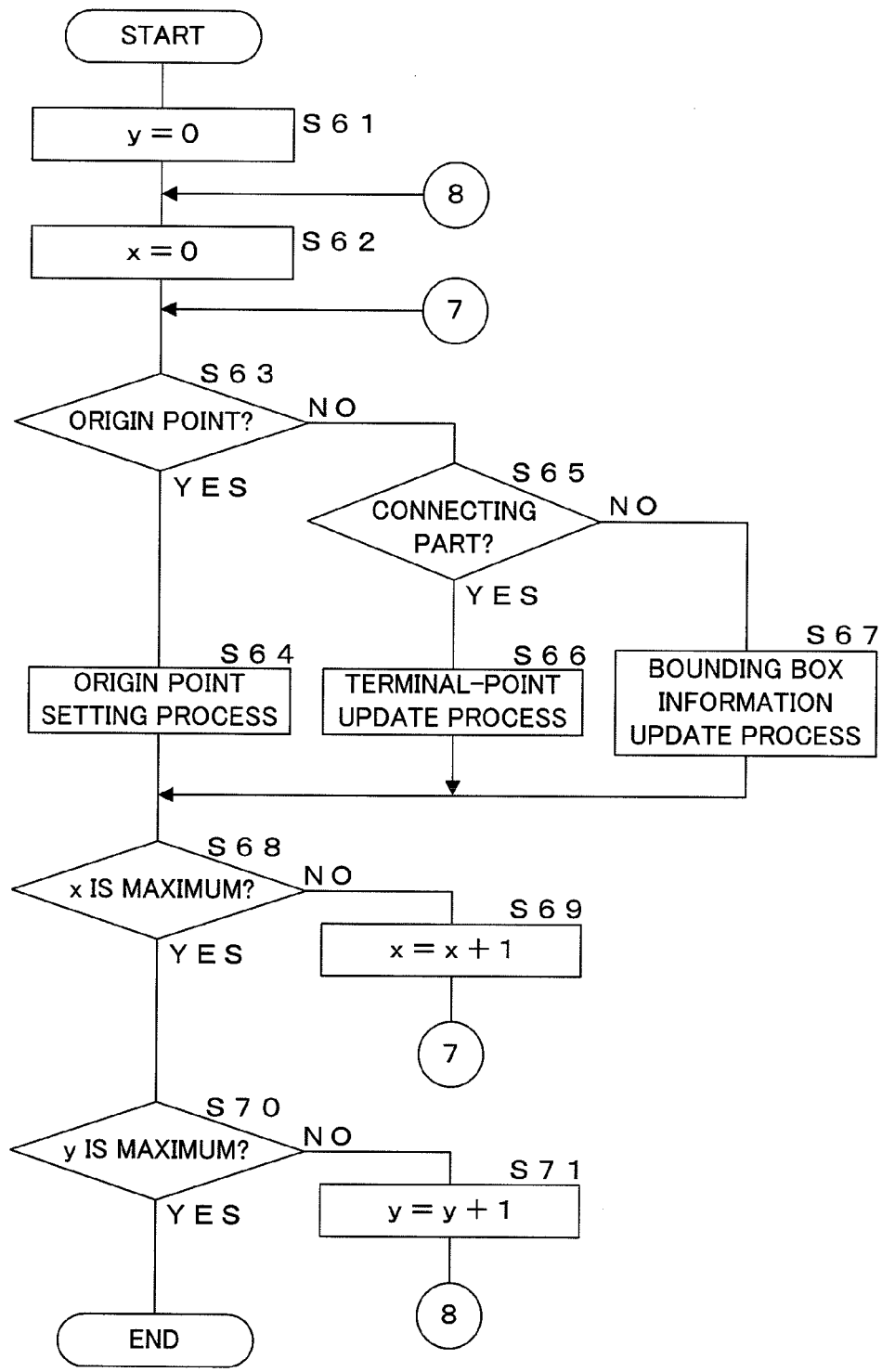
FIG. 22 is a flowchart showing a procedure performed by a labeling process portion.
Figure 23:
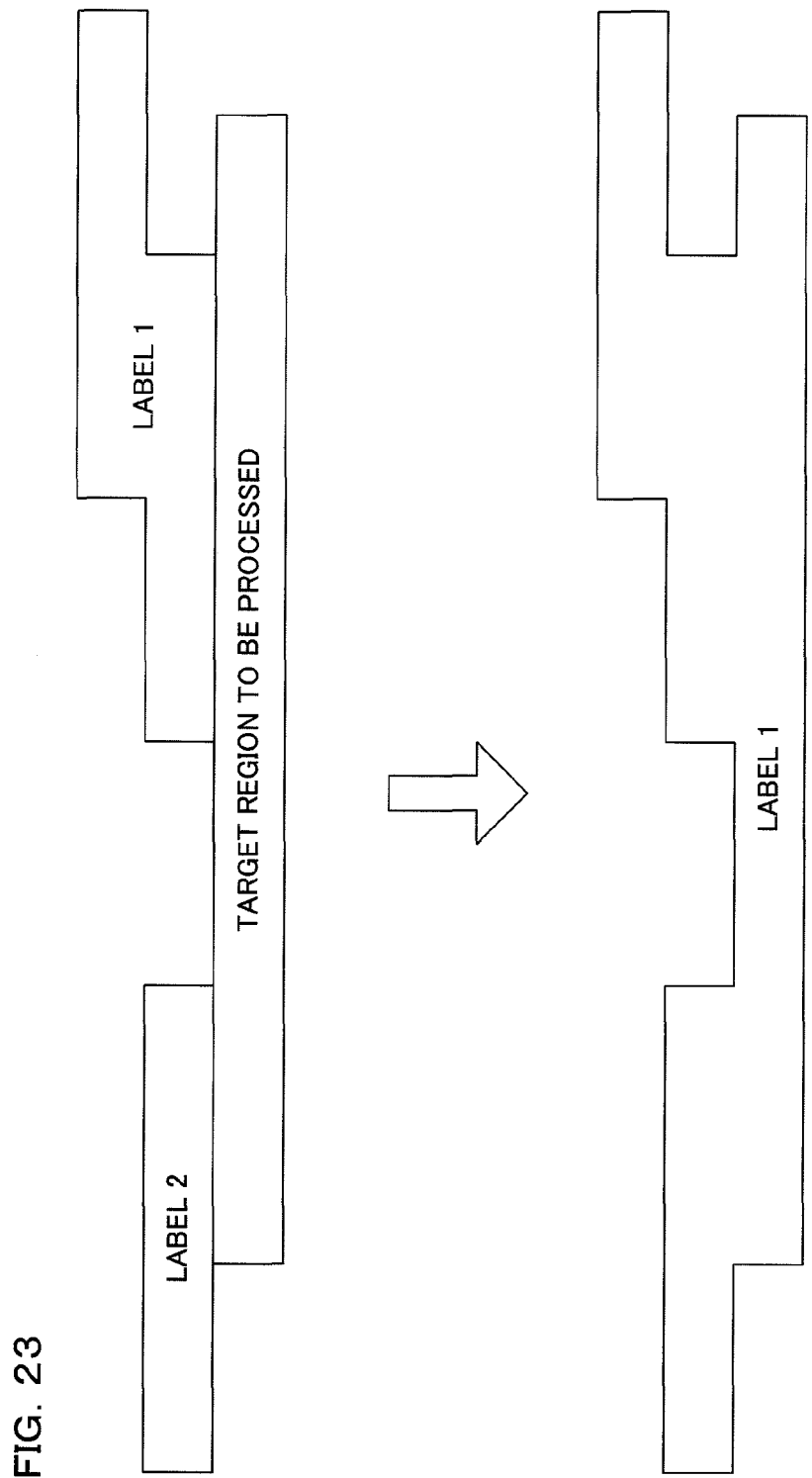
FIG. 23 is a schematic view for explaining a process performed by the labeling process portion.

The labeling process portion 91 assigns a specific label to a mass of plural foreground pixel blocks connected in the image data, to categorize the foreground pixel blocks. FIG. 22 is a flowchart showing a procedure performed by the labeling process portion 91. FIG. 23 is a schematic view for explaining a process performed by the labeling process portion 91.

The labeling process portion 91 sets 0 to the value of the variable number y (step S61), and sets 0 to the value of the variable number x (step S62). Then, the labeling process portion 91 determines whether a pixel block at a position (x, y) to be processed is an origin point (a point whose previous pixel block is not a foreground pixel block) of a region (foreground region) configuring plural foreground pixel blocks connected in the horizontal direction or not (step S63). When having determined that the pixel block to be processed is the origin point of the foreground region (S63: YES), the labeling process portion 91 performs the origin-point setting process (step S64). In the origin-point setting process, the labeling process portion 91 sets the value of the current variable number x to the variable number min X.

Origin-point setting process: min $X=x$

When having determined that the pixel block to be processed is not the origin point of the foreground region (S63: NO), the labeling process portion 91 determines whether the pixel block to be processed is a part of the foreground region connecting in the horizontal direction (a point whose previous pixel block is the foreground pixel block) or not (step S65). When having determined that the pixel block to be processed is a part of the foreground region connecting in the horizontal direction (S 65: YES), the labeling process portion 91 performs the terminal-point update process (step S66). In the terminal-point update process, the labeling process portion 91 sets the value of current x to the variable number max X.

Terminal-point update process: max $X=x$

When having determined that the pixel block to be processed is not a part of the foreground region connecting in the horizontal direction (S 65: NO), the labeling process portion 91 performs a bounding box information update process (step S67). In the bounding box information update process, a label is applied to the foreground region and a label previously applied is updated.

The bounding box information include information regarding the coordinate of the foreground region to which each label is applied (e.g., the minimum coordinate in the horizontal direction, the maximum coordinate in the horizontal direction, the minimum coordinate in the vertical direction and the maximum coordinate in the vertical direction), information regarding the number of foreground pixel blocks in each foreground region and the like (the foreground region may not be a bounding box, and the bounding box information may include information regarding a foreground region whose shape is not a bounding box). The labeling process portion 91 finds another foreground region just above the foreground region including the pixel block to be processed, refers to a label applied to the found another foreground region, and applies a new label or merges the label previously applied.

For example, in the case that a label is applied to a foreground region (a foreground region to be processed) including a pixel block to be processed as shown in FIG. 23, the labeling process portion 91 firstly finds a foreground region to which a label 2 is applied as the foreground region overlapping with and arranged just above the foreground region to be processed, and applies the label 2 to the foreground region to be processed. Then, the labeling process portion 91 finds a foreground region to which a label 1 is applied as the foreground region overlapping with and arranged just above the foreground region to be processed. As the label 2 has already been applied to the foreground region to be processed at that time, the labeling process portion 91 merges the label 1 and the label 2. For the unification of labels, a label having a smaller value is preferred, and thus the label 2 of the foreground region to be processed is changed to the label 1. Therefore, it is possible to keep the relationship between the values of labels and the sub-scanning coordinates. In the case that there is no foreground region overlapping with and arranged just above the foreground region to be processed, the labeling process portion 91 applies a new label to the foreground region to be processed and adds coordinate information regarding the applied new label into the bounding box information.

After the process at the step S64, S66 or S67 is completed, the labeling process portion 91 determines whether the value of the current variable number x reaches to the maximum value (the number of pixel blocks in the horizontal direction) or not (step S68). When the value of the current variable number x does not reach to the maximum value (S68: NO), the labeling process portion 91 adds 1 to the value of the variable number x (step S69), returns the procedure to the step S63, and performs the procedure on the next pixel block in the horizontal direction. When the value of the current variable number x reaches to the maximum value (S68: YES), the labeling process portion 91 determines whether the value of the variable number y reaches to the maximum value (the number of pixel blocks in the vertical direction) or not (step S70). When having determined that the value of the variable number y does not reach to the maximum value (S70: NO), the labeling process portion 91 adds 1 to the value of the variable number y (step S71), returns the procedure to the step S62, and performs the procedure on the next pixel block at the head of the next row in the image data. When having determined that the value of the variable number y reaches to the maximum value (S70: YES), the labeling process portion 91 ends the process for applying the label.

Figure 24:
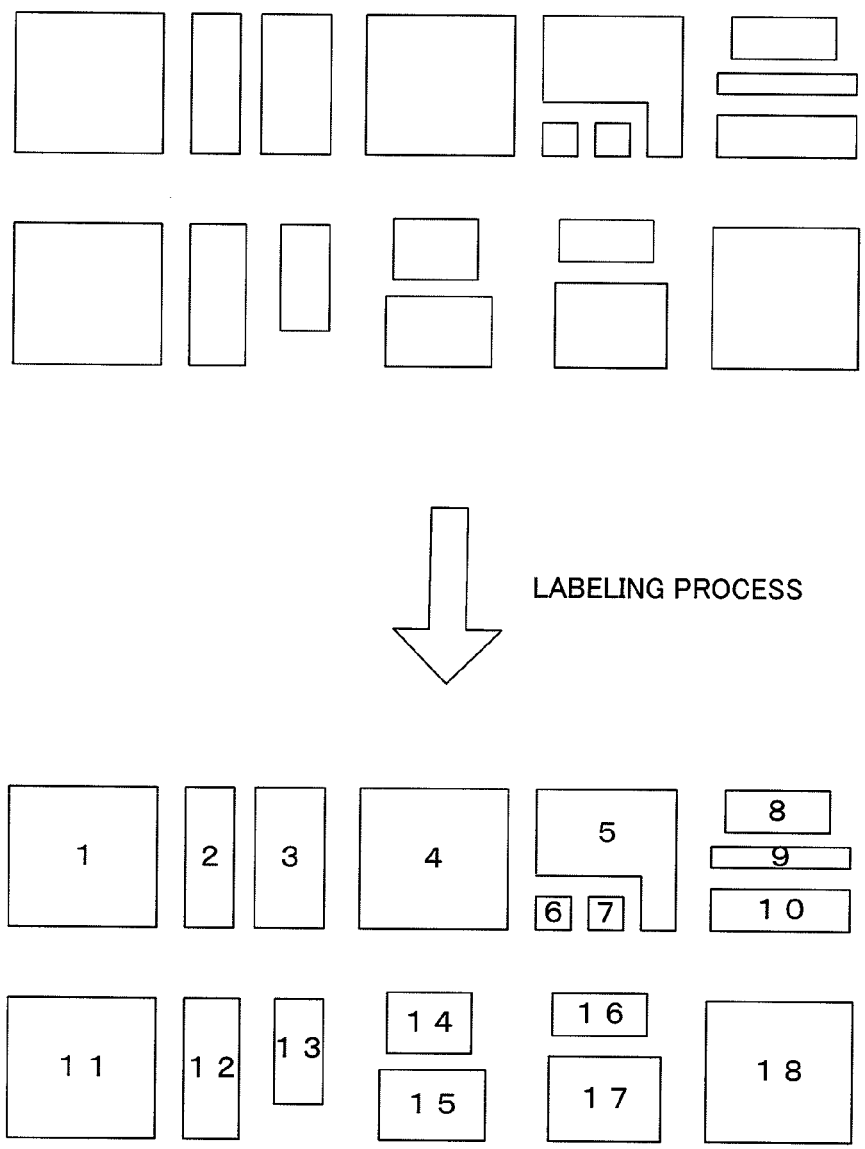
FIG. 24 is a schematic view showing an example process performed by the labeling process portion.

As described above, the labeling process portion 91 can apply a label to a foreground region in which foreground pixel blocks are sequentially connected with each other in the image data, and can output the bounding box information as the result of the label application. FIG. 24 is a schematic view showing an example process performed by the labeling process portion 91. It should be noted that a region surrounded by a solid line in FIG. 24 represents a region (foreground region) of one or more pixel blocks designated as the foreground pixel blocks on the foreground pixel-block mask input into the labeling process portion 91. The labeling process portion 91 applies a distinct label to each of one or more foreground regions, generates bounding box information in which the distinct label is associated to the coordinate information of each foreground region, the number of pixel blocks in each foreground region and the like, and outputs the generated bounding box information to the non-text bounding box removing portion 92. In the example of FIG. 24, labels 1-18 are applied to eighteen regions.

The non-text bounding box removing portion 92 determines whether each foreground region to which a label is applied by the labeling process portion 91 corresponds to a text character in the image or not, based on the size of the foreground region, such as a height (the number of pixel blocks in the vertical direction) or a width (the number of pixel blocks in the horizontal direction), or based on the information, such as the number of pixel blocks in the foreground region. Then, the non-text bounding box removing portion 92 removes a foreground region not corresponding to a text character. For example, in the case that either of a height and a width of each foreground region is too large or too small with respect to the size of the image data, the non-text bounding box removing portion 92 can determine that the foreground region does not correspond to a text character (although the determination method is not limited to this illustration). The non-text bounding box removing portion 92 removes from the bounding box information the information regarding the foreground region determined not to be corresponding to the text character, and then conveys the processed bounding box information to the bounding box in table process portion 93.

The bounding box in table process portion 93 obtains the bounding box information output from the non-text bounding box removing portion 92 and the line information output from the foreground extracting section 51. Based on information regarding lines configuring a table in the line information, the bounding box in table process portion 93 determines whether each foreground region in the rectangular information is positioned inside a table or not. For plural foreground regions determined to be positioned inside a table (for plural regions positioned in one area of a table), the layout analysis processing section 53 treats these plural foreground regions as one text string, regardless of the processed result describe later. Therefore, the layout analysis processing section 53 can easily and surely extract the text character string even inside a table, although the text character string inside a table is distributed differently from a normal text character string. The bounding box in table process portion 93 adds the information regarding the position of each foreground region (whether inside a table or not) to the bounding box information, and conveys the processed bounding box information to the adjacent bounding box distance calculating portion 94.

Figure 25:
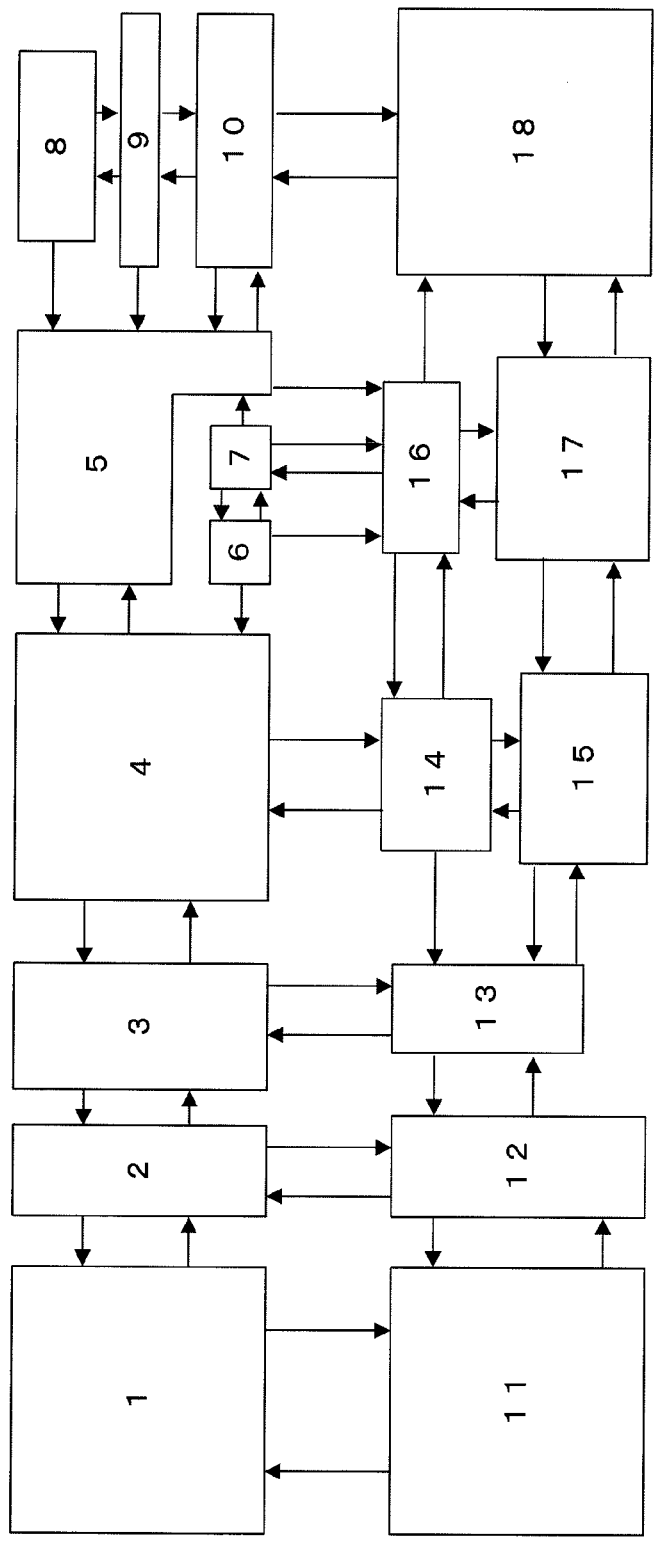
FIG. 25 is a schematic view for explaining a process performed by an adjacent bounding box distance calculating portion.

FIG. 25 is a schematic view for explaining a process performed by the adjacent bounding box distance calculating portion 94. For each of the target foreground regions in the bounding box information, the adjacent bounding box distance calculating portion 94 extracts another foreground region that is arranged at the upper, lower, left, or right side of the target foreground region on the image and satisfies a predetermined condition, and calculates a distance between the extracted another foreground region and the target foreground region. In the example shown in FIG. 25, an arrow shows the relationship between two regions extracted by the adjacent bounding box distance calculating portion 94 for the distance calculation, based on the example of processed results obtained by the labeling process shown in FIG. 24 (an origin point of an arrow represents the foreground region to be processed, and a terminal point of the arrow represents another foreground region around the foreground region to be processed).

Figure 26:
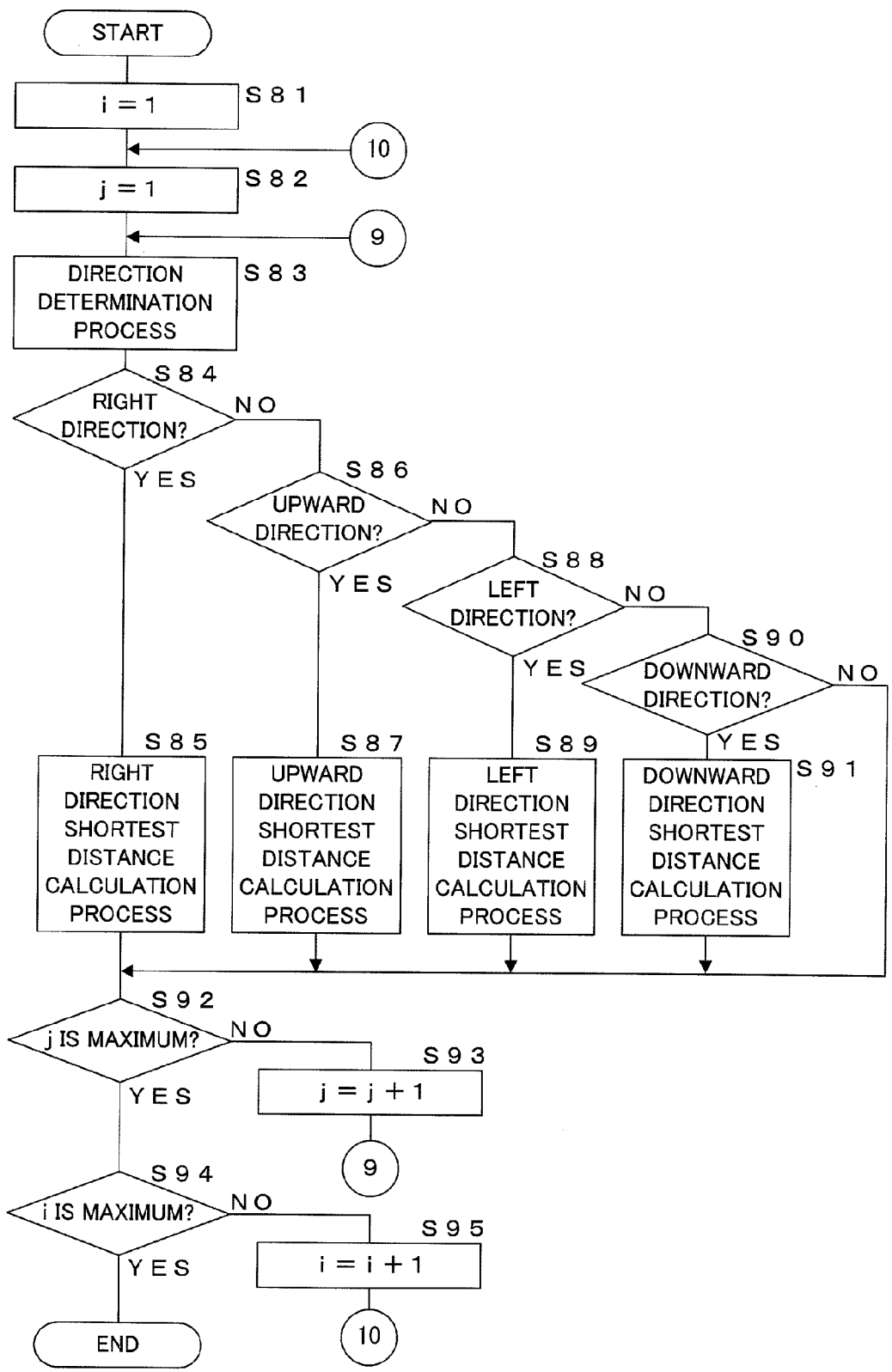
FIG. 26 is a flowchart showing a procedure performed by the adjacent bounding box distance calculating portion.

FIG. 26 is a flowchart showing a procedure performed by the adjacent bounding box distance calculating portion 94. It should be noted that the variable numbers i and j in this procedure are utilized for storing a value of a label applied to each foreground region by the labeling process portion 91. The adjacent bounding box distance calculating portion 94 firstly sets 1 to the value of the variable number i (step S81), and sets 1 to the value of the variable number j (step S82). Then, the adjacent bounding box distance calculating portion 94 determines a direction for a foreground region of the label j with respect to a foreground region of the label i (step S83). In this direction determination process, the adjacent bounding box distance calculating portion 94 sequentially determines whether the foreground region of the label i and the foreground region of the label j satisfy conditions 1-4 described later. It should be noted about the formula described below that the min X represents the minimum coordinate of each foreground region in the horizontal direction (right direction), the max X represents the maximum coordinate of each foreground region in the horizontal direction, the min Y represents the minimum coordinate of each foreground region in the vertical direction (downward direction), and the max Y represents the maximum coordinate of each foreground region in the vertical direction.

Condition 1:

max $X$ of the foreground region for the label $j$>max $X$ of the foreground region for the label $i$, and min $X$ of the foreground region for the label $j$>min $X$ of the foreground region for the label $i$.

Condition 2:

min $X$ of the foreground region for the label $j$<min $X$ of the foreground region for the label $i$, and max $X$ of the foreground region for the label $j$<max $X$ of the foreground region for the label $i$.

Condition 3:

min $Y$ of the foreground region for the label $j$<min $Y$ of the foreground region for the label $i$, and max $Y$ of the foreground region for the label $j$<max $Y$ of the foreground region for the label $i$.

Condition 4:

max $Y$ of the foreground region for the label $j$>max $Y$ of the foreground region for the label $i$, and min $Y$ of the foreground region for the label $j$>min $Y$ of the foreground region for the label $i$.

The adjacent bounding box distance calculating portion 94 sequentially utilizes the conditions 1-4 for the determination. When the foreground region of the label i and the foreground region of the label j satisfy the condition 1, the adjacent bounding box distance calculating portion 94 determines that the foreground region of the label j is positioned at the right side of the foreground region of the label i. When the foreground region of the label i and the foreground region of the label j satisfy the condition 2 but not the condition 1, the adjacent bounding box distance calculating portion 94 determines that the foreground region of the label j is positioned at the left side of the foreground region of the label i. When the foreground region of the label i and the foreground region of the label j satisfy the condition 3 but not the conditions 1 and 2, the adjacent bounding box distance calculating portion 94 determines that the foreground region of the label j is positioned at the upper side of the foreground region of the label i. When the foreground region of the label i and the foreground region of the label j satisfy the condition 4 but not the conditions 1-3, the adjacent bounding box distance calculating portion 94 determines that the foreground region of the label j is positioned at the lower side of the foreground region of the label i.

After the direction determination process, the adjacent bounding box distance calculating portion 94 determines whether the foreground region of the label j is positioned in the right direction for the foreground region of the label i or not (step S84). In the determination at the step S84, it is determined whether the foreground region of the label i partially or wholly overlaps with the foreground region of the label j, as the foreground region of the label j is determined to be positioned at the right side of the foreground region of the label i. The adjacent bounding box distance calculating portion 94 determines the overlap in the horizontal direction based on the following condition.

Overlap Condition in the Horizontal Direction:

max $Y$ of the foreground region for the label $i$>min $Y$ of the foreground region for the label $j$, and min $Y$ of the foreground region for the label $i$<max $Y$ of the foreground region for the label $j$.

When it is determined at the step S83 that the foreground region of the label j is positioned at the right side of the foreground region of the label i and the overlap condition in the horizontal direction described above is satisfied, the adjacent bounding box distance calculating portion 94 determines that the foreground region of the label j is positioned in the right direction of the foreground region of the label i (step S84: YES), and performs a right direction shortest distance calculation process (step S85). In the right direction shortest distance calculation process, the adjacent bounding box distance calculating portion 94 utilizes the following formula for calculating the distance Dist between the foreground region of the label i and the foreground region of the label j.

$$\text{Dist} = \min X \text{ of the foreground region for the label } j - \max X \text{ of the foreground region for the label } i$$

Furthermore, the adjacent bounding box distance calculating portion 94 determines whether the following five conditions (conditions 1-5 for the right direction shortest distance) are satisfied or not. When having determined that the following five conditions are satisfied, the adjacent bounding box distance calculating portion 94 treats the calculated distance Dist as the right direction shortest distance for the foreground region of the label i, and stores it with label j for the foreground region is positioned in the right direction (in the case that another foreground region has already been stored as the right direction shortest distance, the stored right direction shortest distance is updated to be a new value). The first condition utilized by the adjacent bounding box distance calculating portion 94 for the determination is that the distance Dist is smaller than a predetermined threshold value (e.g., 36).

Condition 1 for the Right Direction Shortest Distance:

$$\text{Dist} < \text{threshold value}$$

The second condition utilized by the adjacent bounding box distance calculating portion 94 for the determination is that the foreground region of the label i and the foreground region of the label j are merged into one bounding box, a difference between the height of the merged one bounding box and the height of the foreground region for the label i is calculated, a difference between the height of the merged one bounding box and the height of the foreground region for the label j is calculated, and smaller one of these calculated differences is smaller than a predetermined threshold value (e.g., 36).

Condition 2 for the Right Direction Shortest Distance:

MIN (difference between the heights of the foreground region for the label $i$ before and after the unification, difference between the height of the foreground region for the label $j$ and the height of the merged bounding box with the foreground region of the label $i$ and the foreground region of the label $j$)<threshold value The third condition utilized by the adjacent bounding box distance calculating portion 94 for the determination is that the maximum coordinate max X of the foreground region for the label j in the horizontal direction is larger than the maximum coordinate max X of the foreground region for the label i in the horizontal direction.

Condition 3 for the Right Direction Shortest Distance:

$$\max X \text{ of the foreground region for the label } j > \max X \text{ of the foreground region for the label } i$$

The fourth condition utilized by the adjacent bounding box distance calculating portion 94 for the determination is that the minimum coordinate min X of the foreground region for the label i in the horizontal direction is not more than the minimum coordinate min X of the foreground region for the label j in the horizontal direction.

Condition 4 for the Right Direction Shortest Distance:

$$\min X \text{ of the foreground region for the label } i \leq \min X \text{ of the foreground region for the label } j$$

The fifth condition utilized by the adjacent bounding box distance calculating portion 94 for the determination is that the calculated distance Dist is smaller than the stored right direction shortest distance with respect to another foreground region for the foreground region of the label i.

Condition 5 for the Right Direction Shortest Distance:

$$\text{Dist} < \text{the stored right direction shortest distance}$$

When having determined that the conditions 1-5 for the right direction shortest distance are satisfied, the adjacent bounding box distance calculating portion 94 stores the calculated Dist as the right direction shortest distance. When having determined at the step S84 that the foreground region of the label j is not positioned in the right direction of the foreground region of the label i (S84: NO), the adjacent bounding box distance calculating portion 94 determines whether the foreground region of the label j is positioned in the upper direction for the foreground region of the label i or not (step S86). In the determination at the step S86, it is determined whether the region of the label i partially or wholly overlaps with the foreground region of the label j in the vertical direction or not, as the foreground region of the label j has been determined in the direction determination process at the step S83 to be positioned at the upper side of the foreground region of the label i. The adjacent bounding box distance calculating portion 94 utilizes the following condition for determining the overlap in the vertical direction.

Overlap Condition in the Vertical Direction:

$$\max X \text{ of the foreground region for the label } i > \min X \text{ of the foreground region for the label } j, \text{ and}$$

$$\min X \text{ of the foreground region for the label } i < \max X \text{ of the foreground region for the label } j.$$

When the foreground region of the label j is determined by the direction determination process at the step S83 to be positioned at the upper side of the foreground region of the label i and the overlap condition in the vertical direction described above is satisfied, the adjacent bounding box distance calculating portion 94 determines that the foreground region of the label j is positioned in the upper direction of the foreground region of the label i (step S86: YES), and performs an upper direction shortest distance calculation process (step S 87). In the upper direction shortest distance calculation process, the adjacent bounding box distance calculating portion 94 utilizes the following formula for calculating the distance Dist between the foreground region of the label i and the foreground region of the label j.

$$\text{Dist} = \min Y \text{ of the foreground region of the label } i - \max Y \text{ of the foreground region of the label } j$$

Furthermore, the adjacent bounding box distance calculating portion 94 determines whether the following five conditions (upper direction shortest conditions 1-5) are satisfied or not. When having determined that all of the five conditions are satisfied, the adjacent bounding box distance calculating portion 94 treats the calculated distance Dist as the upper direction shortest distance for the foreground region of the label i, and stores it with the label j whose foreground region is positioned in the upper direction (in the case that another foreground region has already been stored as the upper direction shortest distance, the stored upper direction shortest distance is updated to be a new value). The first condition utilized by the adjacent bounding box distance calculating portion 94 for the determination is that the distance Dist is smaller than a predetermined threshold value (e.g., 36).

Condition 1 for the Upper Direction Shortest Distance:

Dist<threshold value

The second condition utilized by the adjacent bounding box distance calculating portion 94 for the determination is that the foreground region of the label i and the foreground region of the label j are merged into one bounding box, a difference between the width of the merged one bounding box and the width of the foreground region for the label i is calculated, a difference between the width of the merged one bounding box and the width of the foreground region for the label j is calculated, and smaller one of these calculated differences is smaller than a predetermined threshold value (e.g., 36).

Condition 2 for the Upper Direction Shortest Distance:

MIN (difference between the widths of the foreground for the label i before and after the unification, difference between the width of the foreground region for the label j and the width of the merged bounding box with the foreground region of the label i and the foreground region of the label j)<threshold value The third condition utilized by the adjacent bounding box distance calculating portion 94 for the determination is that the minimum coordinate min Y of the foreground region for the label j in the vertical direction is smaller than the minimum coordinate min Y of the foreground region for the label i in the vertical direction.

Condition 3 for the Upper Direction Shortest Distance:

min Y of the foreground region for the label j<min Y of the foreground region for the label i The fourth condition utilized by the adjacent bounding box distance calculating portion 94 for the determination is that the maximum coordinate max Y of the foreground region for the label i in the vertical direction is larger than the maximum coordinate max Y of the foreground region for the label j in the vertical direction.

Condition 4 for the Upper Direction Shortest Distance:

max Y of the foreground region for the label i>max Y of the foreground region for the label j The fifth condition utilized by the adjacent bounding box distance calculating portion 94 for the determination is that the calculated distance Dist is smaller than the stored upper direction shortest distance with respect to another foreground region for the foreground region of the label i.

Condition 5 for the Upper Direction Shortest Distance:

Dist<the stored upper direction shortest distance

When having determined that all of the conditions 1-5 for the upper direction shortest distance are satisfied, the adjacent bounding box distance calculating portion 94 stores the calculated Dist as the upper direction shortest distance. When having determined at the step S86 that the foreground region of the label j is not positioned in the upper direction of the foreground region of the label i (S86: NO), the adjacent bounding box distance calculating portion 94 determines whether the foreground region of the label j is positioned in the left direction for the foreground region of the label i or not (step S88). In the determination at the step S88, it is determined whether the foreground region of the label i partially or wholly overlaps with the foreground region of the label j in the horizontal direction or not, as the foreground region of the label j has been determined in the direction determination process at the step S83 to be positioned at the left side of the foreground region of the label i. The adjacent bounding box distance calculating portion 94 utilizes the same condition utilized at the step S84 for determining the overlap in the horizontal direction, in order to determine the horizontal overlap.

When it is determined at the step S83 that the foreground region of the label j is positioned at the left side of the foreground region of the label i and that the overlap condition in the horizontal direction is satisfied, the adjacent bounding box distance calculating portion 94 determines that the foreground region of the label j is positioned in the left direction for the foreground region of the label i (step S88: YES), and performs a left direction shortest distance calculation process (step S89). In the left direction shortest distance calculation process, the adjacent bounding box distance calculating portion 94 utilizes the following formula for calculating the distance Dist between the foreground region of the label i and the foreground region of the label j.

Dist=min X of the foreground region of the label i−max X of the foreground region of the label j Furthermore, the adjacent bounding box distance calculating portion 94 determines the following five conditions (left direction shortest conditions 1-5) are satisfied or not. When having determined that all of the five conditions are satisfied, the adjacent bounding box distance calculating portion 94 treats the calculated distance Dist as the left direction shortest distance for the foreground region of the label i, and stores it with the label j whose foreground region is positioned in the left direction (in the case that another foreground region has already been stored as the left direction shortest distance, the stored left direction shortest distance is updated to be a new value). The first condition utilized by the adjacent bounding box distance calculating portion 94 for the determination is that the distance Dist is smaller than a predetermined threshold value (e.g., 36).

Condition 1 for the Left Direction Shortest Distance:

Dist<threshold value

The second condition utilized by the adjacent bounding box distance calculating portion 94 for the determination is that the foreground region of the label i and the foreground region of the label j are merged into one bounding box, a difference between the height of the merged one bounding box and the height of the foreground region for the label i is calculated, a difference between the height of the merged one bounding box and the height of the foreground region for the label j is calculated, and smaller one of these calculated differences is smaller than a predetermined threshold value (e.g., 36).

Condition 2 for the Left Direction Shortest Distance:

MIN (difference between the heights of the foreground for the label i before and after the unification, difference between the height of the foreground region for the label j and the height of the merged bounding box with the foreground region of the label i and the foreground region of the label j)<threshold value The third condition utilized by the adjacent bounding box distance calculating portion 94 for the determination is that the minimum coordinate min X of the foreground region for the label j in the horizontal direction is smaller than the minimum coordinate min X of the foreground region for the label i in the horizontal direction.

Condition 3 for the Left Direction Shortest Distance:

min X of the foreground region for the label j<min X of the foreground region for the label i The fourth condition utilized by the adjacent bounding box distance calculating portion 94 for the determination is that the maximum coordinate max X of the foreground region for the label i in the horizontal direction is larger than the maximum coordinate max X of the foreground region for the label j in the horizontal direction.

Condition 4 for the Upper Direction Shortest Distance:

max $X$ of the foreground region for the label $i$>max $X$ of the foreground region for the label $j$ The fifth condition utilized by the adjacent bounding box distance calculating portion 94 for the determination is that the calculated distance Dist is smaller than the stored left direction shortest distance with respect to another foreground region for the foreground region of the label i.

Condition 5 for the Left Direction Shortest Distance:

Dist<the stored left direction shortest distance

When having determined that all of the conditions 1-5 for the left direction shortest distance are satisfied, the adjacent bounding box distance calculating portion 94 stores the calculated Dist as the left direction shortest distance. When having determined at the step S88 that the foreground region of the label j is not positioned in the left direction of the foreground region of the label i (S88: NO), the adjacent bounding box distance calculating portion 94 determines whether the foreground region of the label j is positioned in the lower direction for the foreground region of the label i or not (step S90). In the determination at the step S90, it is determined whether the region of the label i partially or wholly overlaps with the foreground region of the label j in the vertical direction or not, as the foreground region of the label j has been determined in the direction determination process at the step S83 to be positioned at the lower side of the foreground region of the label i. The adjacent bounding box distance calculating portion 94 utilizes the same condition utilized at the step S86 for determining the overlap in the vertical direction, in order to determine the vertical overlap.

When it is determined at the step S83 that the foreground region of the label j is positioned at the lower side of the foreground region of the label i and that the overlap condition in the vertical direction is satisfied, the adjacent bounding box distance calculating portion 94 determines that the foreground region of the label j is positioned in the lower direction for the foreground region of the label i (step S90: YES), and performs a lower direction shortest distance calculation process (step S91). In the lower direction shortest distance calculation process, the adjacent bounding box distance calculating portion 94 utilizes the following formula for calculating the distance Dist between the foreground region of the label i and the foreground region of the label j.

Dist=min $Y$ of the foreground region of the label $j$−max $Y$ of the foreground region of the label $i$ Furthermore, the adjacent bounding box distance calculating portion 94 determines the following five conditions (lower direction shortest conditions 1-5) are satisfied or not. When having determined that all of the five conditions are satisfied, the adjacent bounding box distance calculating portion 94 treats the calculated distance Dist as the lower direction shortest distance for the foreground region of the label i, and stores with the label j whose foreground region is positioned in the lower direction (in the case that another foreground region has already been stored as the lower direction shortest distance, the stored lower direction shortest distance is updated to be a new value). The first condition utilized by the adjacent bounding box distance calculating portion 94 for the determination is that the distance Dist is smaller than a predetermined threshold value (e.g., 36).

Condition 1 for the Lower Direction Shortest Distance:

Dist<threshold value

The second condition utilized by the adjacent bounding box distance calculating portion 94 for the determination is that the foreground region of the label i and the foreground region of the label j are merged into one bounding box, a difference between the width of the merged one bounding box and the width of the foreground region for the label i is calculated, a difference between the width of the merged one bounding box and the width of the foreground region for the label j is calculated, and smaller one of these calculated differences is smaller than a predetermined threshold value (e.g., 36).

Condition 2 for the Lower Direction Shortest Distance:

MIN (difference between the widths of the foreground for the label $i$ before and after the unification, difference between the width of the foreground region for the label $j$ and the width of the merged bounding box with the foreground region of the label $i$ and the foreground region of the label $j$)<threshold value The third condition utilized by the adjacent bounding box distance calculating portion 94 for the determination is that the maximum coordinate max Y of the foreground region for the label j in the vertical direction is larger than the maximum coordinate max Y of the foreground region for the label i in the vertical direction.

Condition 3 for the Lower Direction Shortest Distance:

max $Y$ of the foreground region for the label $j$>max $Y$ of the foreground region for the label $i$ The fourth condition utilized by the adjacent bounding box distance calculating portion 94 for the determination is that the minimum coordinate min Y of the foreground region for the label i in the vertical direction is smaller than the minimum coordinate min Y of the foreground region for the label j in the vertical direction.

Condition 4 for the Lower Direction Shortest Distance:

min $Y$ of the foreground region for the label $i$<min $Y$ of the foreground region for the label $j$ The fifth condition utilized by the adjacent bounding box distance calculating portion 94 for the determination is that the calculated distance Dist is smaller than the stored lower direction shortest distance with respect to another foreground region for the foreground region of the label i.

Condition 5 for the Lower Direction Shortest Distance:

Dist<the stored lower direction shortest distance

When having determined that all of the conditions 1-5 for the lower direction shortest distance are satisfied, the adjacent bounding box distance calculating portion 94 stores the calculated Dist as the lower direction shortest distance.

After having calculated the shortest distance at the step S85, S87, S89 or S91, or when having determined at the step S90 that the foreground region of the label j is not positioned in the lower direction of the foreground region of the label i (S90: NO), the adjacent bounding box distance calculating portion 94 determines whether the value of the current variable number j reaches to the maximum value (total number of the foreground regions) or not (step S92). When having determined that the value of the current variable number j does not reach to the maximum value (S92: NO), the adjacent bounding box distance calculating portion 94 adds 1 to the variable number j (step S93), returns the procedure to the step S83, and performs the procedure on the next pair of two foreground regions. When having determined that the value of the current variable number j reaches to the maximum value (S92: YES), the adjacent bounding box distance calculating portion 94 determines whether the value of the variable number i reaches to the maximum value (total number of the foreground regions) or not (step S94). When having determined that the value of the variable number i does not reach to the maximum value (S94: NO), the adjacent bounding box distance calculating portion 94 adds 1 to the value of the variable number i (step S95), returns the procedure to the step S82, and performs the procedure on the next pair of two foreground regions. When having determined that the value of the variable number i reaches to the maximum value (S94: YES), the adjacent bounding box distance calculating portion 94 ends the procedure.

For each foreground region in the image data to which a label is applied, the adjacent bounding box distance calculating portion 94 calculates the shortest distance between the target foreground region and another foreground region close to the target foreground region in the upward, downward, left and right directions. Then, the adjacent bounding box distance calculating portion 94 outputs the calculated result to the text string direction estimating portion 95.

For each foreground region in the bounding box information, the text string direction estimating portion 95 calculates the number of foreground regions aligned in the horizontal direction, the total length of the aligned foreground regions in the horizontal direction, the number of foreground regions in the vertical direction, and the total length of the aligned foreground regions in the vertical direction. Based on the calculated results, the text string direction estimating portion 95 compares the number of the foreground regions in the horizontal direction and the number of the foreground regions in the vertical direction, and compares the total length of the foreground regions aligned in the horizontal direction and the total length of the foreground regions aligned in the vertical direction. Based on the compared results, the text string direction estimating portion 95 estimates whether a text string in the horizontal direction or in the vertical direction is configured by the plural foreground regions or not.

Figure 27:
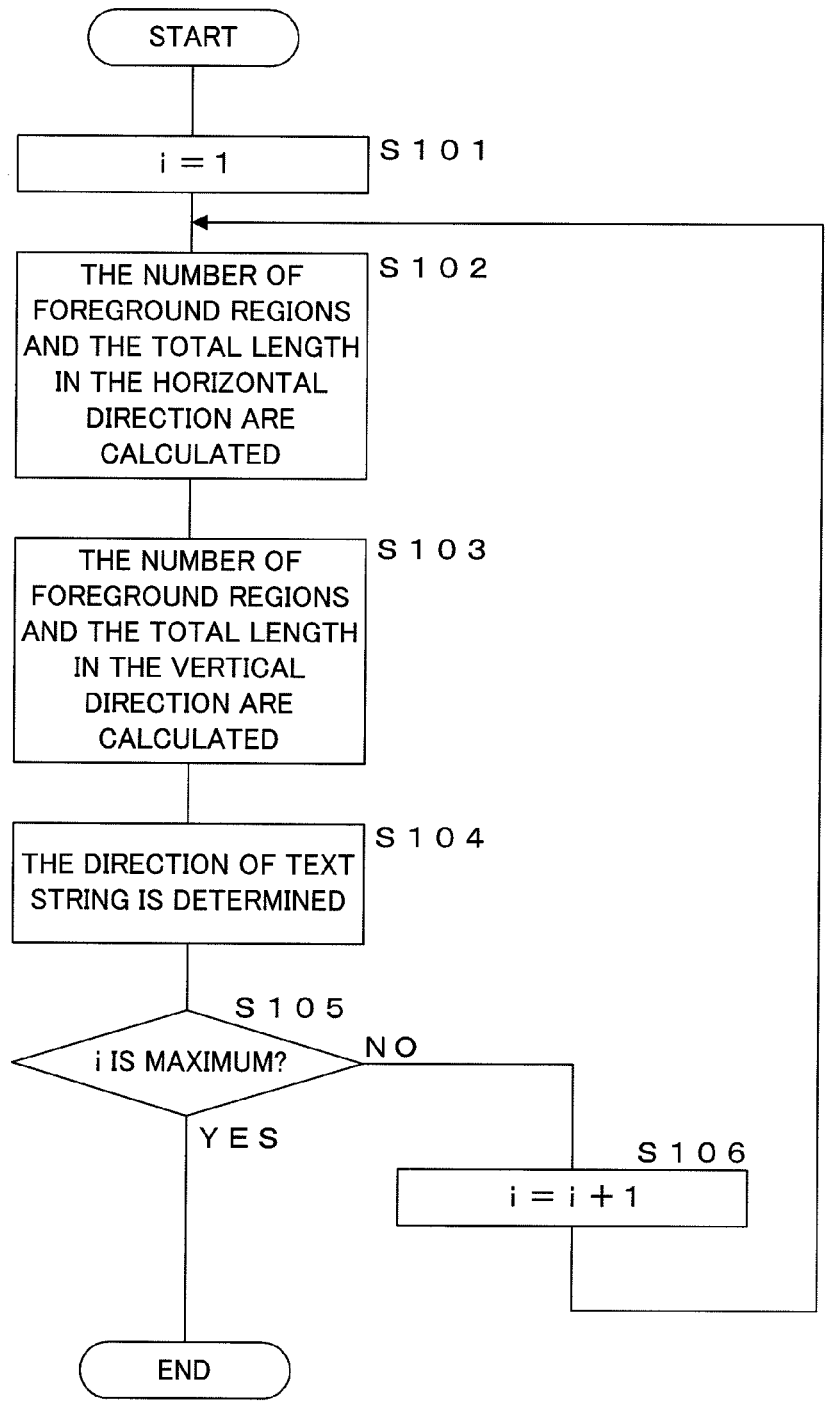
FIG. 27 is a flowchart showing a procedure performed by a text string direction estimating portion.

FIG. 27 is a flowchart showing a procedure performed by the text string direction estimating portion 95. It should be noted that the variable number i is utilized in the procedure by the labeling process portion 91 for storing the value of the label applied to each foreground region. The text string direction estimating portion 95 firstly sets 1 to the variable number i (step S101). Then, the text string direction estimating portion 95 calculates the number of foreground regions aligned in the horizontal direction and the total length of the aligned foreground regions, for the foreground regions of the label i (step S102). In the calculation processes for the number of foreground regions aligned in the horizontal direction and for the total length of the aligned foreground regions, the text string direction estimating portion 95 sequentially checks other foreground regions that are positioned in the left and right direction for the foreground region of the label i and separated from the foreground region of the label i by the shortest distance, on the basis of the calculation results obtained by the adjacent bounding box distance calculating portion 94, in order to calculate the number of foreground regions aligned in the horizontal direction and the total length of the aligned foreground regions.

Then, the text string direction estimating portion 95 calculates the number of foreground regions aligned in the vertical direction and the total length of the aligned foreground regions, for the foreground regions of the label i (step S103). In the calculation processes for the number of foreground regions aligned in the vertical direction and for the total length of the aligned foreground regions, the text string direction estimating portion 95 sequentially checks other foreground region that are positioned in the upward and downward directions for the foreground region of the label i and separated from the foreground region of the label i by the shortest distance, on the basis of the calculation results obtained by the adjacent bounding box distance calculating portion 94, in order to calculate the number of foreground regions aligned in the vertical direction and the total length of the aligned foreground regions.

Then, the text string direction estimating portion 95 determines the direction of a text string configured by plural foreground regions including the foreground region of the label i (step S104). In the text-character direction determination process, the text string direction estimating portion 95 determines on the basis of the calculation results at the step S102 and S103 whether the following conditions are satisfied or not, in order to determine the direction of the text string.

Condition for the Horizontal Direction:

the total length in the horizontal direction×the number of foreground regions in the vertical direction≦the total length in the vertical direction×the number of foreground regions in the horizontal direction, the number of foreground regions in the horizontal direction≧the threshold value 1, and the number of foreground regions in the vertical direction≧the threshold value 2, or the number of foreground regions in the horizontal direction≧the threshold 1, and the number of foreground regions in the vertical direction<the threshold 2

Condition for the Vertical Direction:

the total length in the horizontal direction×the number of foreground regions in the vertical direction≧the total length in the vertical direction×the number of foreground regions in the horizontal direction, the number of foreground regions in the vertical direction≧the threshold value 1, and the number of foreground regions in the horizontal direction≧the threshold value 2, or the number of foreground regions in the vertical direction≧the threshold 1, and the number of foreground regions in the horizontal direction<the threshold 2

When the condition for the horizontal direction described above is satisfied, the text string direction estimating portion 95 determines that the direction of the text string including the foreground region of the label i is horizontal. When the condition for the vertical direction described above is satisfied, the text string direction estimating portion 95 determines that the direction of the text string including the foreground region of the label i is vertical. When any of the conditions for the horizontal direction and the vertical direction are not satisfied, the text string direction estimating portion 95 determines that the direction of the text string including the foreground region of the label i is uncertain. Then, the text string direction estimating portion 95 stores the determination results for the text string direction, in association with the label i. It should be noted that the threshold 1 and the threshold 2 utilized in the conditions for the horizontal direction and the vertical direction are previously set, for example, to be 3.

After the text string direction determination process, the text string direction estimating portion 95 determines whether the value of the variable number i reaches to the maximum value (total number of the foreground regions) or not (step S105). When having determined that the value of the variable number i does not reach to the maximum value (step S105: NO), the text string direction estimating portion 95 adds 1 to the value of the variable number i (step S106), returns the procedure to the step S102, and performs the similar procedure on the next foreground region of the label i. When having determined that the value of the variable number i reaches to the maximum value (step S105: YES), the text string direction estimating portion 95 ends the procedure.

Figure 28:
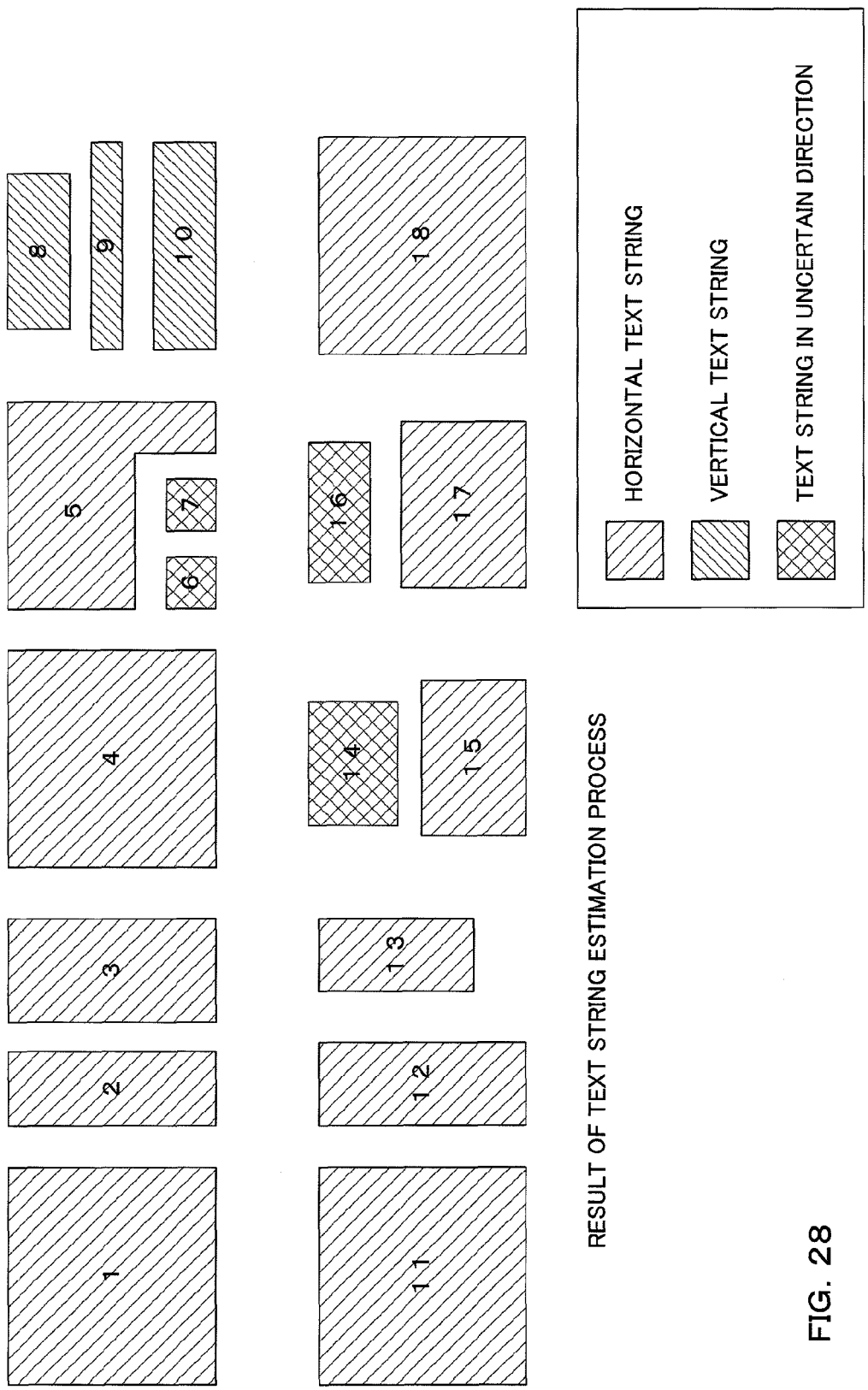
FIG. 28 is a schematic view showing an example process performed by the text string direction estimating portion.

FIG. 28 is a schematic view showing an example process performed by the text string direction estimating portion 95, in which the text string direction estimating portion 95 estimates a text string direction based on the distance calculation results shown in FIG. 25. When performing the processed described above, the text string direction estimating portion 95 can determine whether each foreground region labeled in the image data is the horizontal text string (foreground region in the horizontal text string), the vertical text string (foreground region in the vertical text string), or the uncertain foreground region. The example shown in the figure illustrates the case that foreground regions to which labels 1-5, 11-13, 15, 17 and 18 are applied are determined as the horizontal text strings, the foreground regions to which labels 8-10 are applied are determined as the vertical text strings, and the foreground regions to which labels 6, 7, 14 and 16 are applied are determined as the uncertain foreground regions. The text string direction estimating portion 95 outputs the estimation result of the text string direction for each foreground region to the text string direction correcting portion 96.

Figure 29:
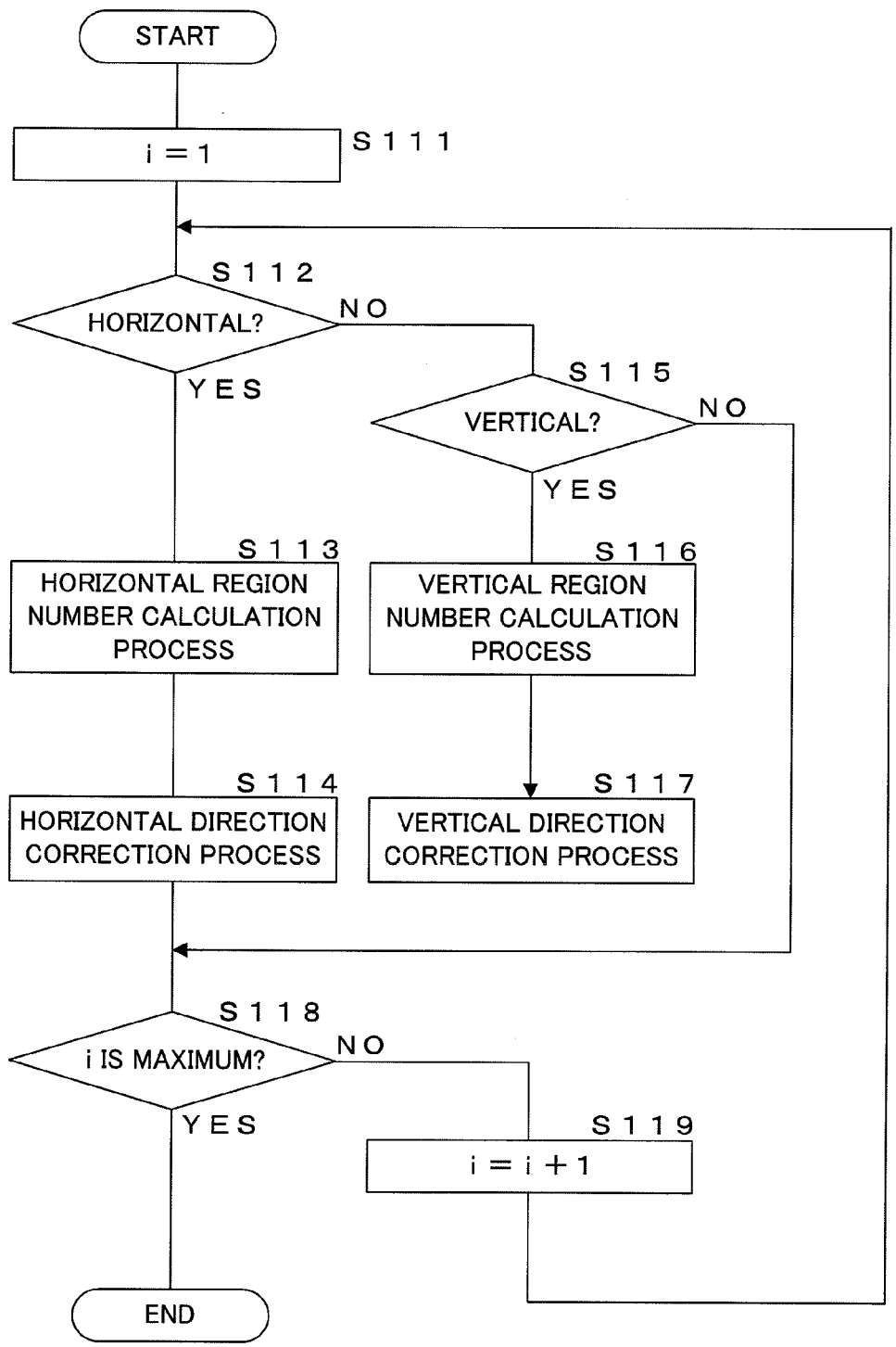
FIG. 29 is a flowchart showing a procedure performed by a text string direction correcting portion.

The text string direction correcting portion 96 determines whether the estimated direction of the text string is appropriate or not, modifies the foreground region whose direction is determined to be inappropriate, and changes the inappropriate text string direction of this invalid foreground region to be "uncertain". FIG. 29 is a flowchart showing a procedure performed by the text string direction correcting portion 96. It should be noted that the variable number i is utilized in the procedure by the labeling process portion 91 for storing the value of the label applied to each foreground region. The text string direction correcting portion 96 firstly sets 1 to the value of the variable number i (step S111).

Then, the text string direction correcting portion 96 checks whether the foreground region of the label i is included in a horizontal text string or not (step S112). When having determined that the foreground region of the label i is included in a horizontal text string (S112: YES), the text string direction correcting portion 96 performs a horizontal region number calculation process (step S113). In the horizontal region number calculation process, the text string direction correcting portion 96 checks whether each of foreground regions aligned in the horizontal direction together with the foreground region of the label i has been determined to be included in any of horizontal and vertical text strings, or not. Then, the text string direction correcting portion 96 calculates the number of foreground regions in the horizontal direction and the number of foreground regions in the vertical direction.

Based on the calculated number of foreground regions in the horizontal direction and the calculated number of foreground regions in the vertical direction, the text string direction correcting portion 96 performs a horizontal direction correction process for correcting the direction regarding the foreground region of the label i (step S114). In the horizontal direction correction process, the text string direction correcting portion 96 determines whether or not the calculated numbers of foreground regions in the horizontal and vertical directions satisfy the following condition for the horizontal direction correction. When having determined that these calculated numbers satisfy the condition for the horizontal direction correction, the text string direction correcting portion 96 corrects the direction regarding the foreground region of the label i to be uncertain. It should be noted that the threshold utilized for the condition is previously determined, for example, to be 2.

Condition for the Horizontal Direction Correction:

the number of foreground regions in the horizontal direction<the number of foreground regions in the vertical direction, or the number of foreground regions in the horizontal direction<the threshold When having determined that the foreground region of the label i is not included in a horizontal text string (S112: NO), the text string direction correcting portion 96 determines whether the foreground region of the label i is included in a vertical text string or not (step S115). When having determined that the foreground region of the label i is included in a vertical text string (S115: YES), the text string direction correcting portion 96 performs a vertical region number calculation process (step S116). In the vertical region number calculation process, the text string direction correcting portion 96 checks whether each of foreground regions aligned in the vertical direction together with the foreground region of the label i has been determined to be included in any of horizontal and vertical text strings, or not. Then, the text string direction correcting portion 96 calculates the number of foreground regions in the vertical direction and the number of foreground regions in the horizontal direction.

Based on the calculated number of foreground regions in the vertical direction and the calculated number of foreground regions in the horizontal direction, the text string direction correcting portion 96 performs a vertical direction correction process for correcting the direction regarding the foreground region of the label i (step S117). In the vertical direction correction process, the text string direction correcting portion 96 determines whether or not the calculated numbers of foreground regions in the vertical and horizontal directions satisfy the following condition for the vertical direction correction. When having determined that these calculated numbers satisfy the condition for the vertical direction correction, the text string direction correcting portion 96 corrects the direction regarding the foreground region of the label i to be uncertain. It should be noted that the threshold utilized for the condition is previously determined, for example, to be 2.

Condition for the Vertical Direction Correction:

the number of foreground regions in the vertical direction<the number of foreground regions in the horizontal direction, or the number of foreground regions in the vertical direction<the threshold After performing the correction process at the step S114 or S117, or when having determined at the step S115 that the foreground region of the label i is not included in a vertical text string (S115: NO), the text string direction correcting portion 96 determines whether the number of the variable number i reaches to the maximum value (total number of the foreground regions) or not (step S118). When having determined that the number of the variable number i does not reach to the maximum value (S118: NO), the text string direction correcting portion 96 adds 1 to the value of the variable number i (step S119), returns the procedure to the step S112, and performs similar procedure on the next foreground region of the label i. When having determined that the number of the variable number i reaches to the maximum value (S118: YES), the text string direction correcting portion 96 ends the procedure.

Figure 30:
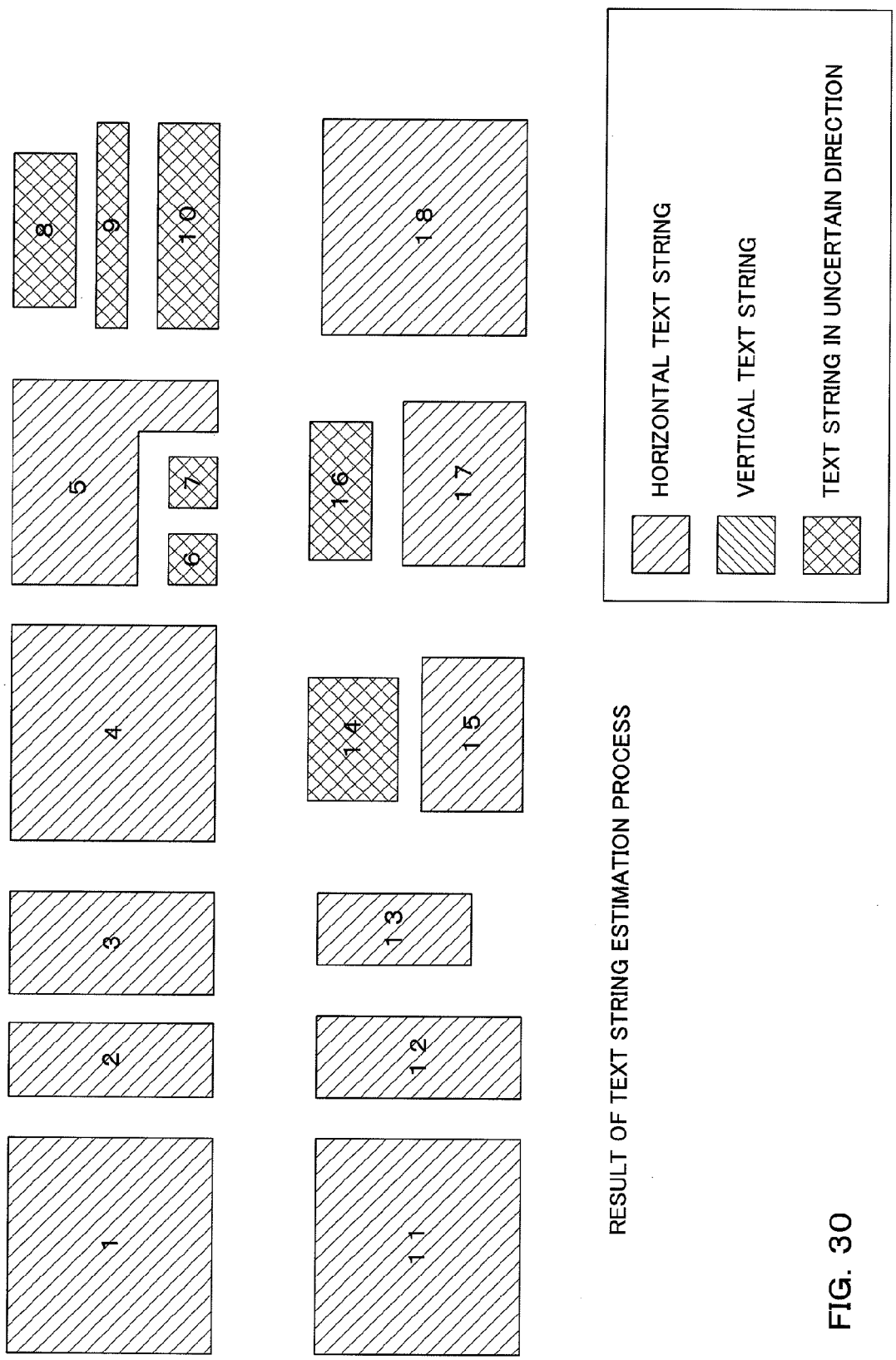
FIG. 30 is a schematic view showing an example process performed by the text string direction correcting portion.
Figure 31:
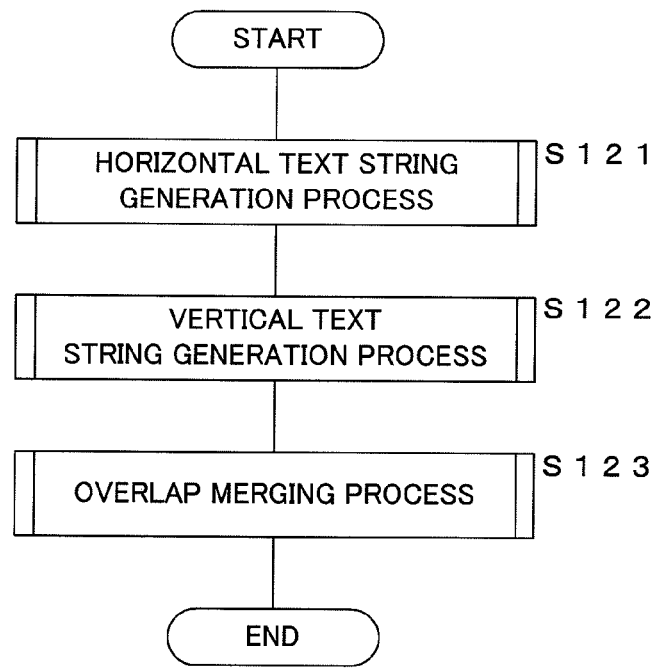
FIG. 31 is a flowchart showing a procedure performed by a text string region extracting portion.
Figure 32:
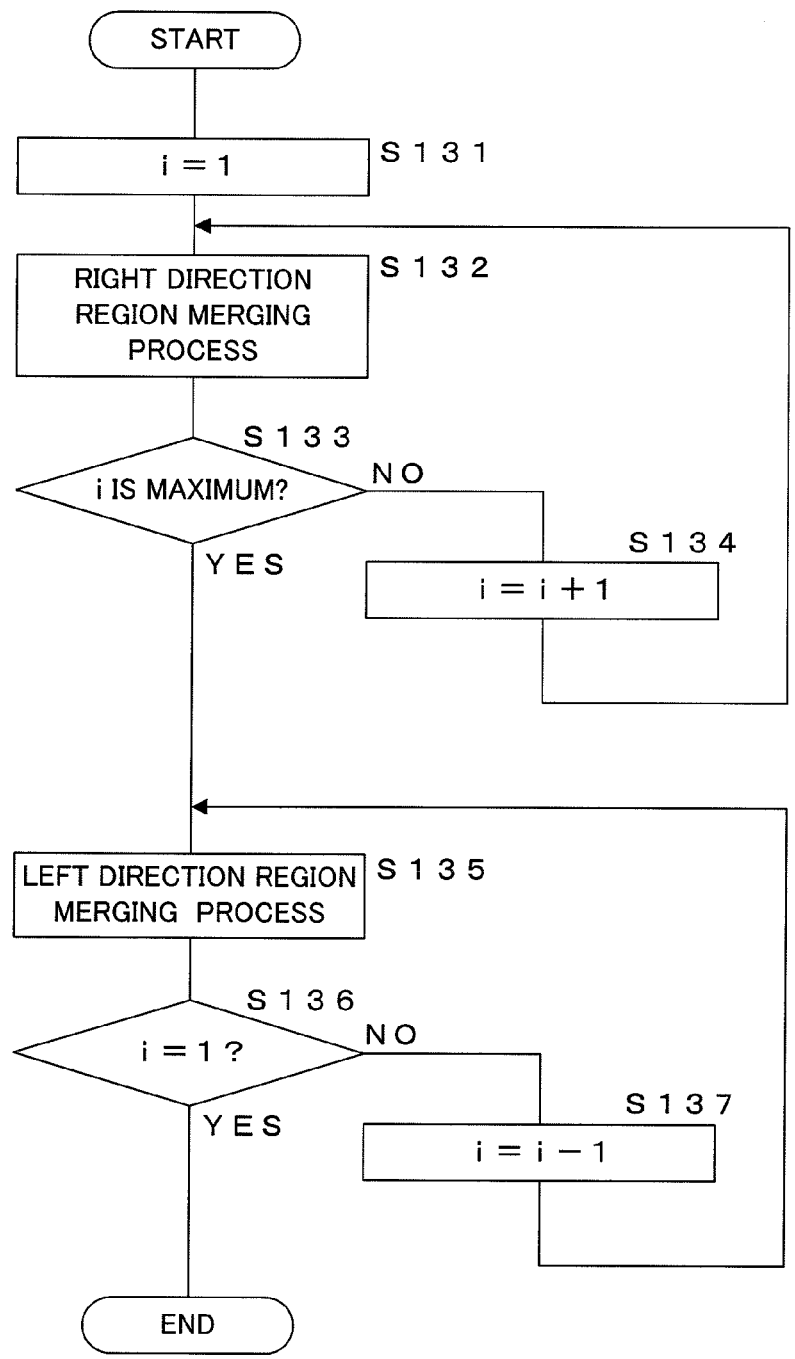
FIG. 32 is a flowchart showing another procedure performed by the text string region extracting portion.
Figure 33:
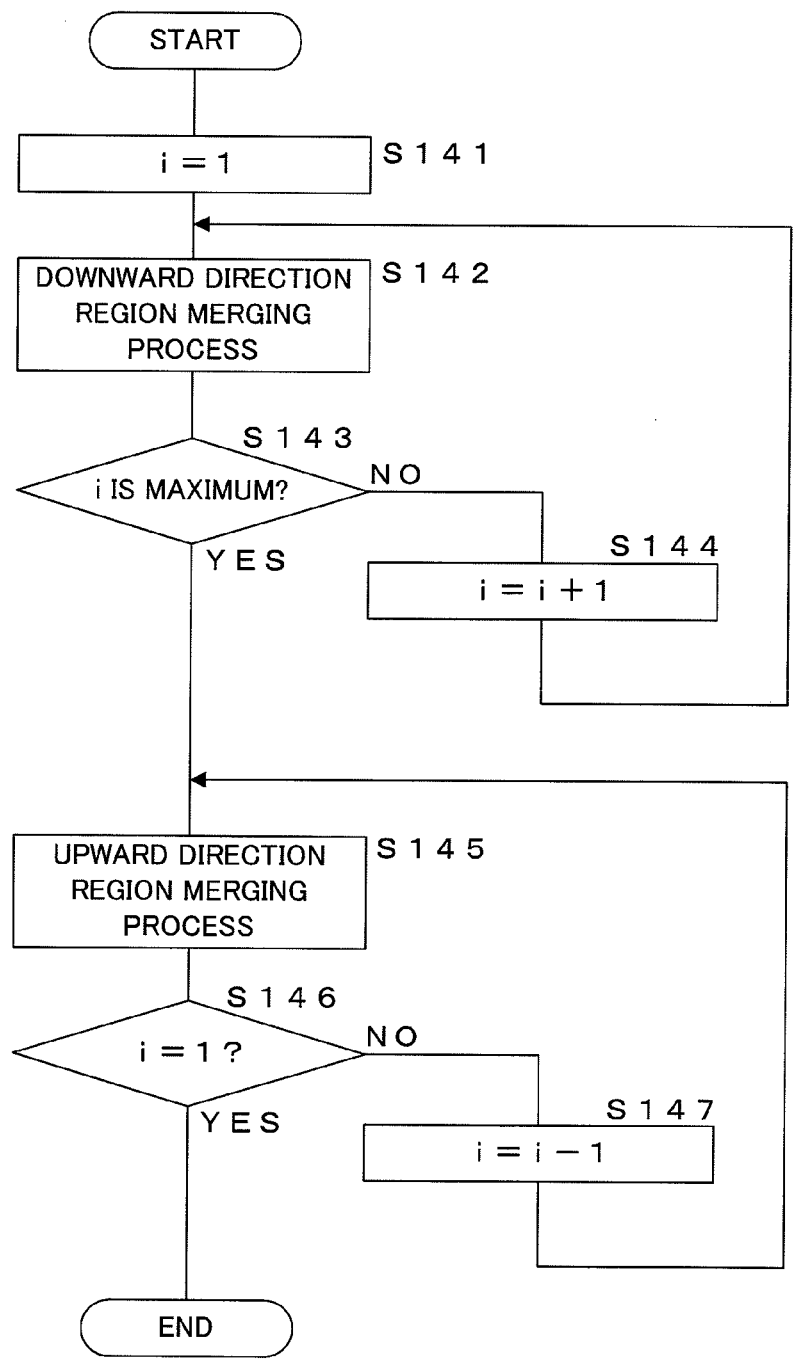
FIG. 33 is a flowchart showing another procedure performed by the text string region extracting portion.
Figure 34:
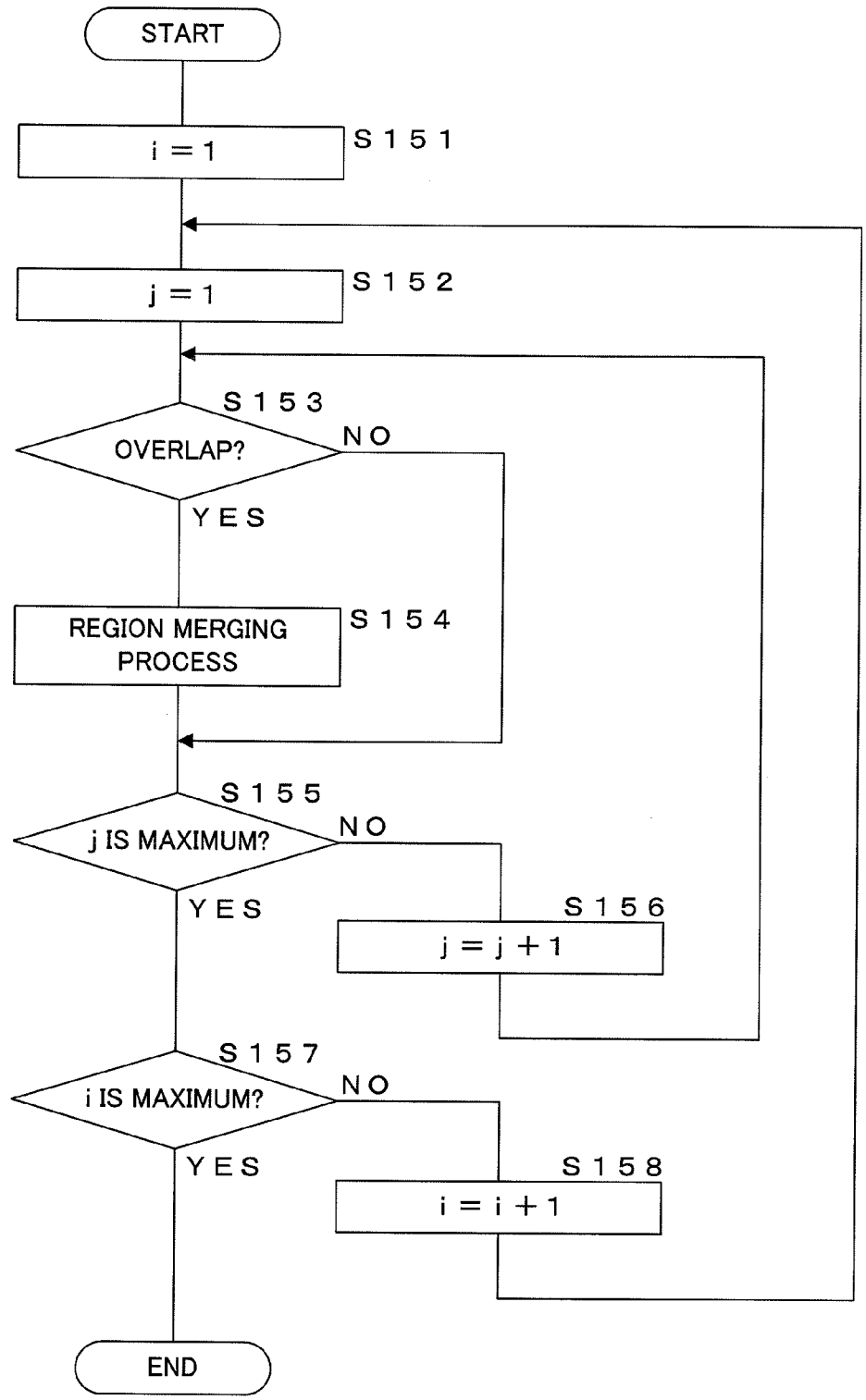
FIG. 34 is a flowchart showing another procedure performed by the text string region extracting portion.

FIG. 30 is a schematic view showing an example process performed by the text string direction correcting portion 96, in which the text string direction correcting portion 96 has corrected the text string direction based on the result of the text string direction estimating process shown in FIG. 28. When having performed the process described above, the text string direction correcting portion 96 determines whether each estimated direction of the text string by the text string direction estimating portion 95 is appropriate or not, modifies the foreground region whose direction is determined to be inappropriate, and changes the invalid text string direction of this invalid foreground region to be "uncertain". The example shown in the figure illustrates the case that the text string direction correcting portion 96 determines that directions of foreground regions 8-10 are not appropriate and modifies these foreground regions to be "uncertain". The text string direction correcting portion 96 corrects the text string direction of each foreground region, and outputs to the corrected direction to the text string region extracting portion 97.

The text string region extracting portion 97 finds foreground regions having the same text string direction in the image data, extracts plural foreground regions as the text string. The plural foreground regions to be extracted should be arranged close to each other with proper positional relationships in a direction perpendicular to the text string direction. Based on the extracted plural foreground regions, the text string region extracting portion 97 generates and outputs information regarding the text string (text string information). FIG. 31-FIG. 34 are flowcharts showing procedures performed by the text string region extracting portion 97. The text string region extracting portion 97 performs a horizontal text string generation process (step S121), in which plural foreground regions whose text string directions are determined to be horizontal or uncertain are merged in the horizontal direction and thus a horizontal text string is generated. Similarly, the text string region extracting portion 97 performs a vertical text string generation process (step S122), in which plural foreground regions whose text string directions are determined to be vertical or uncertain are merged in the vertical direction and thus a vertical text string is generated. Then, the text string region extracting portion 97 performs an overlap unification process (step S123) and ends the procedure. In the overlap unification process, a foreground region overlapping with the horizontal text string and the vertical text string is merged into one of these text strings.

In the horizontal text string generation process at the step S121, the text string region extracting portion 97 firstly sets 1 to the value of the variable number i (step S131). It should be noted that the variable number i is utilized for storing the value of labels applied to foreground regions in the image data. Then, the text string region extracting portion 97 performs a right direction region unifying process on the foreground region of the label i (step S132). In the right direction region unifying process, the text string region extracting portion 97 determines whether a foreground region sequentially positioned in the right direction for the foreground region of the label i whose text string direction is determined to be horizontal should be merged as the horizontal text string into the foreground region of the label i or not. The text string region extracting portion 97 obtains the minimum coordinate upper_pos and the maximum coordinate lower_pos in the vertical direction for the text-string character string (plural foreground regions) included in the foreground region of the label i, and merges the foreground region positioned in the right direction into the foreground region of the label i when the minimum coordinate min Y and the maximum coordinate max Y in the vertical direction for the foreground region positioned in the right direction satisfy the following condition for the horizontal unification. It should be noted that the offset utilized in the condition for the horizontal unification may be a predetermined-fixed value (e.g., 8) or a value in which a predetermined coefficient (e.g., 0.8) is multiplied to the difference value between the lower_pos and the upper_pos.

Condition for the Horizontal Unification:

min Y of the foreground region in the right direction≧(upper_pos−offset), and max Y of the foreground region in the right direction≦(lower_pos−offset)

After the right direction region unifying process, the text string region extracting portion 97 determines whether the value of the variable number i reaches to the maximum value (total number of foreground regions) or not (step S133). When having determined that the value of the variable number i does not reach to the maximum value (S133: NO), the text string region extracting portion 97 adds 1 to the value of the variable number i (step S134), returns the procedure to the step S132, and performs the similar procedure on the next foreground region of the label i.

When having determined that the value of the variable number i reaches to the maximum value (S133: YES), the text string region extracting portion 97 performs a left direction region unifying process for the foreground region of label i (step S135). In the left direction region unifying process, the text string region extracting portion 97 determines whether a foreground region sequentially positioned in the left direction for the foreground region of the label i whose text string direction is determined to be horizontal should be merged as the horizontal text string into the foreground region of the label i or not. The left direction region unifying process is similar to the right direction region unifying process, but performed on the foreground region of the label i in the left direction. Furthermore, the left direction region unifying process utilizes a condition for the horizontal unification similar to the condition of the right direction region unifying process, in which the min Y and the max Y of the foreground region in the right direction are changed to be the min Y and max Y of the foreground region in the left direction.

After the left direction region absorption process, the text string region extracting portion 97 determines whether the value of the variable number i is 1 or not (step S136). When having determined that the value of the variable number i is not 1 (S136: NO), the text string region extracting portion 97 subtracts 1 from the value of the variable number i (step S137), returns the procedure to the step S135, and performs the similar procedure on the previous foreground region of the label i. When having determined that the value of the variable number i is 1 (S136: YES), the text string region extracting portion 97 ends the horizontal text string generation process.

In the vertical text string generation process at the step S122, the text string region extracting portion 97 firstly sets 1 to the value of the variable number i (step S141). It should be noted that the variable number i is utilized for storing the value of the label applied to each foreground region in the image data. Then, the text string region extracting portion 97 performs a downward direction region unifying process on the foreground region of the label i (step S142). In the downward direction region unifying process, the text string region extracting portion 97 determines whether a foreground region sequentially positioned in the downward direction for the foreground region of the label i whose text string direction is determined to be vertical should be merged as the vertical text string into the foreground region of the label i or not. The text string region extracting portion 97 obtains the minimum coordinate left_pos and the maximum coordinate right_pos in the horizontal direction for the text-string character string (plural foreground regions) included in the foreground region of the label i, and merges the foreground region positioned in the downward direction into the foreground region of the label i when the minimum coordinate min X and the maximum coordinate max X in the horizontal direction for the foreground region positioned in the downward direction satisfy the following condition for the vertical unification. It should be noted that the offset utilized in the condition for the vertical unification may be a predetermined-fixed value (e.g., 8) or a value in which a predetermined coefficient (e.g., 0.2) is multiplied to the difference value between the left_pos and the right_pos.

Condition for the Vertical Unification:

min $X$ of the foreground region in the downward direction$\geq$(left_pos−offset), and max $X$ of the foreground region in the downward direction$\leq$(right_pos+offset)

After the downward direction region unifying process, the text string region extracting portion 97 determines whether the value of the variable number i reaches to the maximum value (total number of foreground regions) or not (step S143). When having determined that the value of the variable number i does not reach to the maximum value (S143: NO), the text string region extracting portion 97 adds 1 to the value of the variable number i (step S144), returns the procedure to the step S142, and performs the similar procedure on the next foreground region of the label i.

When having determined that the value of the variable number i reaches to the maximum value (S143: YES), the text string region extracting portion 97 performs an upward direction region unifying process (step S145). In the upward direction region unifying process, the text string region extracting portion 97 determines whether a foreground region sequentially positioned in the upward direction for the foreground region of the label i whose text string direction is determined to be vertical should be merged as the vertical text string into the foreground region of the label i or not. The upward direction region unifying process is similar to the downward direction region unifying process, but performed on the foreground region of the label i in the upward direction. Furthermore, the upward direction region unifying process utilizes a condition for the vertical unification similar to the condition of the downward direction region unifying process, in which the min X and the max X of the foreground region in the downward direction are changed to be the min X and max X of the foreground region in the upward direction.

After the upward direction region unifying process, the text string region extracting portion 97 determines whether the value of the variable number i is 1 or not (step S146). When having determined that the value of the variable number i is not 1 (S146: NO), the text string region extracting portion 97 subtracts 1 from the value of the variable number i (step S147), returns the procedure to the step S145, and performs the similar procedure on the previous foreground region of the label i. When having determined that the value of the variable number i is 1 (S146: YES), the text string region extracting portion 97 ends the vertical text string generation process.

In the overlap unification process at the step S123, the text string region extracting portion 97 firstly sets 1 to the value of the variable number i (step S151), and sets 1 to the value of the variable number j (step S152). It should be noted that the variable number i is utilized for storing the value of the label applied to the text string which is generated by the horizontal text string generation process or the vertical text string generation process having merged the plural foreground regions, and that the variable number j is utilized for storing the value of the label applied to each foreground region in the image data.

Then, the text string region extracting portion 97 determines whether the text string region of the label i overlaps with the foreground region of the label j or not (step S153). The determination whether the text string region of the label i overlaps with the foreground region of the label j or not may be based on the determination whether the following overlap determination condition is satisfied or not (i.e., whether the foreground region of the label j is within the text string region of label i or not). It should be noted that the min X, the min Y, the max X and the max Y in the overlap determination condition correspond to the horizontal minimum coordinate, the vertical minimum coordinate, the horizontal maximum coordinate and the vertical maximum coordinate, respectively, of each foreground region or each text string region.

Overlap Determination Condition:

min $X$ for the foreground region of the label $j$$\geq$min $X$ for the text string region of the label $i$;

min $Y$ for the foreground region of the label $j$$\geq$min $Y$ for the text string region of the label $i$;

max $X$ for the foreground region of the label $j$$\leq$max $X$ for the text string region of the label $i$; and max $Y$ for the foreground region of the label $j$$\leq$max $Y$ for the text string region of the label $i$.

When having determined that the text string region of the label i overlaps with the foreground region of the label j (S153: YES), the text string region extracting portion 97 performs a region unification process in which the foreground region of the label j is merged into the text string of the label i (step S154). When having determined that the text string region of the label i does not overlap with the foreground region of the label j (S153: NO), the text string region extracting portion 97 forwards the procedure to the step S155 without performing the region unifying process. The text string region extracting portion 97 determines whether the value of the variable number j reaches to the maximum value (total number of foreground regions) or not (step S155). When having determined that the value of the variable number j does not reach to the maximum value (S155: NO), the text string region extracting portion 97 adds 1 to the value of the variable number j (step S156), returns the procedure to the step S153, and performs a similar procedure on the next foreground region of the label j.

When having determined that the value of the variable number j reaches to the maximum value (S155: YES), the text string region extracting portion 97 determines whether the value of the variable number i reaches to the maximum value (total number of foreground regions) or not (step S157). When having determined that the value of the variable number i does not reach to the maximum value (S157: NO), the text string region extracting portion 97 adds 1 to the value of the variable number i (step S158), returns the procedure to the step S152, and performs a similar procedure on the next text string of the label i. When having determined that the value of the variable number i reaches to the maximum value (S157: YES), the text string region extracting portion 97 ends the overlap unifying process.

Figure 35:
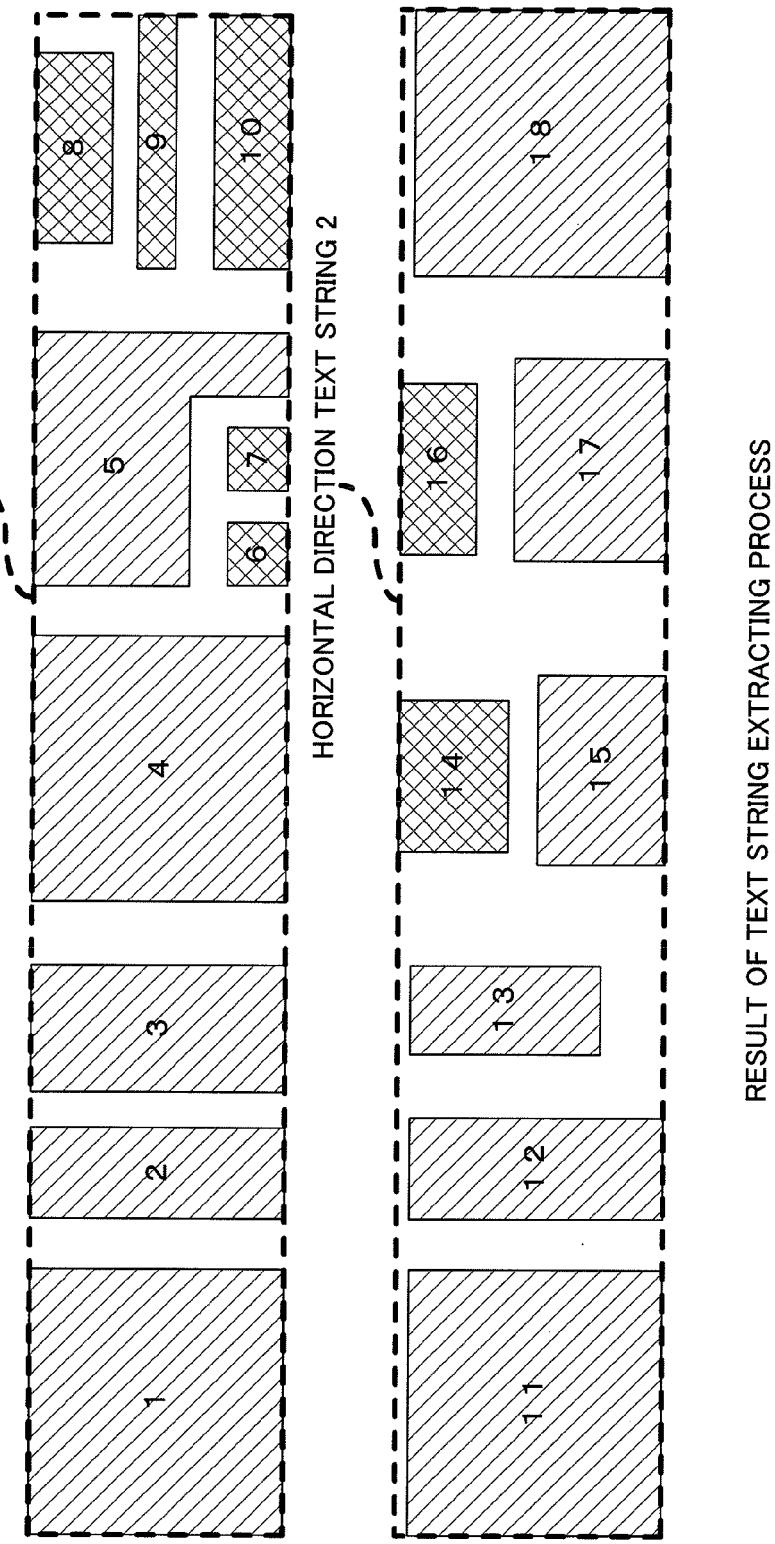
FIG. 35 is a schematic view showing an example process performed by the text string region extracting portion.

FIG. 35 is a schematic view showing an example process performed by the text string region extracting portion 97, in which the text string region extracting portion 97 extracts the text string from the result of the text string direction correction process shown in FIG. 30. When performs the process described above, the text string region extracting portion 97 merges plural foreground regions in the image data and extracts the horizontal text string or the vertical text string. The example shown in the figure illustrates the case that the foreground regions 1-10 are extracted as the horizontal direction text string 1 and the foreground regions 11-18 are extracted as the horizontal text string 2. The text string region extracting portion 97 outputs text string information to the non-text character string region removing portion 98, as the text string information is the extracted result of the text string.

The non-text character string region removing portion 98 performs a removing process, in which a text string whose region width or region height is not more than a predetermined value (e.g., 4) is removed from the text strings extracted by the text string region extracting portion 97, in order to remove something unlike the text string with respect to the region size.

Remove Condition:

width of the text string region≦threshold value; or height of the text string region<threshold value.

As described above, the layout analysis processing section 53 can extract the text string in the image data from the foreground pixel-block mask and the line information obtained from the line detection process section 52, and output the text string information, i.e., information regarding the extracted text string, to the foreground layer generating section 54.

(4) Foreground Layer Generating Section 54

Figure 36:
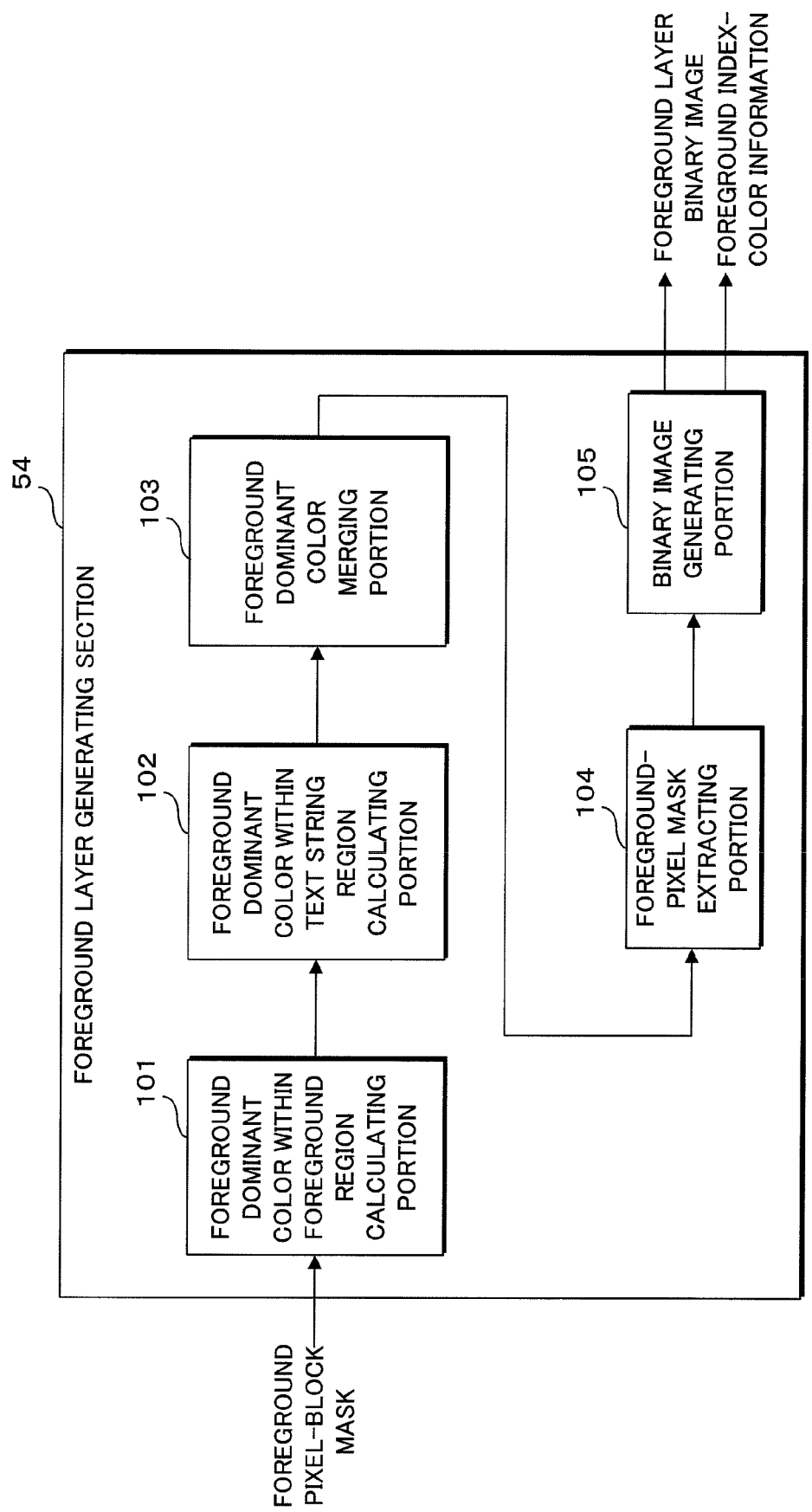
FIG. 36 is a block diagram showing a configuration of a foreground layer generating section.
Figure 37:
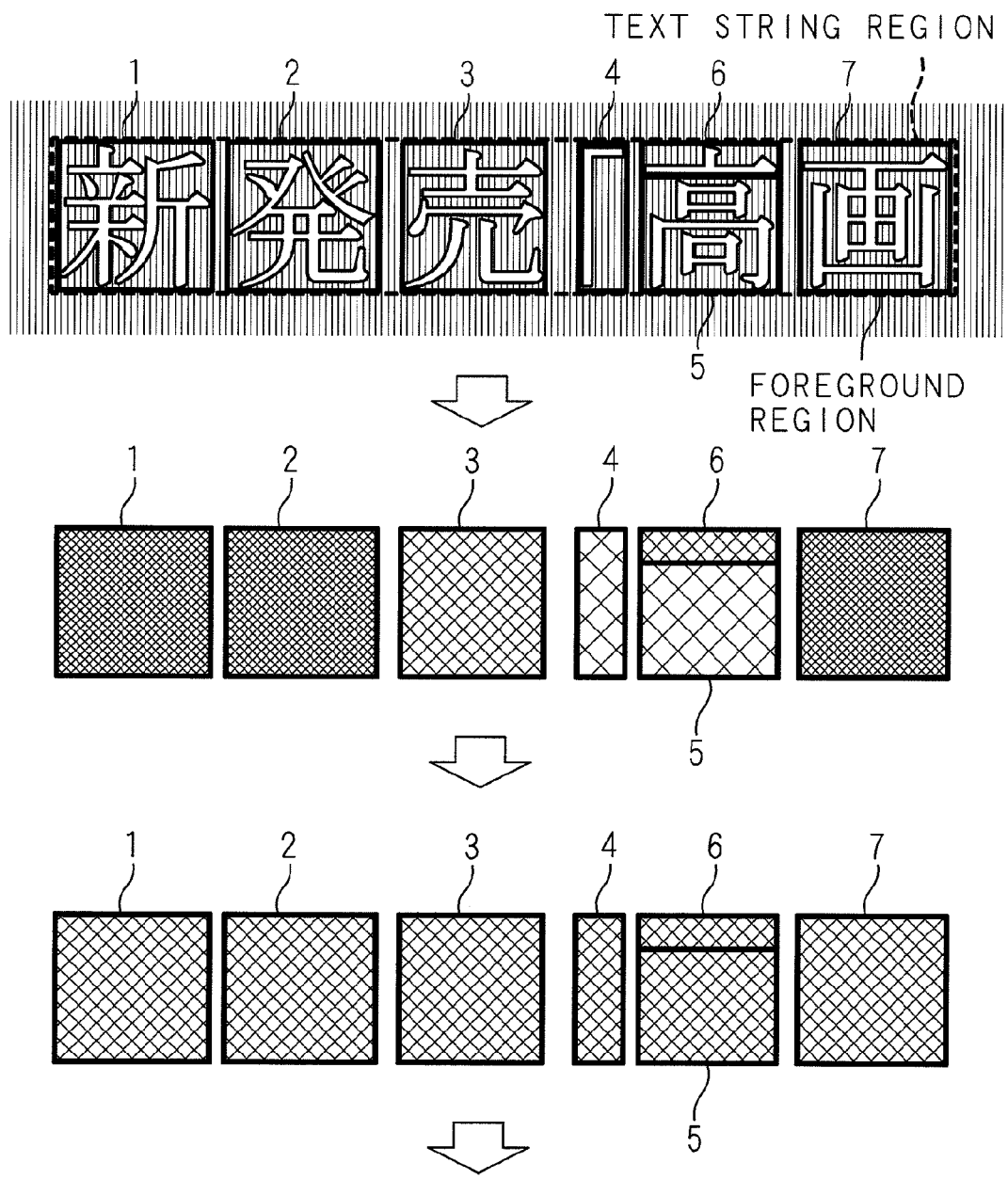
FIG. 37 is a schematic view for explaining an outline of a process performed by the foreground layer generating section.

FIG. 36 is a block diagram showing a configuration of the foreground layer generating section 54. FIG. 37 is a schematic view for explaining an outline of a process performed by the foreground layer generating section 54. Based on the foreground pixel-block mask output from the line detection process section 52 and the text string information output from the layout analysis processing section 53, the foreground layer generating section 54 generates the foreground mask which is the positional information of the foreground pixel and the foreground index-color information in which the indexing process is performed on the color of the foreground pixel, for finally outputting the binary image corresponding to each foreground index color and the foreground index-color information. For the process, the foreground layer generating section 54 includes a foreground dominant-color within foreground region calculating portion 101, a foreground dominant-color within text string region calculating portion 102, a foreground dominant-color merging portion 103, a foreground-pixel mask extracting portion 104 and a binary image generating portion 105.

The foreground layer generating section 54 firstly makes the foreground dominant-color within foreground region calculating portion 101 calculate a foreground dominant color for each foreground region of the foreground pixel-block mask. Based on the foreground dominant color for each foreground region, the foreground dominant-color within text string region calculating portion 102 calculates a foreground dominant color of each text string region in the text string information output from the layout analysis processing section 53. The foreground dominant-color merging portion 103 performs an unifying process of foreground dominant colors of each text string region in the image data for each page, to reduce the number of foreground dominant colors required for drawing the whole of each page. The foreground-pixel mask extracting portion 104 compares the pixel value of each foreground region in the image data, the foreground dominant color of each foreground region and/or the foreground dominant color of the text string region, to extract the foreground pixel. Then, the foreground-pixel mask extracting portion 104 generates and outputs the foreground pixel mask that is the extracted result of the foreground pixel. The binary image generating portion 105 outputs the binary image in which the extracted foreground pixel is associated with the foreground dominant color of the text string region.

Based on the value of the label applied to the foreground region by the labeling process portion 91 of the layout analysis processing section 53 and the pixel-block foreground dominant color generated by the foreground extracting section 51, the foreground dominant-color within foreground region calculating portion 101 calculates the foreground dominant color of the foreground region. The foreground dominant-color within foreground region calculating portion 101 firstly extracts a target that is a bounding box region surrounding the foreground region to which the label is applied, and calculates the average value of the pixel-block foreground dominant color (whose foreground dominant color does not have an uncertain value) for this bounding box region. Then, the foreground dominant-color within foreground region calculating portion 101 quantizes the pixel-block foreground dominant color of the foreground pixel block in the target bounding box region.

Figure 38B:
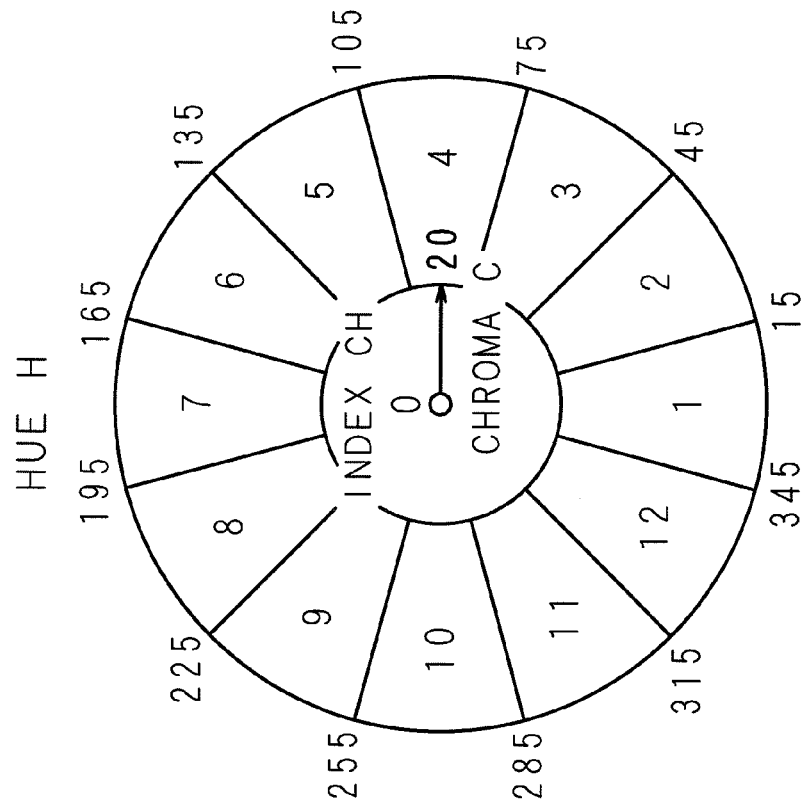
FIG. 38A and FIG. 38B are schematic views for explaining a quantization of a pixel-block foreground dominant color.
Figure 38A:
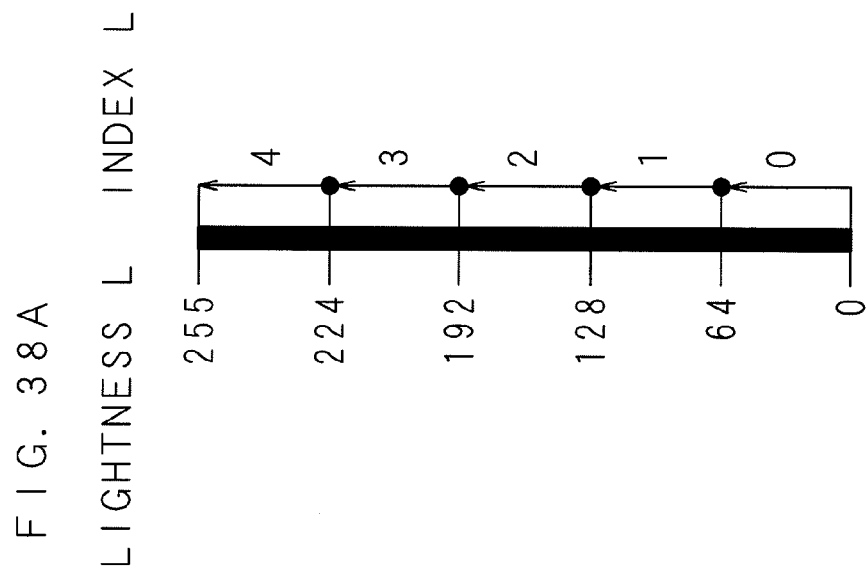

FIGS. 38A and 38B are schematic views for explaining a quantization of the pixel-block foreground dominant color. The foreground dominant-color within foreground region calculating portion 101 converts the pixel-block foreground dominant color into the color of LCH color space, quantizes the lightness L by five stages of lightness range, and quantizes the chroma C and the hue H by thirteen stages configured with one achromatic color and twelve chromatic colors. In this embodiment as shown in FIG. 38A, the index L=0 is assigned to the lightness L=0-63, the index L=1 is assigned to the lightness L=64-127, the index L=2 is assigned to the lightness L=128-191, the index L=3 is assigned to the lightness L=192-223, and the index L=4 is assigned to the lightness L=224-255. In this embodiment as shown in FIG. 38B, the chroma C and the hue H are treated as the vector, the index CH=0 is assigned to the chroma C (which indicates the vector length)=0-20, and the indexes CH=1-12 are assigned to the chroma C>20 in accordance with the value of the hue H (which indicates the vector angle).

The foreground dominant-color within foreground region calculating portion 101 calculates a cumulative sum of the pixel blocks and a cumulative sum of the pixel-block foreground dominant colors for each quantization level (each index described above) of the quantized pixel-block foreground dominant color, and calculates the foreground dominant color of the foreground region, based on the maximum quantization level whose pixel block number is the maximum, and the cumulative sums of the number of pixel blocks and of the pixel-block foreground dominant color for the quantization level near the maximum quantization level. For example, the foreground dominant-color within foreground region calculating portion 101 may utilize the average value of the pixel-block foreground dominant color for the pixel blocks in the foreground region, as the foreground dominant color of the foreground region. It is possible to prevent the over-segmentation of the foreground dominant color, by the calculation of the foreground dominant color for each foreground region.

The foreground dominant-color within text string region calculating portion 102 calculates the foreground dominant color of the text string region, based on the foreground dominant color of each foreground region calculated by the foreground dominant-color within foreground region calculating portion 101. The foreground dominant-color within text string region calculating portion 102 firstly quantizes the foreground dominant color of the foreground region in each text string region (the procedure of the quantization process is similar to the procedure performed by the foreground dominant-color within foreground region calculating portion 101). By the quantization, the foreground dominant color is segmented into 5×13=65 kinds, with respect to the index L for the lightness and the index CH for the chroma and the hue.

Then, the foreground dominant-color within text string region calculating portion 102 applies a label to each quantization level (each index), based on the lightness quantized into the five stages. At that time, the foreground dominant-color within text string region calculating portion 102 recognizes that an index whose pixel number (the number of pixel blocks) is not less than a predetermine threshold is the target to which the label should be applied, and that an index whose pixel number is less than the predetermine threshold is not the target to which the label should be applied. It should be noted that the threshold for determining the target to which the label should be applied may be a predetermined-fixed value, or a value in which a predetermined coefficient (e.g., 0.1) is multiplied to the number of pixels in the target text string region.

The foreground dominant-color within text string region calculating portion 102 checks the index whose number of pixels is not less than the predetermine threshold, sequentially from the lightness index L=0, for applying the label. When there is a sequence of target indexes, the same label is applied to these continuous target indexes to unify these target indexes. In addition, the foreground dominant-color within text string region calculating portion 102 adds the number of pixel blocks regarding these indexes to which the same label is applied and the cumulative sum of the foreground dominant color, and divides the cumulative sum of the foreground dominant color by the cumulative sum of the number of pixel blocks for each label. The result of division (i.e., average value) is regarded as the dominant color of the label. Because such a label application is performed for all of the quantized indexes, it is possible to unify the indexes based on the lightness.

Then, the foreground dominant-color within text string region calculating portion 102 determines whether adjacent labels on the hue axis (i.e., adjacent labels along the circumferential direction of the circle shown in FIG. 38B) can be merged or not, with respect to the twelve chromatic colors (i.e., the index CH=1-12) among the chroma and the hue quantized into the thirteen stages. The determination whether adjacent labels can be merged or not may be based on the determination whether or not a predetermined value (e.g., 30°) is equal to or more than the difference value calculated from the hue component of the dominant color for each label. When the difference value is less than the predetermine value, the foreground dominant-color within text string region calculating portion 102 merges these adjacent labels. Because performing this process to all of the chromatic color indexes, the foreground dominant-color within text string region calculating portion 102 can perform the indexing process on the foreground color for each text string region. The indexing process performed for each text string region can prevent over segmenting the foreground dominant color, better than the indexing process performed for the whole of each page.

Figure 39:
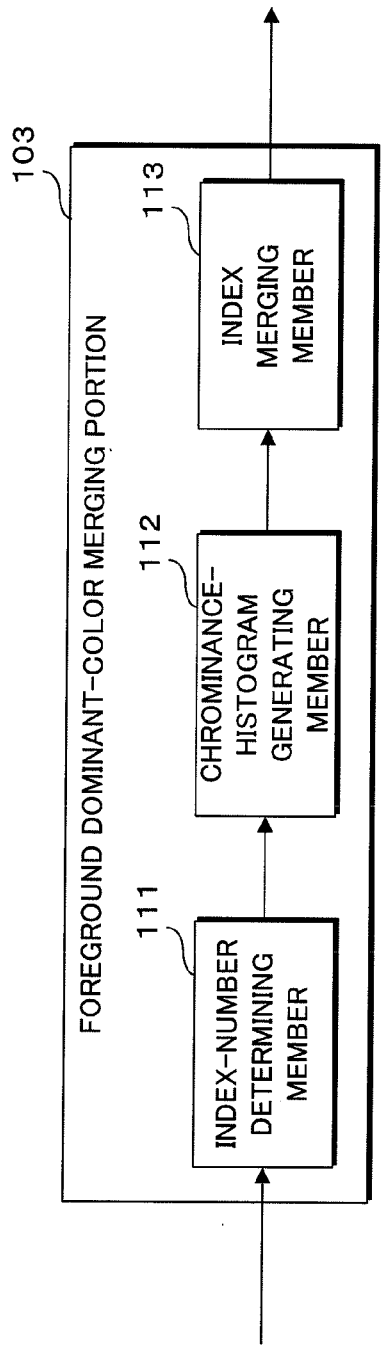
FIG. 39 is a block diagram showing a configuration of a foreground dominant-color merging portion.
Figure 40:
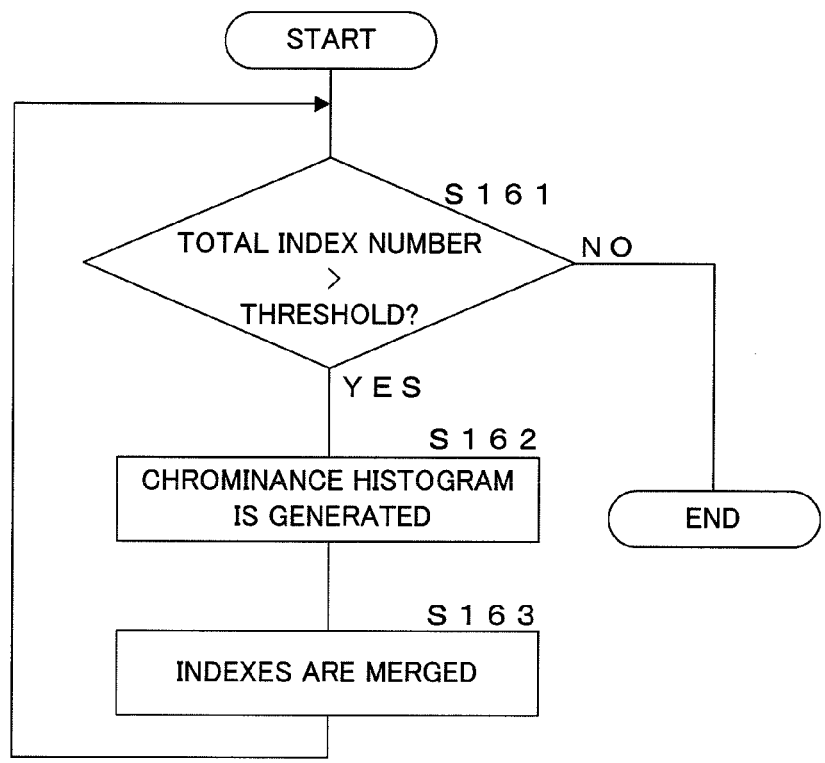
FIG. 40 is a flowchart showing a procedure performed by the foreground dominant-color merging portion.

The foreground dominant-color merging portion 103 is configured to unify the foreground dominant colors of text string regions for each page which have been calculated by the foreground dominant-color within text string region calculating portion 102. Thus, it is possible to reduce the number of foreground dominant colors required for drawing a whole page. FIG. 39 is a block diagram showing a configuration of the foreground dominant-color merging portion 103. FIG. 40 is a flowchart showing a procedure performed by the foreground dominant-color merging portion 103. The foreground dominant-color merging portion 103 calculates the total number of indexes in each page of the foreground dominant color calculated by the foreground dominant-color within text string region calculating portion 102, and makes the index-number determining member 111 determine whether the calculated total number of indexes is more than a threshold (e.g., 31) or not (step S161).

Figure 41:
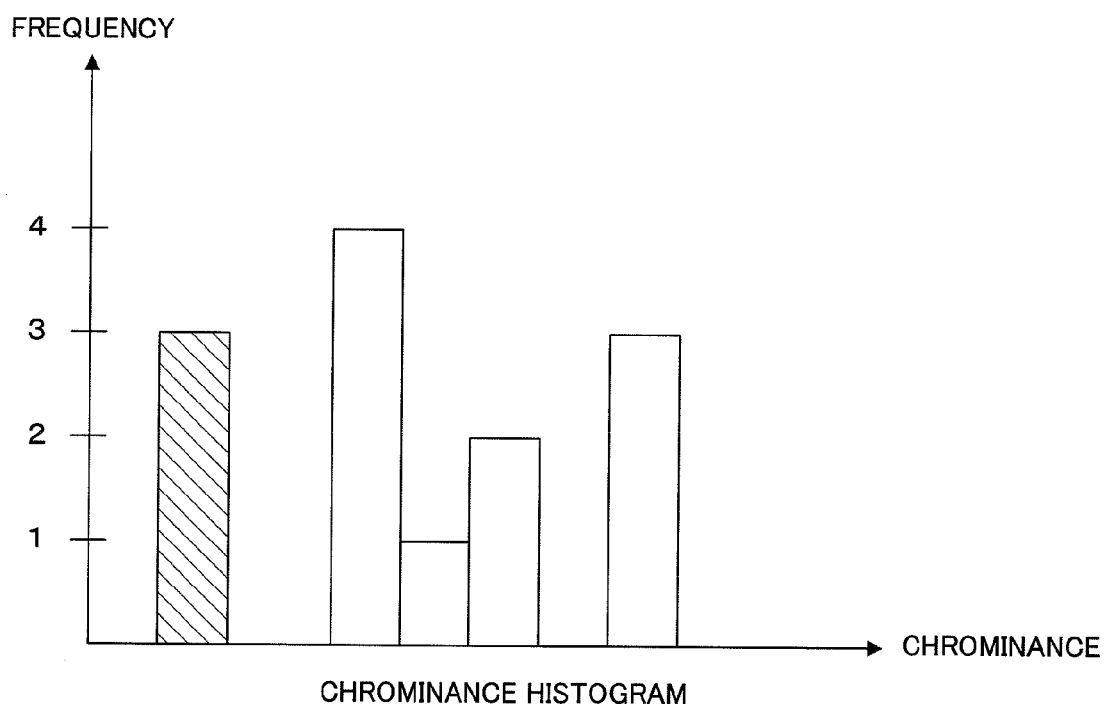
FIG. 41 is a schematic view showing an example of a chrominance histogram.

When the calculated total number of indexes is more than a threshold (S161: YES), the foreground dominant-color merging portion 103 makes the chrominance-histogram generating member 112 generate a chrominance histogram for each page (step S162). FIG. 41 is a schematic view showing an example of the chrominance histogram. For each target foreground dominant color, the chrominance-histogram generating member 112 of the foreground dominant-color merging portion 103 checks another foreground dominant color having the minimum chrominance and generates the chrominance histogram whose horizontal axis is the chrominance between the target foreground dominant color and the found another foreground dominant color and whose vertical axis is the number of foreground dominant colors having the chromince. For example, the chrominance in the CIE1976L*a*b* color space can be calculated by $\Delta L + \Delta a^* + \Delta b^*$.

Then, the index unifying member 113 of the foreground dominant-color merging portion 103 merges the indexes of the foreground dominant color, based on the generated chrominance histogram (step S163). The index unifying process can be implemented by combining indexes of plural foreground dominant colors having the minimum chrominance among the chrominance histogram generated at the step S162. In the example of FIG. 41, three foreground dominant colors having the minimum chrominance (hatched portion in FIG. 41) are merged to be one foreground color.

After the index absorption process, the foreground dominant-color merging portion 103 returns the procedure to the step S161, and determines again whether the total index number is more than the threshold or not. When the total index number is not more than the threshold (S161: NO), the foreground dominant-color merging portion 103 ends the procedure. Because the foreground dominant-color merging portion 103 performs the procedure described above for each page, it is possible to reduce the number of foreground dominant colors required for drawing the whole page.

Based on the foreground dominant color calculated by the foreground dominant-color within foreground region calculating portion 101 and/or the comparison result between the foreground dominant color calculated by the foreground dominant-color within text string region calculating portion 102 and merged by the foreground dominant-color merging portion 103 and the pixel value of the input image data, the foreground-pixel mask extracting portion 104 generates a foreground pixel mask corresponding to the foreground dominant color of the text string region. For each text string region, the foreground-pixel mask extracting portion 104 firstly calculates a difference value between the input image data and the foreground dominant color of the text string region, and a difference value between the input image data and the background dominant color of the text string region. The foreground-pixel mask extracting portion 104 determines that the target pixel of the input image data is the foreground pixel, when the target region has the background dominant color, the difference between the pixel value of the input image data and the foreground dominant color is less than a predetermined threshold, and a value in which a predetermined coefficient (e.g., 1.5) is multiplied to the difference value between the pixel value of the input image data and the foreground dominant color of the text string region is less than the difference between the pixel value of the input image data and the background dominant color. When repeating the processes described above, the foreground-pixel mask extracting portion 104 can generate the foreground pixel mask including information regarding the foreground pixel, and convey the generated foreground pixel mask to the binary image generating portion 105.

Then, the binary image generating portion 105 segments the foreground pixel mask, extracted by the foreground-pixel mask extracting portion 104, by the indexes of the foreground color merged by the foreground dominant-color merging portion 103, to generate the foreground pixel mask for each foreground color. The foreground pixel mask for each foreground color can be a binary image and thus, the binary image generating portion 105 may output the foreground layer binary image that is the generated foreground pixel mask for each foreground color. Furthermore, the binary image generating portion 105 may output the foreground index-color information regarding the index of the foreground color, in addition to the foreground layer binary image.

According to the processes described above, the foreground layer generating section 54 can generate the foreground index-color information in which the indexing process is performed on the color of the foreground pixel, generate the foreground layer binary image corresponding to the index of each foreground dominant color, and output to the background layer generating section 55 and the image compression section 56. It should be noted that the foreground pixel mask of the input-image date can be obtained by performing the OR operation on the plural foreground layer binary images for each index.

(5) Background Layer Generating Section 55

Figure 42:
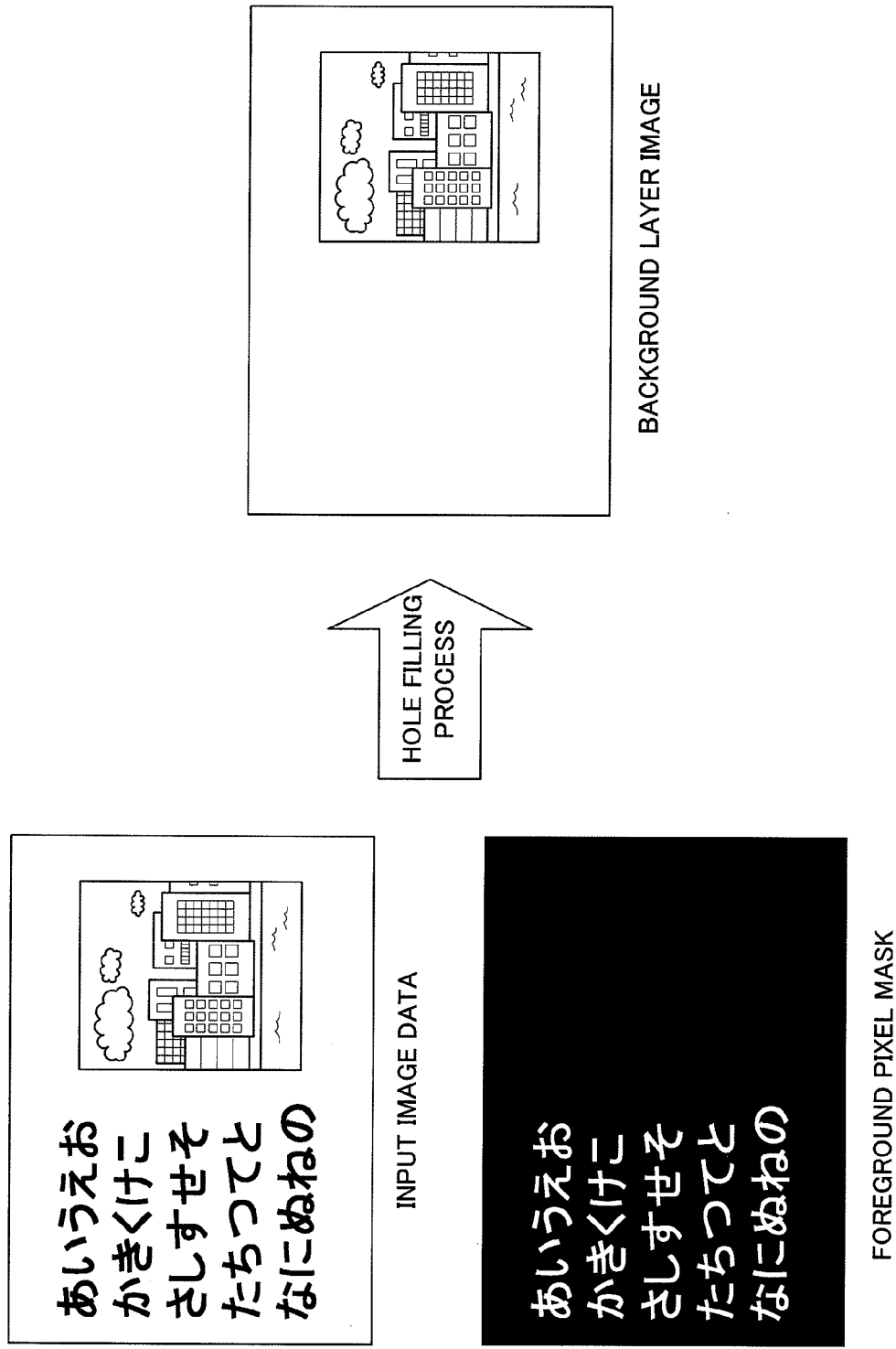
FIG. 42 is a schematic view for explaining a process performed by a background layer generating section.

The background layer generating section 55 is configured to cover the foreground pixel portion of the input image data with neighboring background pixels that are not foreground pixels, for enhancing the compression rate of the background layer, and to output the background layer that is the processed result. FIG. 42 is a schematic view for explaining a process performed by the background layer generating section 55. For example, based on the input image data including a text character and an image, such as a picture image, as shown in FIG. 42, the processes performed by the color conversion process section 50 to the foreground layer generating section 54 can generate the foreground pixel mask representing the position of the text character pixel. Based on the foreground pixel mask, the background layer generating section 55 recognizes the position of the foreground pixel in the input image data, and replaces a portion of the foreground pixel with the neighboring background pixel to generate the background layer.

Figure 43:
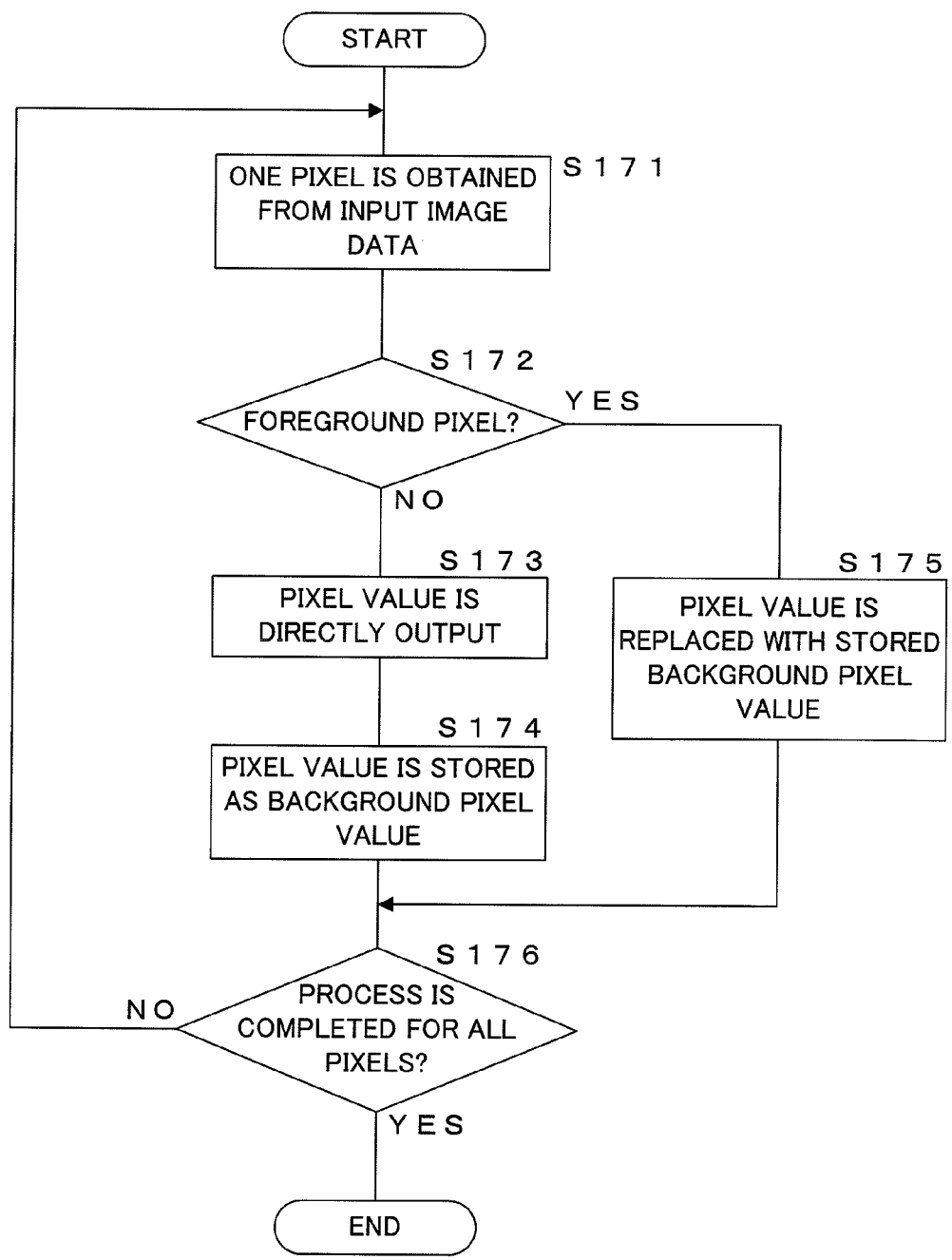
FIG. 43 is a flowchart showing a procedure performed by the background layer generating section.
Figure 44:
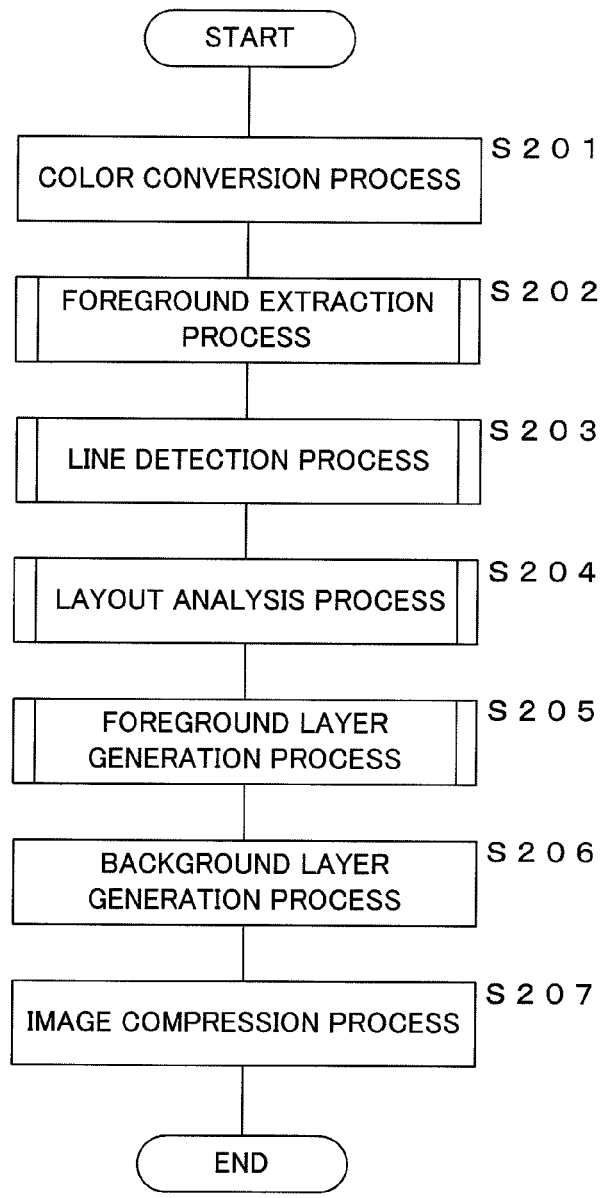
FIG. 44 is a flowchart showing a procedure performed by a compression processing unit.
Figure 45:
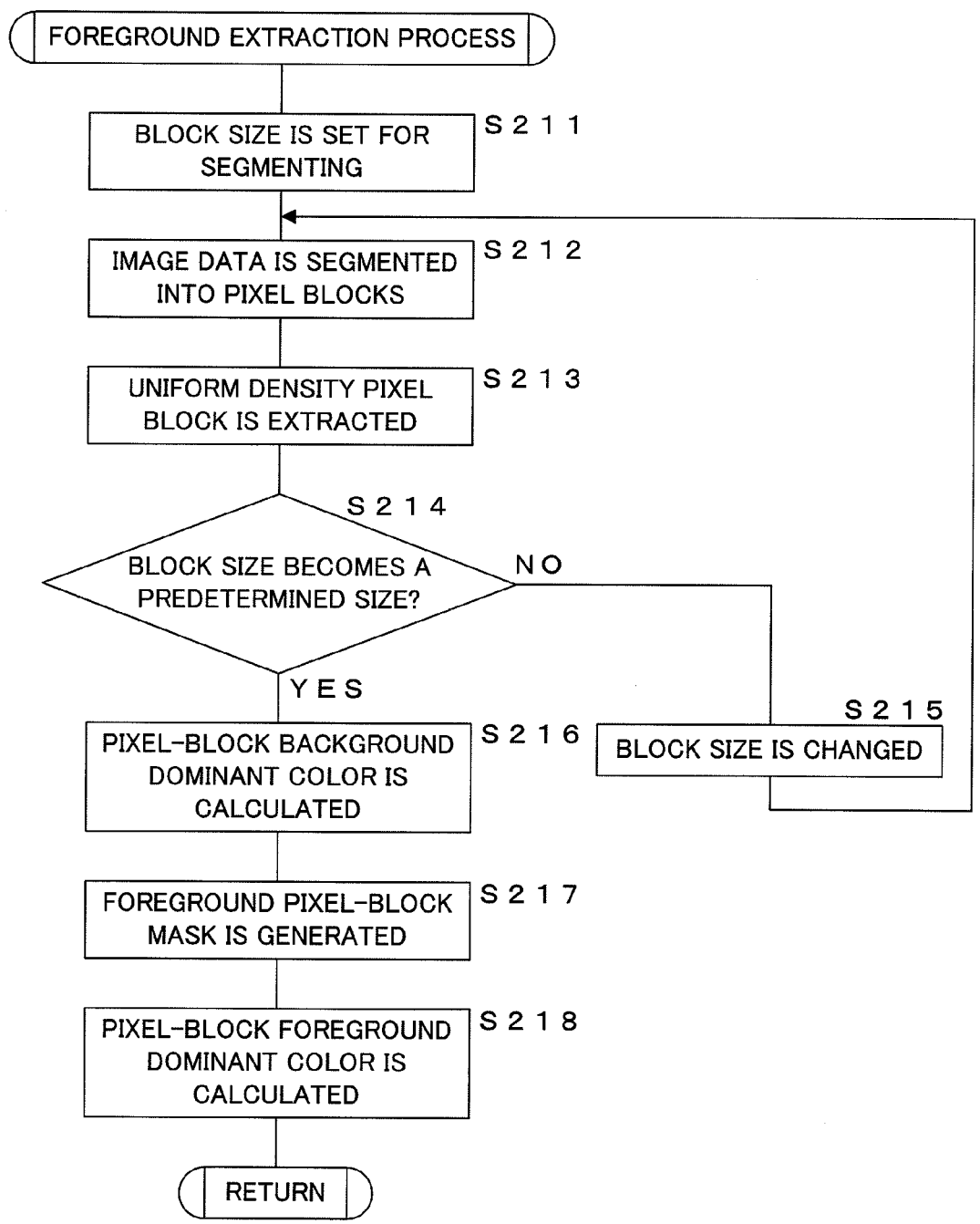
FIG. 45 is a flowchart showing another procedure performed by the compression processing unit.
Figure 46:
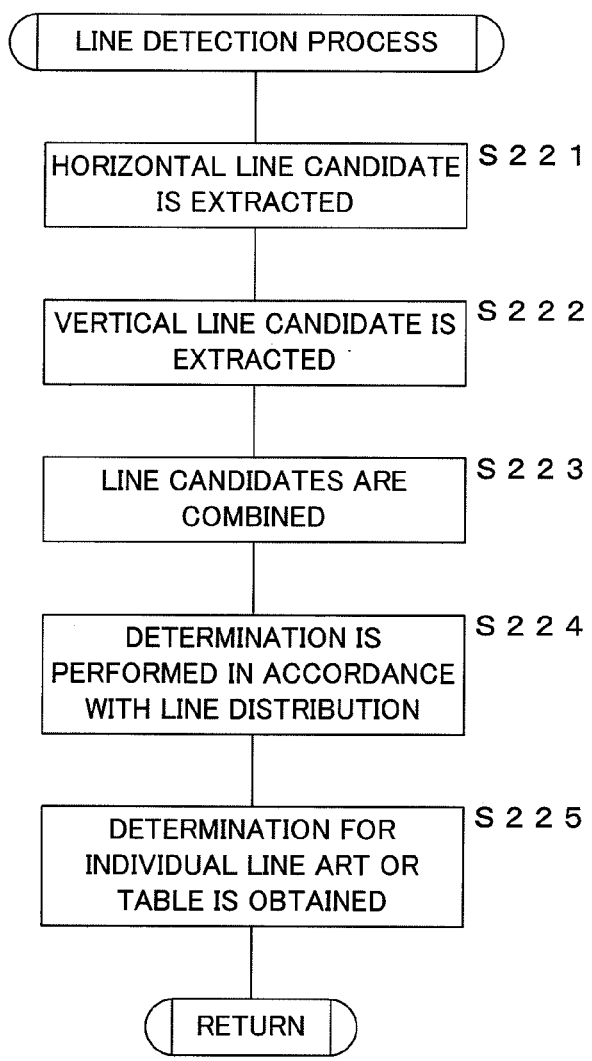
FIG. 46 is a flowchart showing another procedure performed by the compression processing unit.
Figure 47:
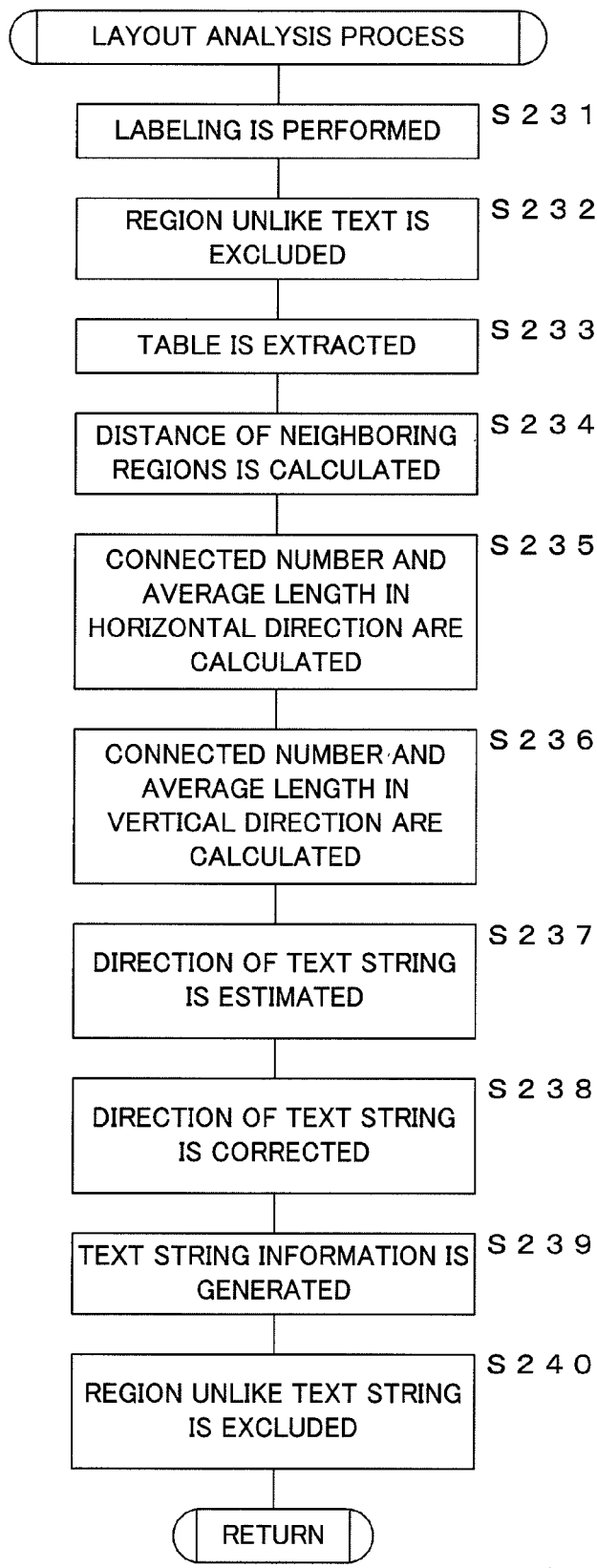
FIG. 47 is a flowchart showing another procedure performed by the compression processing unit.
Figure 48:
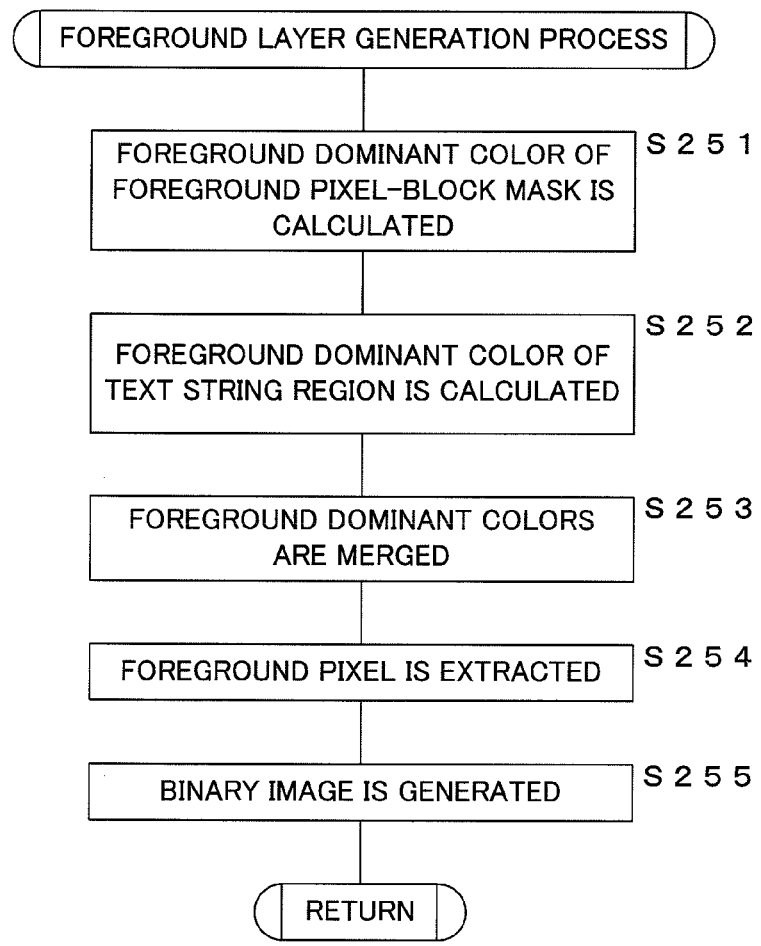
FIG. 48 is a flowchart showing another procedure performed by the compression processing unit.

FIG. 43 is a flowchart showing a procedure performed by the background layer generating section 55. The background layer generating section 55 obtains one pixel as the target from the input image data (step S171), and determines in accordance with the foreground pixel mask whether the obtained target pixel is a foreground pixel or not (step S172). When having determined that the obtained target pixel is not a foreground pixel (S172: NO), the background layer generating section 55 outputs the pixel value of the background layer that is just the value of the obtained target pixel (step S173), stores the output pixel value as the background pixel value (step S174), and forwards the procedure to the step S176.

When having determined that the obtained target pixel is a foreground pixel (S172: YES), the background layer generating section 55 performs a replacement process with the pixel value of the obtained target pixel based on the background pixel value stored at the step S174 (step S175), and outputs the replaced value as the pixel value of the background layer. For example, the average value of stored values for plural background pixels, the recently-stored value of the background pixel or the like is replaced with the value of the obtained target pixel. Then, the background layer generating section 55 determines whether the process described above is completed for all of the pixels in the input image data or not (step S176). When having determined that the process is not completed for all of the pixels (S176: NO), the background layer generating section 55 returns the procedure to the step S171, and performs the similar procedure on the next one pixel of the input image data. When having determined that the process is completed for all of the pixels (S176: YES), the background layer generating section 55 ends the procedure.

Because of the processes described above, the background layer generating section 55 can generate the background layer in which the foreground pixel is removed from the input image data, and output the generated background layer to the image compression section 56. Therefore, the image compression section 56 can perform data compression with different compression techniques for the foreground layer generated by the foreground layer generating section 55 and the background layer generated by the background layer generating section 55.

Next, it will be described below in reference to the flowchart about the flow of processes performed by each section of the compression processing unit 30. FIG. 44-FIG. 48 are flowcharts showing procedures performed by the compression processing unit 30. The compression processing unit 30 firstly makes the color conversion process section 50 convert the color for the input image data obtained from the segmentation process section 24 (step S201), and makes the foreground extracting section 51 perform the foreground extraction process on the converted image data (step S202), to obtain the pixel-block background dominant color, the pixel-block foreground dominant color and the foreground pixel-block mask.

Based on the foreground pixel-block mask that is obtained by the foreground extraction process, the compression processing unit 30 makes the line detection process section 52 perform the line detection process (step S203) to generate the line information, makes the layout analysis processing section 53 perform the layout analysis process on the input image data based on the generated line information (step S204) to generate the text string region information regarding the text string in the input image data.

Based on the pixel-block background dominant color, the pixel-block foreground dominant color, the foreground pixel-block mask, the text string region information and the like obtained by the processes described above, the compression processing unit 30 makes the foreground layer generating section 54 generate the foreground layer in which the foreground pixel is extracted from the input image data (step S205), and makes the background layer generating section 55 generate the background layer based on the generated foreground layer which relates to the background of the input image data (step S206). Then, the compression processing unit 30 makes the image compression section 56 perform the image compression processes with the techniques suitable for the generated foreground layer and background layer, respectively (step S207), and ends the procedure.

In the foreground extraction process at the step S202, the foreground extracting section 51 of the compression processing unit 30 firstly sets the block size (e.g., 8 pixels×8 pixels) utilized for segmenting the input image data (step S211), and segments the input image data into plural pixel blocks having the set block size (step S212). Then, the foreground extracting section 51 determines the difference between pixel values in the segmented pixel blocks, and thus extracts the uniform density pixel block from the plural pixel blocks (step S213). Then, the foreground extracting section 51 determines whether the size of pixel block reaches to a predetermined size or not (step S214). When having determined that the size of pixel block does not reach to a predetermined size (S214: NO), the foreground extracting section 51 changes the block size to be smaller (step S215), returns the procedure to the step S212, and repeatedly extracts the segmented pixel block and the uniform density pixel block.

When having determined that the size of pixel block reaches to a predetermined size (S214: YES), the foreground extracting section 51 calculates the pixel-block background dominant color based on the pixel value of the extracted uniform density pixel block (step S216), extracts the foreground pixel block based on the comparison between the calculated pixel-block background dominant color and the pixel value of each pixel block to generate the foreground pixel-block mask (step S217), calculates the pixel-block foreground dominant color based on the comparison between the pixel value of each pixel block and the pixel-block background dominant color (step S218), and ends the foreground extraction process.

In the line detection process at the step S203, the line detection process section 52 of the compression processing unit 30 firstly extracts the horizontal line candidate that is configured with plural foreground pixel blocks sequentially connected in the horizontal direction of the input image data (step S221), and similarly extracts the vertical line candidate that is configured with plural foreground pixel blocks sequentially connected in the vertical direction of the input image data (step S222). For the extracted line candidates, the line detection process section 52 combines plural line candidates aligned close to each other on the same horizontal or vertical line to be a one line candidate (step S223), and then determines in accordance with the distribution of width for each line candidate whether each line candidate is the line art or not (step S224). Then, the line detection process section 52 determines whether the each line art is the individual line art in the horizontal direction or the vertical direction, or the line configuring the table in the image (step S225), outputs the line information regarding finally-detected line, and ends the line detection process.

In the layout analysis process at the step S204, the layout analysis processing section 53 of the compression processing unit 30 firstly performs the labeling process for plural foreground pixel blocks sequentially connected in the image data (step S231). The labeling process is utilized for assigning a label specific to the foreground region. Based on the information on the height, width, number of pixel blocks and the like for each of the labeled foreground regions, the layout analysis processing section 53 determines whether each foreground region corresponds to the text character or not, and removes the foreground region that is not determined to correspond to the text character (step S232). Based on the line information output from the line detection process section 52, the layout analysis processing section 53 extracts the text string that is the foreground region positioned inside the table in the image (step S233).

For each target foreground region, the layout analysis processing section 53 calculates the distance between the target foreground region and the neighboring foreground region positioned at the upper, lower, left or right side of the target foreground region (step S234), calculates the number of connected foreground regions in the horizontal direction and the average length (or total length) for the connected foreground regions in the horizontal direction (step S235), and similarly calculates the number of connected foreground regions in the vertical direction and the average length (or total length) for the connected foreground regions in the vertical direction (step S236). By comparing the number of connected regions and the average lengths in the horizontal direction with those in the vertical direction, the layout analysis processing section 53 estimates whether or not the plural foreground regions configure the horizontal text string or the vertical text string (step S237), determines whether the direction of the estimated text string is appropriate or not, and corrects the direction of the text string that is determined to be inappropriate (step S238). Based on the image data, the layout analysis processing section 53 finds plural foreground regions having the same estimated text string direction, extracts the text string configured with plural foreground regions that are arranged close to each other and have appropriate positional relationships with respect to a direction perpendicular to the text string direction, generates the text string information regarding the text string (step S239), removes from the text string information the region that is unlike the text string based on the width or height of the text string region (step S240), and ends the layout analysis process.

In the foreground layer generation process at the step S205, the foreground layer generating section 54 of the compression processing unit 30 firstly calculates the foreground dominant color for each foreground region of the foreground pixel-block mask (step S251), calculates the foreground dominant color of each text string region based on the foreground dominant color of each foreground region (step S252), and merges the calculated foreground dominant colors of each text string region for each page (step S253). Based on the comparison results between the pixel value of the image data and the foreground dominant color and between the pixel value of the image data and the background dominant color, the foreground layer generating section 54 extracts the foreground pixel (step S254), segments the foreground pixel for each foreground dominant color, generates the foreground pixel mask (binary image) for each foreground color (step S255), and ends the foreground layer generation process.

The image forming apparatus described above utilizes the color conversion process section 50 to the layout analysis processing section 53 for extracting the text string region from the input image data, and the foreground layer generating section 54 for extracting the foreground pixel from the text string region. Thus, it is possible to perform the indexing process on the color information and the like for each text string region, and treat the color information, such as the foreground dominant color, for each text string region. Therefore, it is possible to prevent utilizing the region unit (e.g., the pixel block unit) that is over-segmented from the input image data for managing the color information and enabling the foreground pixel to be precisely extracted.

Because the line detection process section 52 extracts the line art from the input image data and removes the pixel block configuring the line art from the foreground pixel-block mask, it is possible to remove the line art from the target foreground pixels. Thus, it is possible to treat only the text character as the foreground pixel. Therefore, it is possible to enhance the compression rate of the input image data performed by the image compression section 56. Furthermore, it is possible to prevent shaggy or the like and to enhance the image quality because the line art is treated as the background at that time. Moreover, it is possible to enhance the precision for extracting the text string region, because the table in the image can be detected by the line detection of the line detection process section 52 and the layout analysis processing section 53 can extract the text string in the table.

In addition, because it is configured to repeatedly determine whether it is the uniform density pixel block or not while segmenting the pixel block size to be gradually smaller at the time of extracting the uniform density pixel block from the image data by the uniform density pixel block extracting portion 61, it is possible to refer not only to a wide region but also to a local region of the input image data for extracting the uniform density pixel block. Therefore, it is possible to precisely calculate the background dominant color, the foreground dominant color and the like, and to precisely extract the foreground pixel.

Because the text string direction estimating portion 95 estimates the text string direction based on the distance between the foreground regions and the number of connected foreground regions and the text string region extracting portion 97 merges the foreground regions sequentially connected in the estimated direction to extract the text string region, it is possible to precisely extract the text string region from the input image data. Furthermore, because it is configured to calculate the difference between the value of each pixel in the input image data and the foreground dominant color and the difference between the value of each pixel in the input image data and the background dominant color, and to extract the foreground pixel whose difference satisfies the predetermined condition by the foreground layer generating section 54, it is possible to surely extract the foreground pixel from the input image data based on the foreground dominant color and the background dominant color. Moreover, because it is configured that the foreground dominant-color merging portion 103 merges the foreground color of the text string region for each page of the input image data, it is possible to reduce the number of colors regarding the foreground image, and to reduce the index number after the indexing process on the color information.

Because the image compression section 56 can utilize compression techniques suitable for the foreground layer generated by the foreground layer generating section 54 and the background layer generated by the background layer generating section 55, it is possible to enhance the compression rate of the input image data. For example, the foreground layer is compressed by the MMR (lossless-compression technique) and the background layer is compressed by the JPEG (lossy-compression technique).

Although the present embodiment is illustrated with the example in which the MFP includes the image processing apparatus 20 that extracts the foreground pixel, it should be noted that the present invention is not limited to the illustration. Similar configurations may be applied to an image reading apparatus, such as a flat-head scanner, or to another apparatus that performs the image compression process (e.g., a product scanner, filing server and the like). In addition, although the present embodiment is illustrated with the example in which the MFP processes color image data, it should be noted that the present invention is not limited to the illustration. The MFP may process black-and-white image data.

The image processing according to the present invention may be implemented by the computer program that makes a computer perform such a process, although the image processing according to the present invention is illustrated to be implemented by the hardware, such as the MFP or the image reading apparatus. For example, the program code (execute form program, intermediate code program, source program or the like) for the computer program may be recorded in a computer-readable medium that can be read by a computer. Thus, it is possible to provide a portable computer-readable medium having recorded the computer program for performing the foreground pixel extraction process, the compression process and the like.

In the case that the MFP of the embodiment described above and the image reading apparatus of the alternative embodiment described above include the storing means, such as read only memory (ROM) or hard disc, it may be configured that the program code of the computer program is stored in this storing means. Alternatively, it may be configured that such an apparatus includes a device which can read the program code from a detachable computer-readable medium, and that the image processing is performed by executing the computer program read out from the computer-readable medium. In these configurations, the computer program in the storing means or the computer-readable medium may be read out directly by the CPU included in an apparatus, such as the MFP or the image reading apparatus. Alternatively, the program code in the storing means or the computer-readable medium may be downloaded into a storing area, such as random access memory (RAM), and then the downloaded program code may be executed by the CPU or the like (the computer program for downloading the program code may be stored in the apparatus itself).

The computer-readable medium attachable to the MFP or the image reading apparatus may be: a tape type medium, such as magnetic tape and cassette tape; a magnetic disc medium, such as flexible disc and hard disc; an optical disc medium, such as compact disc (CD), magneto-optical (MO), mini disc (MD), and digital versatile disc (DVD); a card type medium, such as integrated circuit (IC) card, memory card, and optical card; and a semiconductor memory, such as mask ROM, erasable programmable ROM (EPROM), electrically erasable programmable ROM (EEPROM), and flash memory, which fix the computer program. When such a computer-readable medium is attached to the MFP or the image reading apparatus and the computer program in the computer-readable medium is read out and executed, the image processing described above is performed.

In the case that the MFP or the image reading apparatus can perform the data transmission after connected to the communication network, such as internet, the computer program may be downloaded through the communication network and the downloaded computer program may be executed to perform the image processing. In that case, the computer program for downloading the image processing computer program through the communication network may be previously stored in the apparatus itself, or installed through the computer-readable medium. It should be noted that the present invention may be implemented by the program code of the computer program that is configured to be a computer data signal embedded into a carrier wave implemented by the electrical transmission.

The computer executing such a computer program may include: an image input apparatus, such as flat-head scanner, film scanner or digital camera; a processing apparatus that executes the computer program and performs various processes including image processing; an image display apparatus that displays the processed results, such as cathode ray tube (CRT) display or liquid crystal display; and an image output apparatus that outputs the processed results on a medium (e.g., paper), such as printer. The computer may further include a communication means for connecting to the communication network, such as network card or modem.

(Alternate Embodiment 1)

Figure 49:
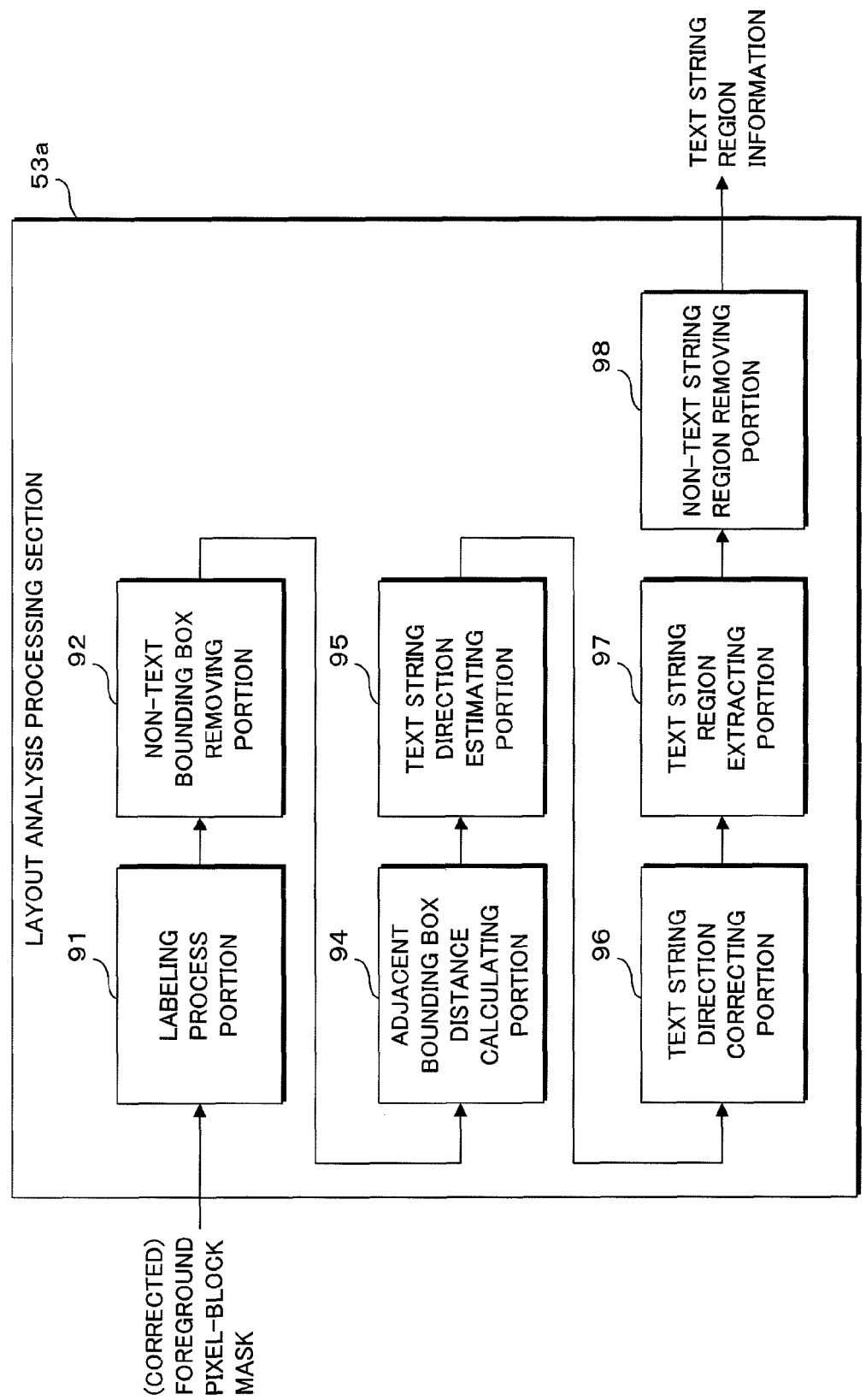
FIG. 49 is a block diagram showing a configuration of a layout analysis processing section in an alternative embodiment 1.

Although the embodiment described above is illustrated to include the line detection process section 52 in the compression processing unit 30, this invention is not limited to the illustration. The line detection process section 52 may not be included. FIG. 49 is a block diagram showing a configuration of the layout analysis processing section 53a in an alternate embodiment 1, in which the compression processing unit 30 does not include the line detection process section 52. The layout analysis processing section 53a of the alternate embodiment 1 is configured similarly with the layout analysis processing section 53 of FIG. 21, in which the bounding box in table process portion 93 is excluded. In other words, the layout analysis processing section 53a of the alternate embodiment 1 is configured to convey the results of processing performed by the labeling process portion 91 and the non-text bounding box removing portion 92 to the adjacent bounding box distance calculating portion 94, but not to extract the text string inside the table from the input image data. The processes performed by the portions of the layout analysis processing section 53a in the alternate embodiment 1 are similar to the processes performed by the portions of the layout analysis processing section 53 described above.

Figure 50:
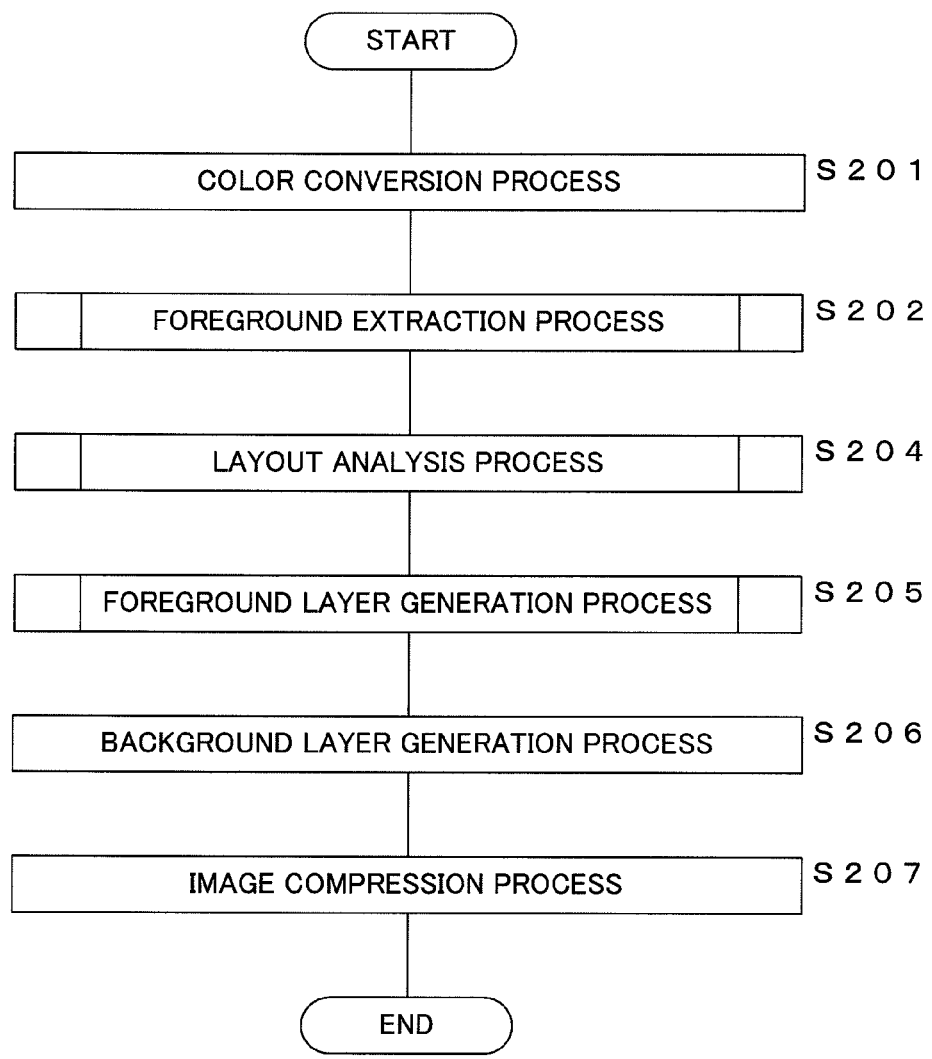
FIG. 50 is a flowchart showing a procedure performed by a compression processing unit in the alternative embodiment 1.
Figure 51:
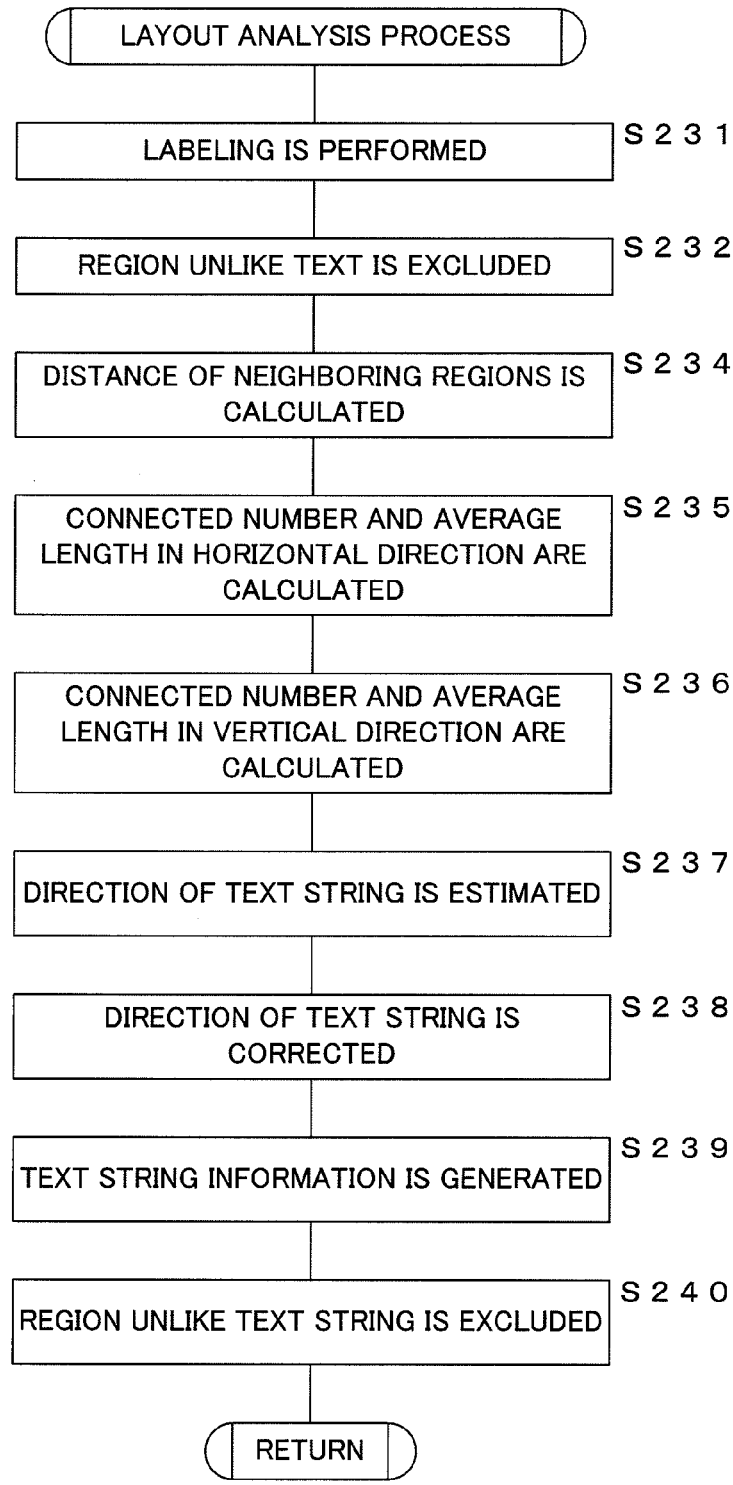
FIG. 51 is a flowchart showing another procedure performed by the compression processing unit in the alternative embodiment 1.

FIG. 50 and FIG. 51 are flowcharts showing procedures performed by the compression processing unit 30 in the alternate embodiment 1. The procedure performed by the compression processing unit 30 in the alternate embodiment 1 is similar to the procedure shown by the flowchart of FIG. 44, in which the line detection process at the step S203 is excluded. The layout analysis process performed at the step S204 by the layout analysis processing section 53a of the compression processing unit 30 in the alternate embodiment 1 is similar to the process shown by the flowchart of FIG. 47, in which the extraction process at the step S233 is excluded.

(Alternate Embodiment 2)

Figure 52:
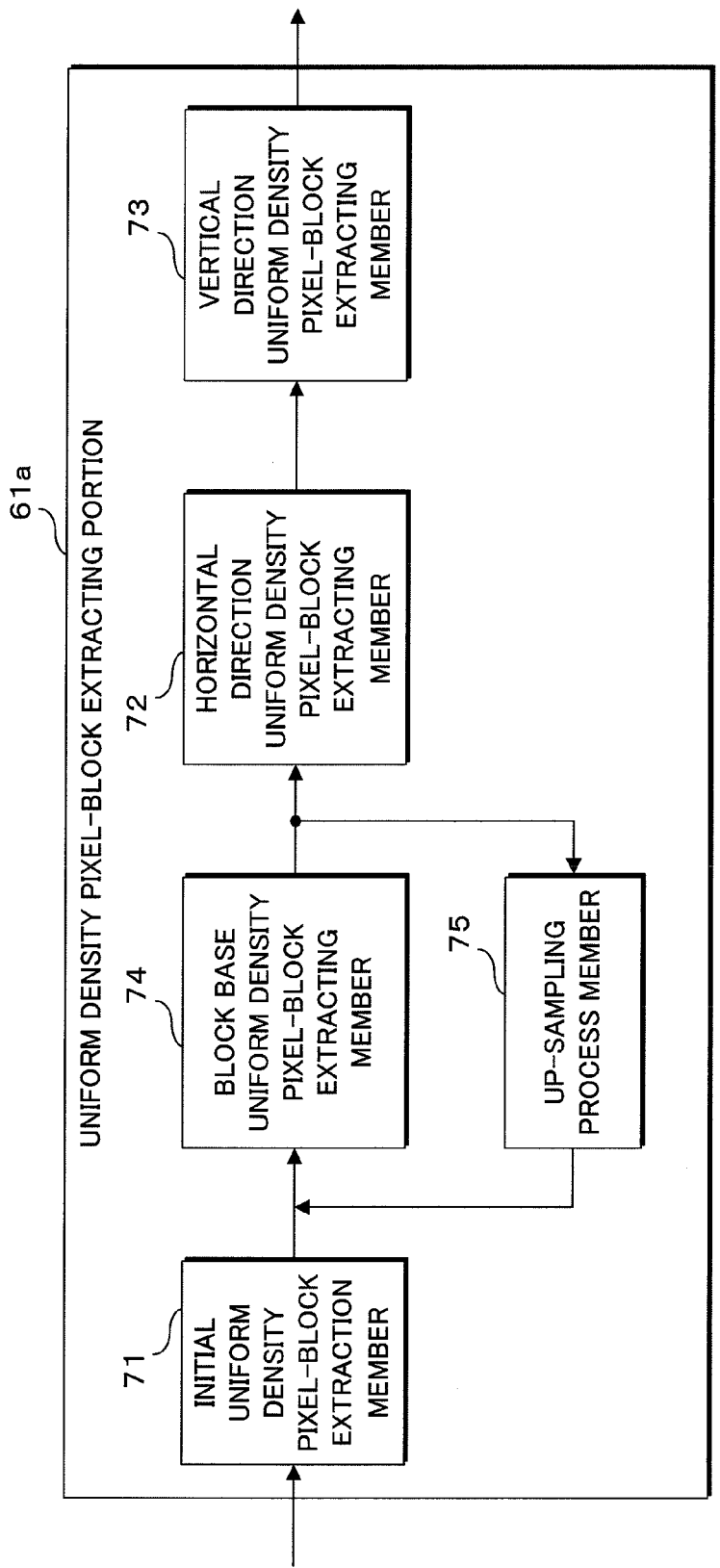
FIG. 52 is a block diagram showing a configuration of an uniform density pixel block extracting portion in an alternative embodiment 2.

Although the uniform density pixel block extracting portion 61 of the foreground extracting section 51 in the embodiment described above is illustrated to repeat the processes performed by the horizontal direction uniform density pixel-block extracting member 72, the vertical direction uniform density pixel-block extracting member 73 and the block base uniform density pixel-block extracting member 74 while changing the size of the pixel block, the present invention is not limited to the illustration. FIG. 52 is a block diagram showing a configuration of an uniform density pixel block extracting portion 61a in an alternate embodiment 2. After the process of the uniform density pixel block initial extraction member 71, the uniform density pixel block extracting portion 61a of the alternate embodiment 2 makes the block base uniform density pixel-block extracting member 74 repeat the uniform density pixel block extraction process while changing the size of the pixel block, and makes the horizontal direction uniform density pixel-block extracting member 72 and the vertical direction uniform density pixel-block extracting member 73 perform the uniform density pixel block extraction process based on the pixel block size obtained by the repeated processes. The extraction process performed by the horizontal direction uniform density pixel-block extracting member 72 and the vertical direction uniform density pixel-block extracting member 73 is especially effective in the case that the pixel block size is small. Therefore, it is possible to enhance the processing speed without the reduction in the extraction precision, by allowing only the block base uniform density pixel-block extracting member 74 to repeat the extraction process.

Explanation of Item Numbers

| | |
|---|---|
| 11 | image input apparatus |
| 12 | image output apparatus |
| 13 | communication device |
| 15 | control panel |
| 20 | image processing apparatus |
| 30 | compression processing unit |
| 31 | storing section |
| 50 | color conversion process section |
| 51 | foreground extracting section |
| 52 | line detection process section (foreground-pixel bock mask correcting portion) |
| 53, 53a | layout analysis processing section |
| 54 | foreground layer generating section (foreground-pixel extracting section) |
| 55 | background layer generating section |
| 56 | image compression section |
| 61, 61a | uniform density pixel block extracting portion |
| 62 | background dominant color calculating portion |
| 63 | foreground pixel-block generating portion |
| 64 | foreground dominant-color calculating portion |
| 71 | initial uniform density pixel-block extraction member |
| 72 | horizontal direction uniform density pixel-block extracting member |
| 73 | vertical direction uniform density pixel-block extracting member |
| 74 | block base uniform density pixel-block extracting member |
| 75 | up-sampling process member |
| 81 | horizontal-line candidate extracting portion |
| 82 | vertical-line candidate extracting portion |
| 83 | line-candidate connecting portion |
| 84 | line-distribution detecting portion |
| 85 | line detection final process portion |
| 91 | labeling process portion (foreground region extracting portion) |
| 92 | non-text bounding box removing portion |
| 93 | bounding box in table process portion |
| 94 | adjacent bounding box distance calculating portion (ajacent-foreground distance direction calculating portion) |
| 95 | text string direction estimating portion |
| 96 | text string direction correcting portion |
| 97 | text string region extracting portion |
| 98 | non-text character string region removing portion |
| 101 | foreground dominant-color within foreground region calculating portion |
| 102 | foreground dominant-color within text string region calculating portion |
| 103 | foreground dominant-color merging portion |
| 104 | foreground-pixel mask extracting portion |
| 105 | binary image generating portion |
| 111 | index-number determining part |
| 112 | chrominance-histogram generating part |
| 113 | index unifying part |

What is claimed is:

1. An image processing apparatus that extracts, from an input image data, a foreground pixel configuring a foreground image of the input image data, comprising:
   a foreground extracting section having:
   an uniform density pixel-block extracting portion that segments the input image data into plural pixel blocks, and extracts an uniform density pixel block in which a pixel value difference of pixels is less than a predetermined value among the plural pixel blocks;

a background dominant color calculating portion that calculates a background dominant color based on a pixel value in the uniform density pixel block extracted by the uniform density pixel block extracting portion;

a foreground-pixel block determining portion that compares the background dominant color calculated by the background dominant color calculating portion and a pixel value in a target pixel block, determines whether or not the target pixel block is a foreground pixel block configuring the foreground image, and generates a foreground pixel-block mask based on the pixel block determined to be the foreground pixel block; and a foreground dominant-color calculating portion that calculates a foreground dominant color based on a pixel value in the foreground pixel block determined by the foreground-pixel block determining portion;

a layout analysis processing section having:

a foreground region extracting portion that extracts a foreground region configured with sequential foreground pixel blocks, based on the foreground pixel-block mask generated by the foreground-pixel block determining portion, and generates a foreground information regarding the extracted foreground region;

an adjacent-foreground distance direction calculating portion that calculates a distance of the foreground regions extracted by foreground region extracting portion and directions of the foreground regions extracted by foreground region extracting portion; and a text string region extracting portion that extracts a text string configured with the foreground regions, based on the distance and directions calculated by the adjacent-foreground distance direction calculating portion; and a foreground-pixel extracting section that extracts from the input image data the foreground pixel based on the background dominant color, the foreground dominant color and the extracted text string region by the text string region extracting portion.

2. An image processing apparatus according to claim 1, further comprising:

a line extracting portion that extracts a line in which foreground pixels are sequentially aligned in a horizontal direction or a vertical direction of the input image data, based on the foreground pixel-block mask generated by the foreground-pixel block determining portion; and a foreground-pixel bock mask correcting portion that corrects to remove a pixel block configuring the line extracted by the line extracting portion, wherein processes performed by the layout analysis processing section and the foreground-pixel extracting section are based on the foreground pixel-block mask that has been corrected by the foreground-pixel bock mask correcting portion.

3. An image processing apparatus according to claim 1, wherein the uniform density pixel block extracting portion performs a determination whether each pixel block having a predetermined size is the uniform density pixel block or not, segments the pixel block determined not to be the uniform density pixel block into pixel blocks, each of which has a segmented size smaller than the predetermined size, and repeatedly performs the determination until the segmented size reaches to the predetermined size.

4. An image processing apparatus according to claim 1, wherein the adjacent-foreground distance direction calculating portion determines plural foreground regions arranged in the horizontal direction or the vertical direction of the input image data, based on coordinates of the plural foreground regions and calculates the distance of the plural foreground regions arranged in the horizontal direction or the vertical direction, the image processing apparatus further comprises a text string direction estimating portion that estimates a direction of a text string configured with plural foreground regions, based on the distance calculated by the adjacent-foreground distance direction calculating portion, and a number of foreground regions arranged in the horizontal direction or the vertical direction, and the text string region extracting portion that merges plural foreground regions into an merged region based on the text string direction estimated by the text string direction estimating portion, and extracts the text string region configured with the merged region.

5. An image processing apparatus according to claim 1, wherein the foreground-pixel extracting section calculates a difference value between a pixel value of a target pixel in the input image data and a foreground dominant color of the text string region extracted by the text string region extracting portion and a difference value between the pixel value of the target pixel and the background dominant color calculated by the background dominant color calculating portion, and extracts the target pixel as the foreground pixel when the calculated difference values satisfy predetermined conditions.

6. An image processing apparatus according to claim 5, wherein the image data is input for each page, and the foreground-pixel extracting section merges, for said each page of the image data, the foreground dominant color of the text string region extracted by the text string region extracting portion.

7. An image forming apparatus, comprising:

an image processing apparatus that extracts from an input image data a foreground pixel configuring a foreground image of the input image data; and an image compression unit that compresses by a method a foreground pixel image data extracted from the input image data by the image processing apparatus and compresses by another method a pixel image data other than the foreground pixel, wherein the method is different from said another method, and the image processing apparatus comprises:

a foreground extracting section having: an uniform density pixel block extracting portion that segments the input image data into plural pixel blocks, and extracts an uniform density pixel block in which a pixel value difference of pixels is less than a predetermined value among the plural pixel blocks; a background dominant color calculating portion that calculates a background dominant color based on a pixel value in the uniform density pixel block extracted by the uniform density pixel block extracting portion; a foreground-pixel block determining portion that compares the background dominant color calculated by the background dominant color calculating portion and a pixel value in a target pixel block, determines whether or not the target pixel block is a foreground pixel block configuring the foreground image, and generates a foreground pixel-block mask based on the pixel block determined to be the foreground pixel block; and a foreground dominant-color calculating portion that calculates a foreground dominant color based on a pixel value in the foreground pixel block determined by the foreground-pixel block determining portion;

a layout analysis processing section having: a foreground region extracting portion that extracts a foreground region configured with sequential foreground pixel blocks, based on the foreground pixel-block mask generated by the foreground-pixel block determining portion, and generates a foreground information regarding the extracted foreground region; an adjacent foreground distance direction calculating portion that calculates a distance of the foreground regions extracted by foreground region extracting portion and directions of the foreground regions extracted by foreground region extracting portion; and a text string region extracting portion that extracts a text string configured with the foreground regions, based on the distance and directions calculated by the adjacent-foreground distance direction calculating portion; and a foreground-pixel extracting section that extracts from the input image data the foreground pixel based on the background dominant color, the foreground dominant color and the extracted text string region by the text string region extracting portion.

8. A non-transitory computer-readable medium that records a computer program for making a computer extract from an input image data a foreground pixel configuring a foreground image of the input image data, wherein the computer program when executed causes the computer to execute:

segmenting the input image data into plural pixel blocks;

extracting an uniform density pixel block in which a pixel value difference of pixels is less than a predetermined value among the plural pixel blocks;

calculating a background dominant color based on a pixel value in the extracted uniform density pixel block;

comparing the calculated background dominant color and a pixel value in a target pixel block, determining whether or not the target pixel block is a foreground pixel block configuring the foreground image, and generating a foreground pixel-block mask based on the pixel block determined to be the foreground pixel block;

calculating a foreground dominant color based on a pixel value in the determined foreground pixel block;

extracting a foreground region configured with sequential foreground pixel blocks, based on the generated foreground pixel-block mask, and generating a foreground information regarding the extracted foreground region;

calculating a distance of the extracted foreground regions and directions of the extracted foreground regions;

extracting a text string configured with the foreground regions, based on the calculated distance and directions; and extracting from the input image data the foreground pixel based on the background dominant color, the foreground dominant color and the extracted text string region.

* * * * *